US012210680B2

(12) United States Patent
Hashimoto et al.

(10) Patent No.: US 12,210,680 B2
(45) Date of Patent: **\*Jan. 28, 2025**

(54) HEAD MOUNTED DISPLAY APPARATUS

(71) Applicant: MAXELL, LTD., Kyoto (JP)

(72) Inventors: Yasunobu Hashimoto, Kyoto (JP); Hitoshi Akiyama, Kyoto (JP); Megumi Kurachi, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,413

(22) Filed: Dec. 6, 2023

(65) Prior Publication Data

US 2024/0103621 A1 Mar. 28, 2024

Related U.S. Application Data

(63) Continuation of application No. 17/605,294, filed as application No. PCT/JP2019/017311 on Apr. 23, 2019, now Pat. No. 11,893,153.

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G02B 27/017* (2013.01);
(Continued)

(58) Field of Classification Search
CPC ...... G06F 3/013; G06F 3/017; G06F 3/04815; G06F 3/167; G06F 2203/04804;
(Continued)

(56) References Cited

U.S. PATENT DOCUMENTS 10,635,755 B2 * 4/2020 Wayne .................... G06F 30/00
11,893,153 B2 * 2/2024 Hashimoto ......... G06F 3/04815
(Continued)

FOREIGN PATENT DOCUMENTS

JP 11-338929 A 12/1999
JP 2006-267604 A 10/2006
(Continued)

OTHER PUBLICATIONS

International Search Report of PCT/JP2019/017311 dated Jul. 23, 2019.
Japanese Office Action received in corresponding Japenese Application No. 2021-515362 dated May 23, 2023.
Japanese Office Action received in corresponding Japanese Application No. 2023-197777 dated Jun. 25, 2024.

*Primary Examiner* — Dmitriy Bolotin
(74) *Attorney, Agent, or Firm* — Mattingly & Malur, PC

(57) ABSTRACT

Provided is a technique in which, in arranging a virtual object with respect to a real space, a user has less trouble, usability is good, and the object is suitably placeable. A head mounted display apparatus (HMD apparatus) according to one embodiment has a function of arranging and displaying the virtual object in a space based on an operation by a user. The HMD apparatus displays, on a display surface, a grid including a plurality of points for supporting an operation of the virtual object, and disposes and displays, according to an operation includes designation of a target virtual object and designation of a first point at an arrangement destination, the target virtual object at the position of the first point.

4 Claims, 36 Drawing Sheets

(51) Int. Cl.
 *G02B 27/01* (2006.01)
 *G06F 3/04815* (2022.01)
 *G06F 3/16* (2006.01)
 *G06T 19/00* (2011.01)

(52) U.S. Cl.
 CPC ......... *G02B 27/0179* (2013.01); *G06F 3/017* (2013.01); *G06F 3/04815* (2013.01); *G06F 3/167* (2013.01); *G06T 19/006* (2013.01); *G02B 2027/0187* (2013.01)

(58) Field of Classification Search
 CPC ...... G06F 1/163; G06F 1/1686; G06F 1/1694; G06F 1/3215; G06F 1/3287; G06F 3/011; G06F 3/012; G06F 3/0304; G02B 27/0093; G02B 27/017; G02B 27/0179; G02B 2027/0187; G02B 27/0172; G06T 19/006; Y02D 10/00
 See application file for complete search history.

(56) References Cited

U.S. PATENT DOCUMENTS

| | | |
|---|---|---|
| 2008/0104074 A1 | 5/2008 | Lynch |
| 2009/0327969 A1 | 12/2009 | Estrada |
| 2014/0306993 A1 | 10/2014 | Poulos et al. |
| 2014/0361976 A1 | 12/2014 | Osman et al. |
| 2016/0026242 A1 | 1/2016 | Burns et al. |
| 2018/0059788 A1 | 3/2018 | Noguchi et al. |
| 2019/0121522 A1* | 4/2019 | Davis .................. G06V 40/28 |
| 2019/0164336 A1 | 5/2019 | Chen et al. |
| 2020/0128231 A1 | 4/2020 | Pace et al. |
| 2020/0258193 A1 | 8/2020 | Katsumata |

FOREIGN PATENT DOCUMENTS

| | | |
|---|---|---|
| JP | 6227732 B1 | 11/2017 |
| JP | 2018-20126 A | 2/2018 |
| JP | 2018-049629 A | 3/2018 |

\* cited by examiner

FIG. 2
(A) HMD SIDE SURFACE
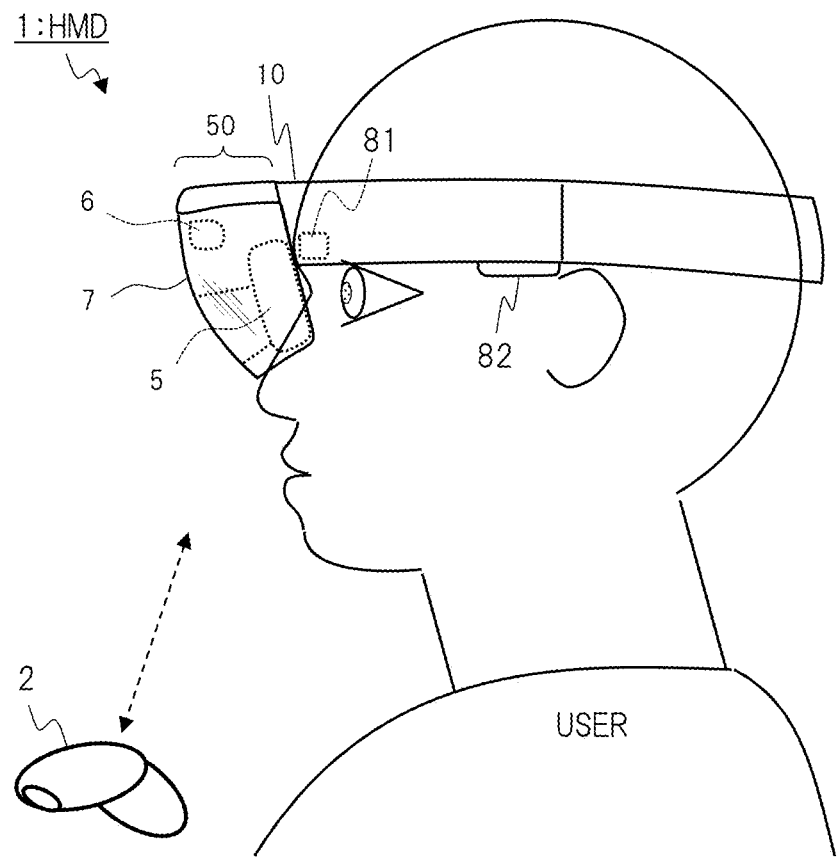
(B) HMD FRONT FACE
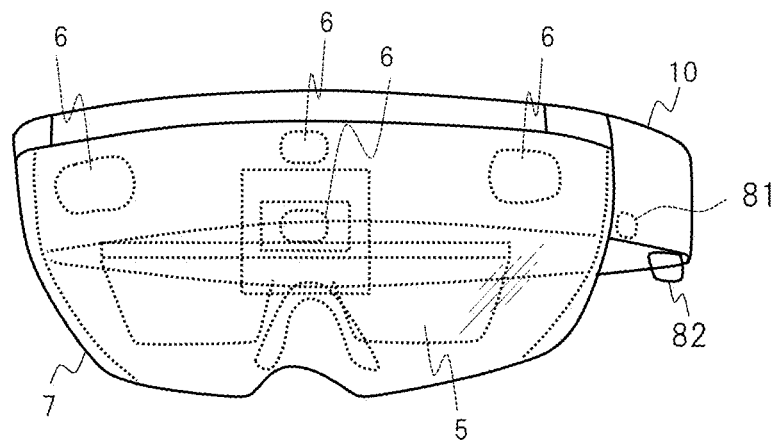

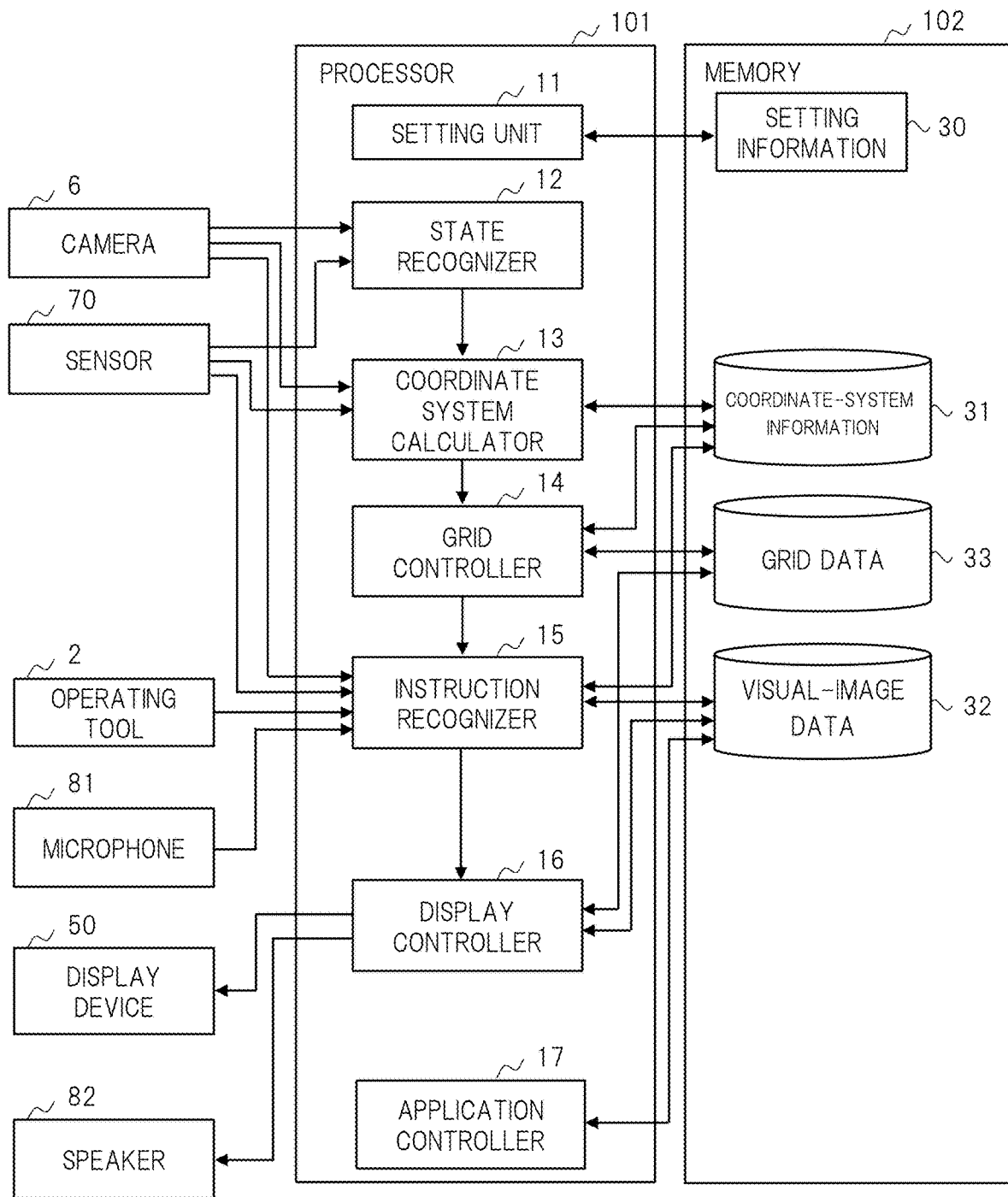

COORDINATE-SYSTEM INFORMATION

701: TABLE

| COORDINATE SYSTEM ID | ORIGIN'S POSITION | FRONT-FACE DIRECTION |
|---|---|---|
| WORLD COORDINATE SYSTEM CS1 | $G1 = (x_{W0}, y_{W0}, z_{W0})$ | $X_W$ (DIR1) |
| LOCAL COORDINATE SYSTEM CS2 | $G2 = (x_{L0}, y_{L0}, z_{L0})$ | $X_L$ (DIR2) |
| INERTIA COORDINATE SYSTEM CS3 | $G3 = (x_{I0}, y_{I0}, z_{I0})$ | $X_I$ (DIR3) |

GRID DATA

801: TABLE

| GRID ID | POINT ID | ARRANGEMENT COORDINATE SYSTEM | ARRANGEMENT-POSITION COORDINATE | DISPLAY FLAG | ID MARK |
|---|---|---|---|---|---|
| K11 | P11 | CS1 | $X_{11}, Y_{11}, Z_{11}$ | DISPLAY(1) | 1 |
| K11 | P12 | CS1 | $X_{12}, Y_{12}, Z_{12}$ | NON-DISPLAY(0) | 2 |
| ...... | ...... | ...... | ...... | ...... | ...... |
| K21 | P21 | CS2 | $X_{21}, Y_{21}, Z_{21}$ | NON-DISPLAY(0) | ...... |
| K21 | P22 | CS2 | $X_{22}, Y_{22}, Z_{22}$ | NON-DISPLAY(0) | ...... |
| ...... | ...... | ...... | ...... | ...... | ...... |
| K31 | P31 | CS3 | $X_{31}, Y_{31}, Z_{31}$ | DISPLAY(1) | ...... |
| K31 | P32 | CS3 | $X_{32}, Y_{32}, Z_{32}$ | NON-DISPLAY(0) | ...... |
| ...... | ...... | ...... | ...... | ...... | ...... |

VIRTUAL-IMAGE DATA

901:TABLE

| VIRTUAL OBJECT ID | FORM (FILE) | ARRANGEMENT COORDINATE SYSTEM | ARRANGEMENT GRID | ARRANGEMENT POINT | ARRANGEMENT DIRECTION | LABEL |
|---|---|---|---|---|---|---|
| V11 | img11.aaa | CS1 | K11 | P11 | Q11 | A |
| V12 | img12.aaa | CS1 | K11 | P12 | Q12 | B |
| ...... | ...... | ...... | ...... | ...... | ...... | ...... |
| V21 | img21.aaa | CS2 | K21 | P21 | Q21 | ABSENT |
| V22 | img22.aaa | CS2 | K21 | P22 | Q22 | ABSENT |
| ...... | ...... | ...... | ...... | ...... | ...... | ...... |
| V31 | img31.aaa | CS3 | K31 | P31 | Q31 | C |
| V32 | img32.aaa | CS3 | K32 | P32 | Q31 | D |
| ...... | ...... | ...... | ...... | ...... | ...... | ...... |

FIG. 12
(A)
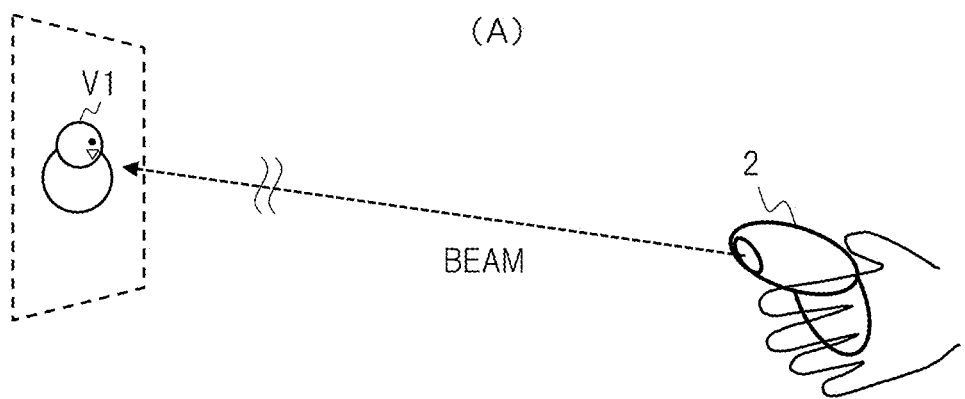
BEAM
(B)
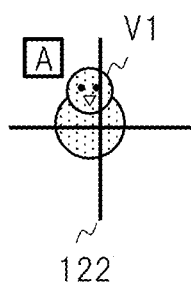
122
(C)
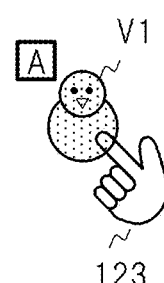
123
(D)
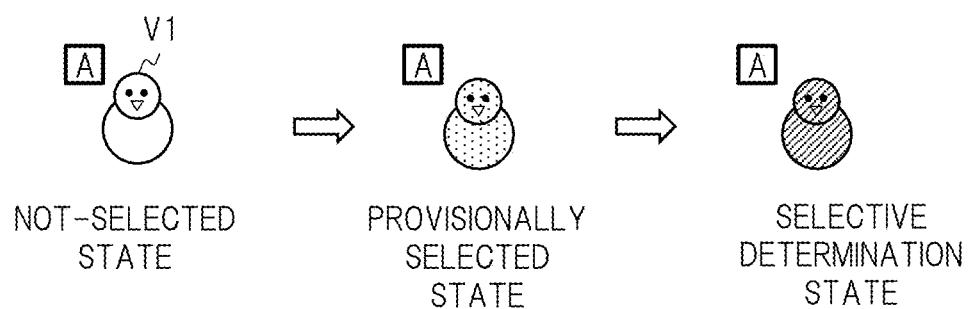
NOT-SELECTED STATE ⇒ PROVISIONALLY SELECTED STATE ⇒ SELECTIVE DETERMINATION STATE FIG. 17
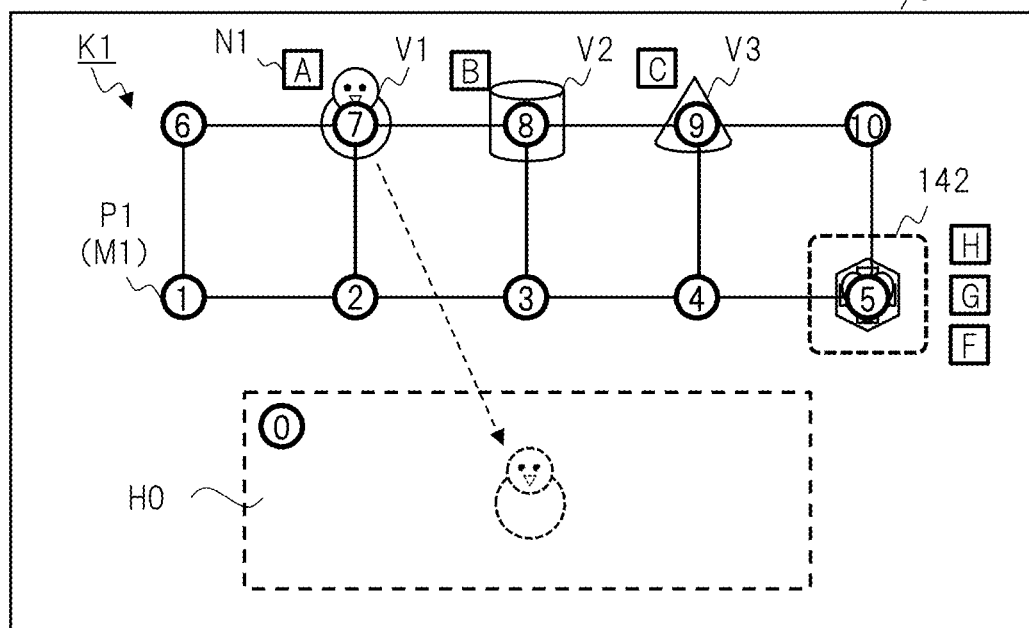
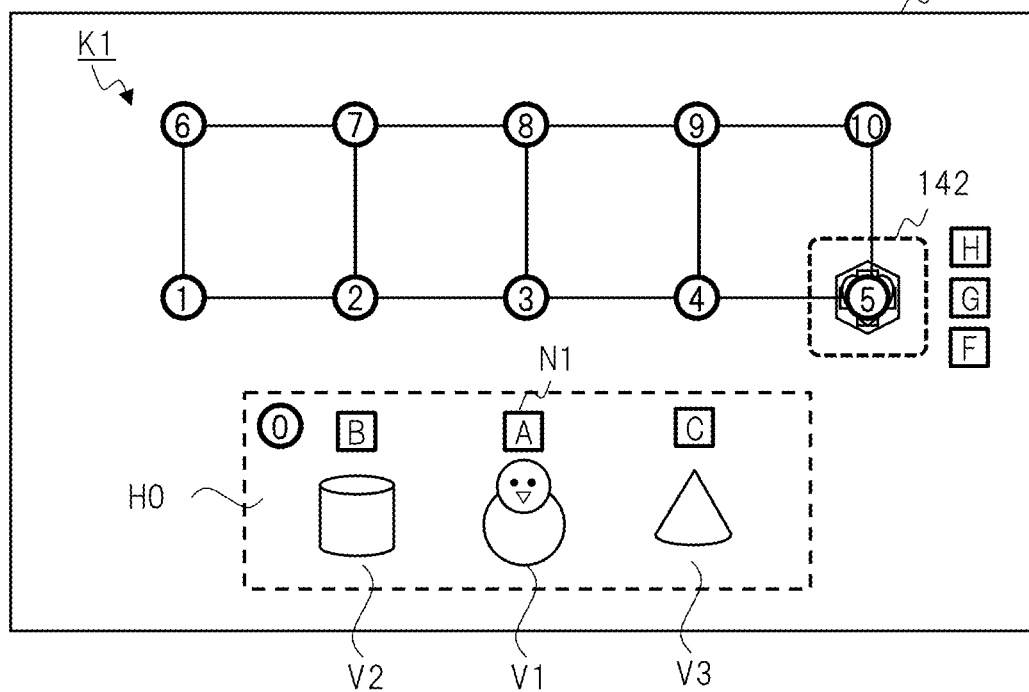

FIG. 19
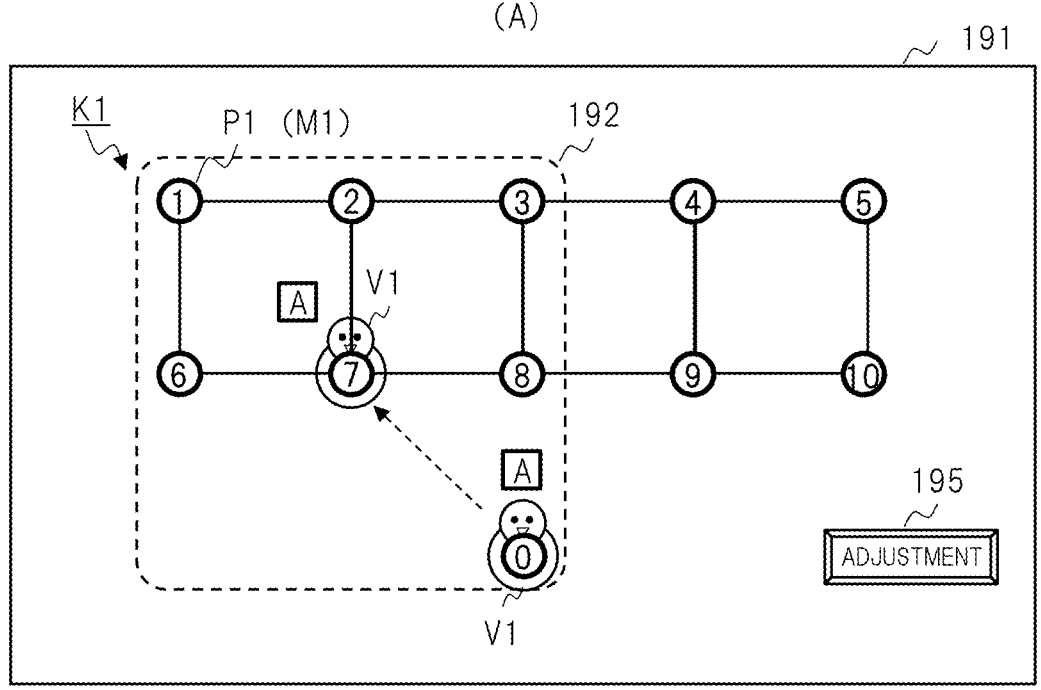
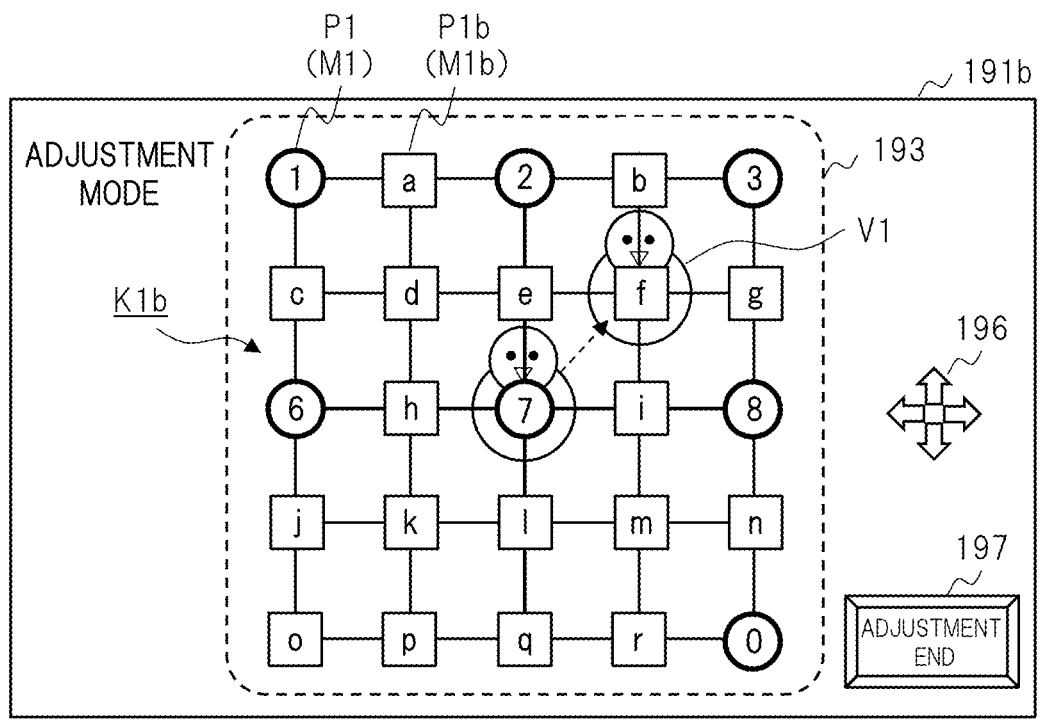

FIG. 22
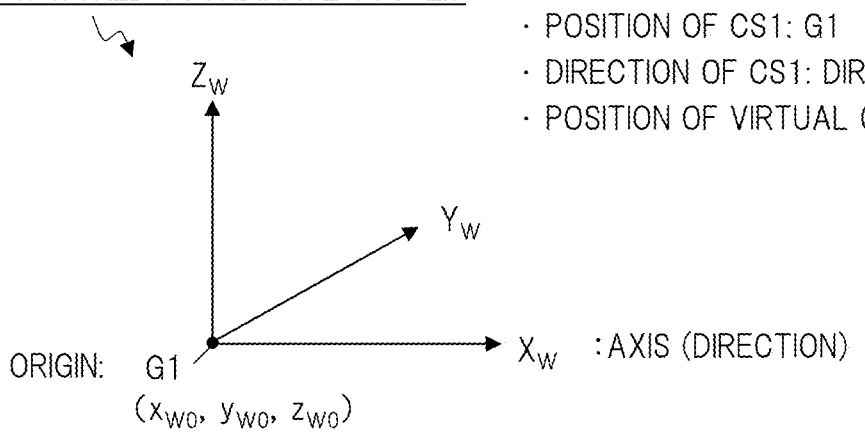
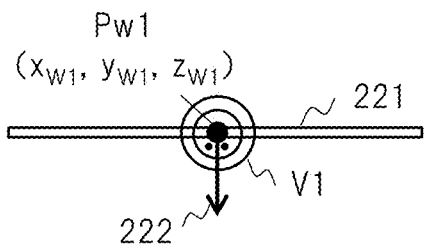
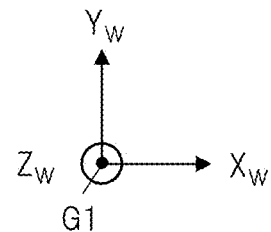
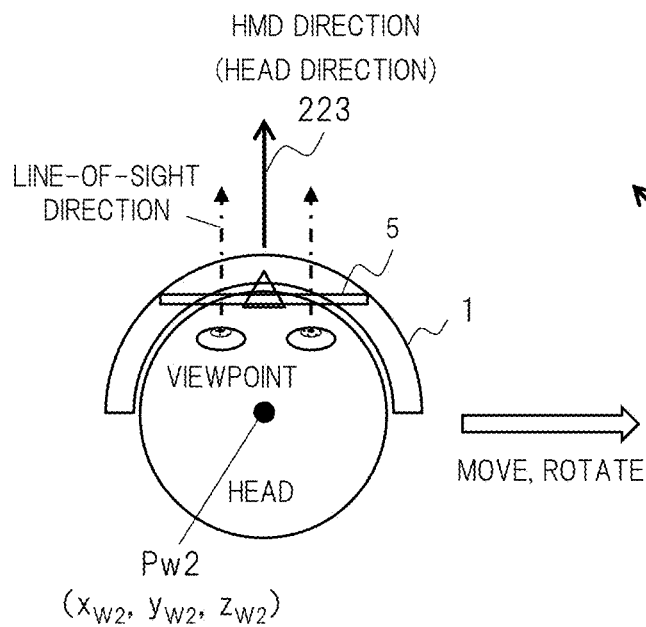

FIG. 23
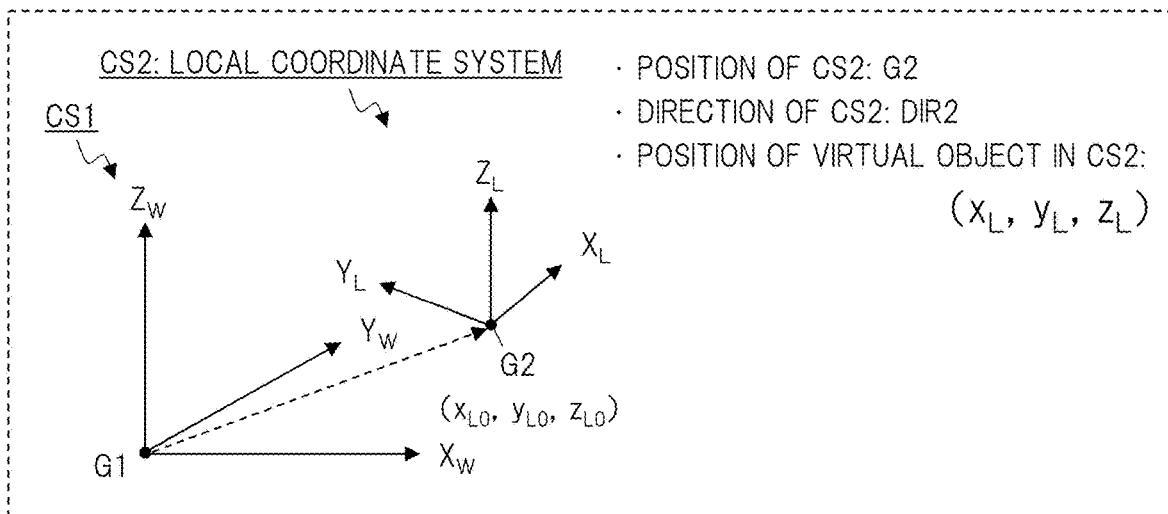
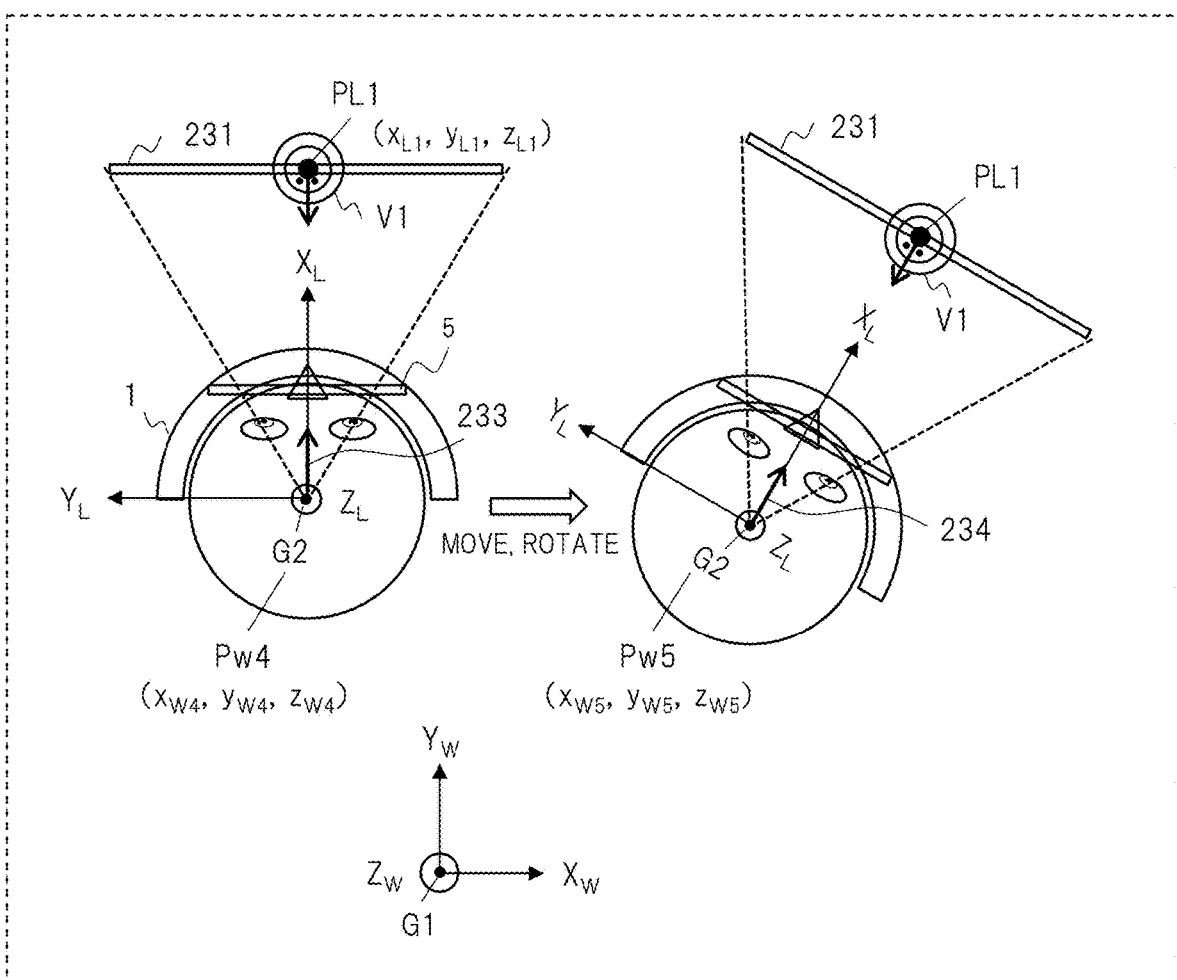

FIG. 25
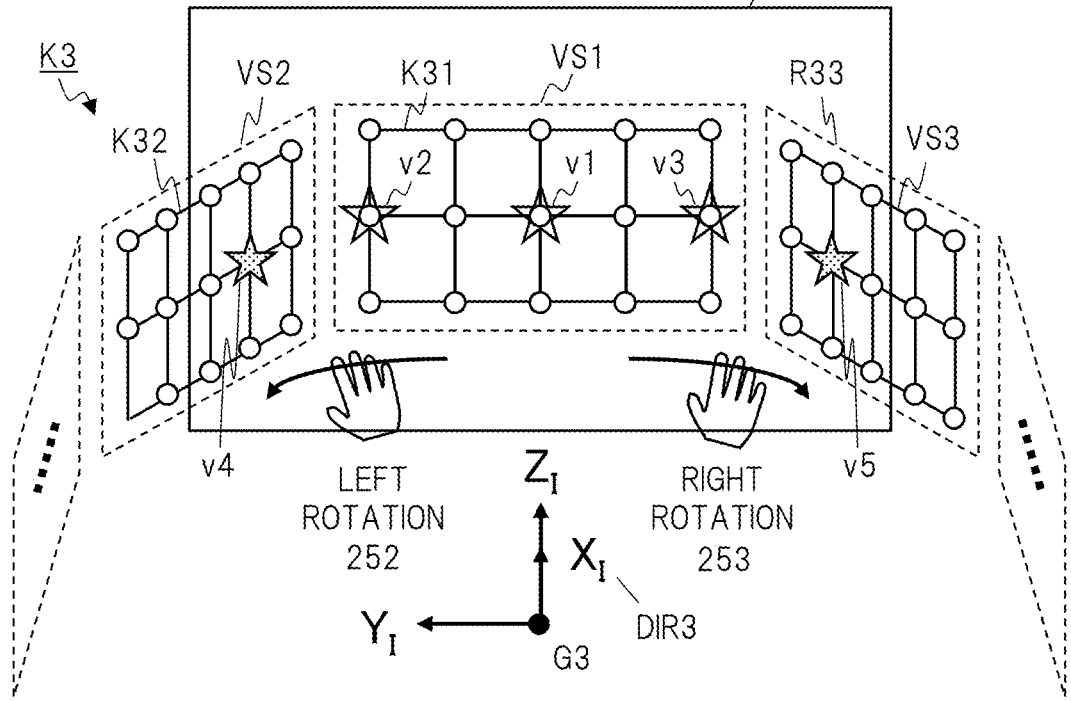
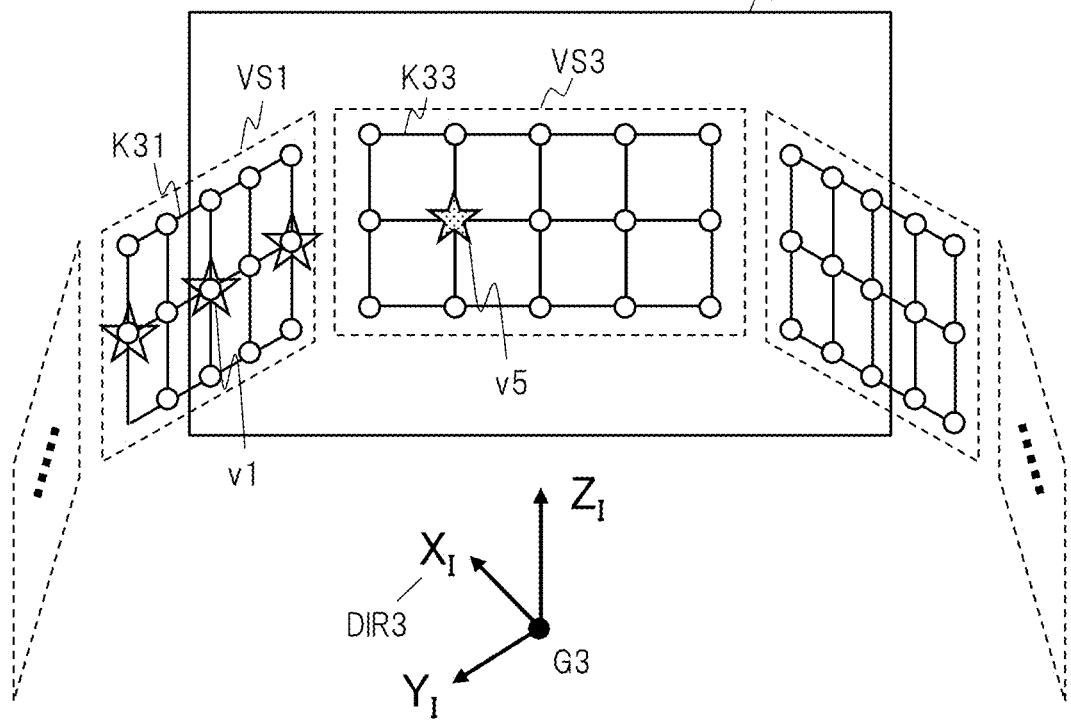

FIG. 29
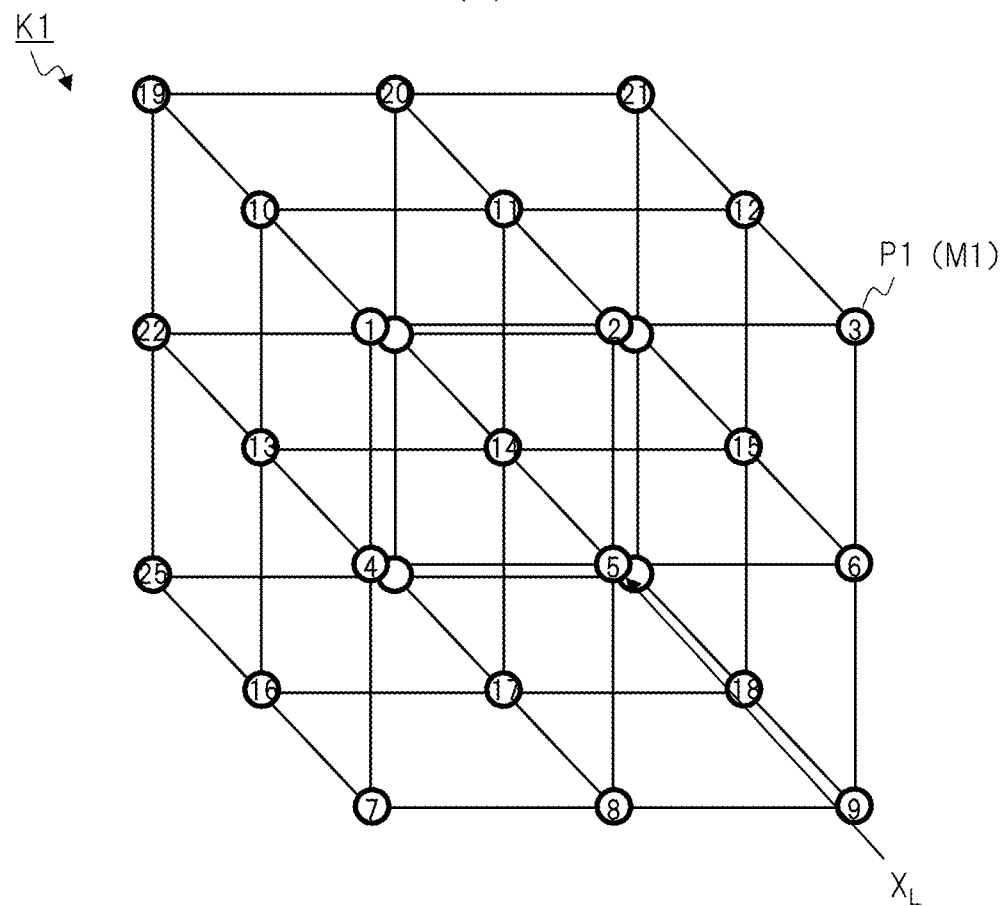
(A)
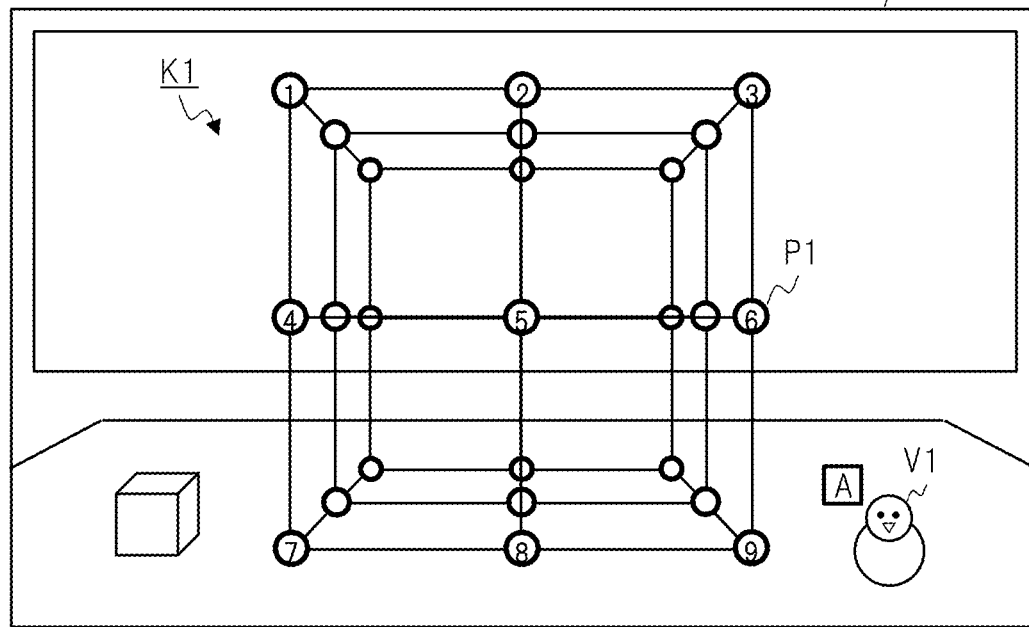
(B)

FIG. 31
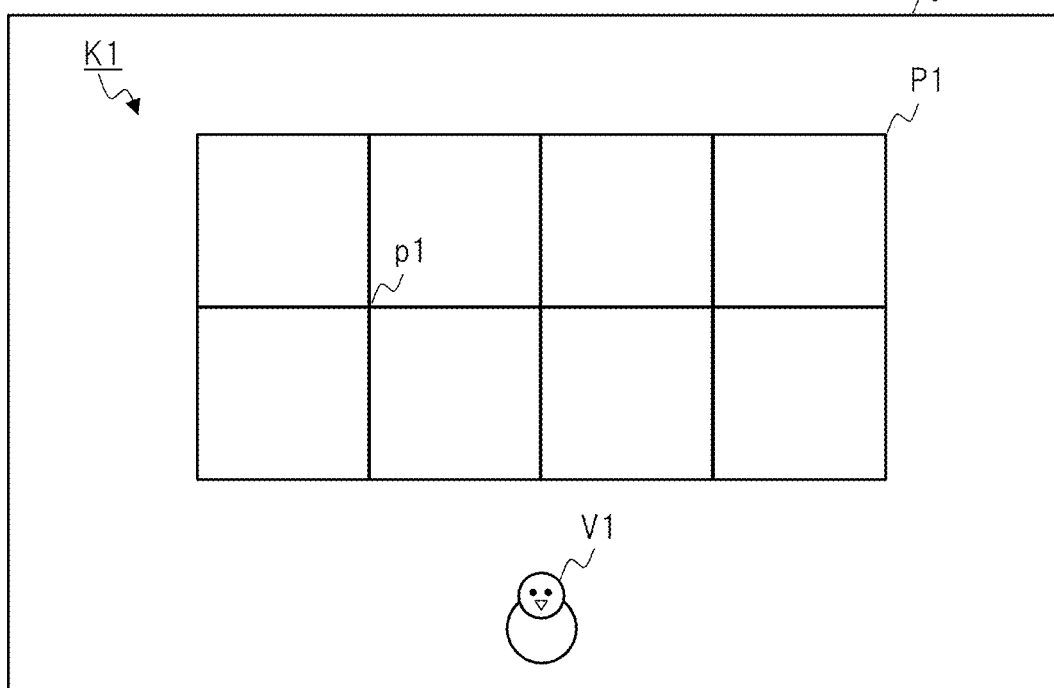
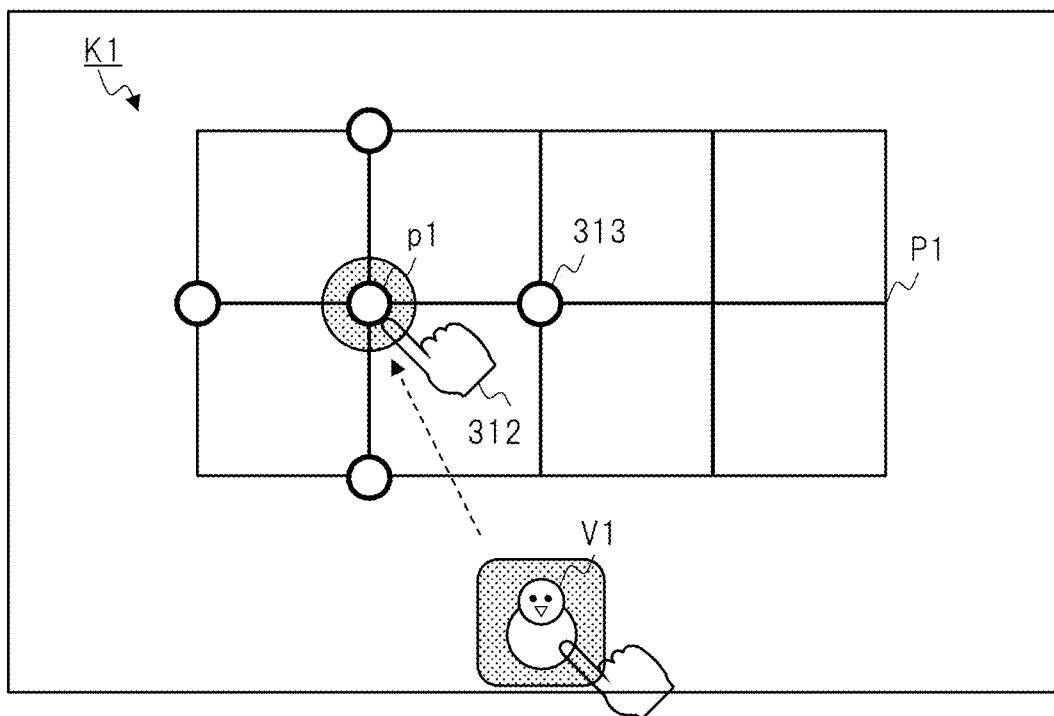

FIG. 35
(A)
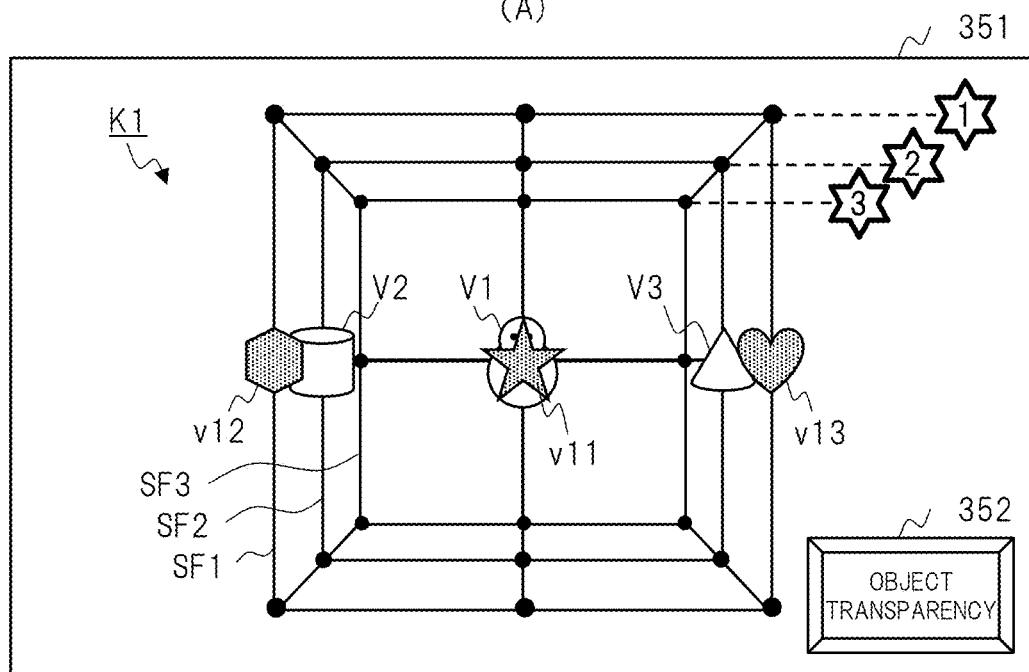
(B)
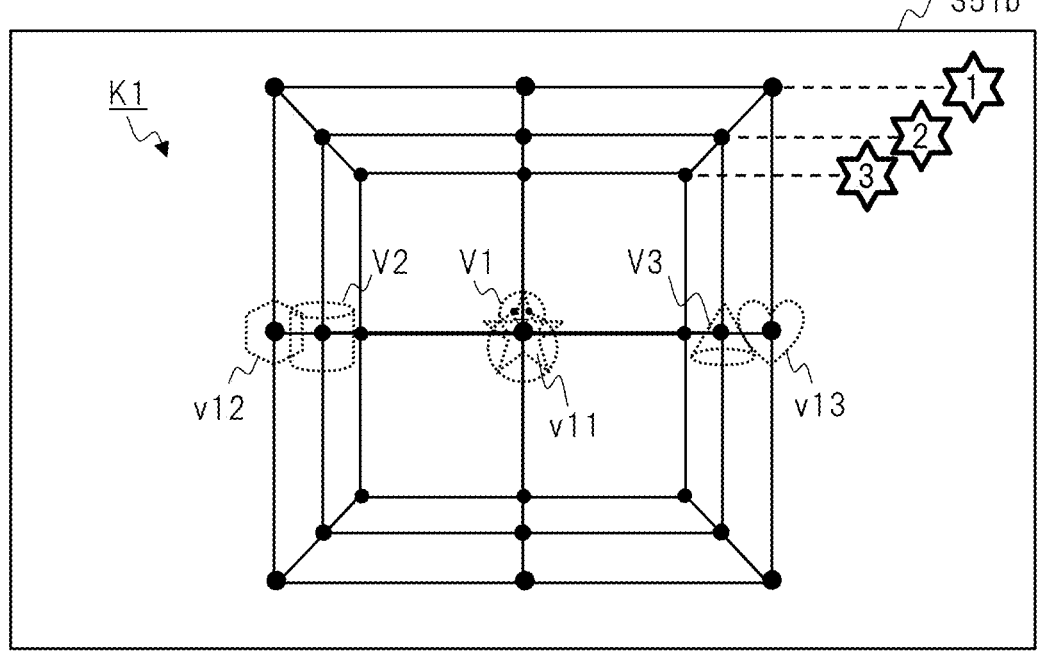

FIG. 39
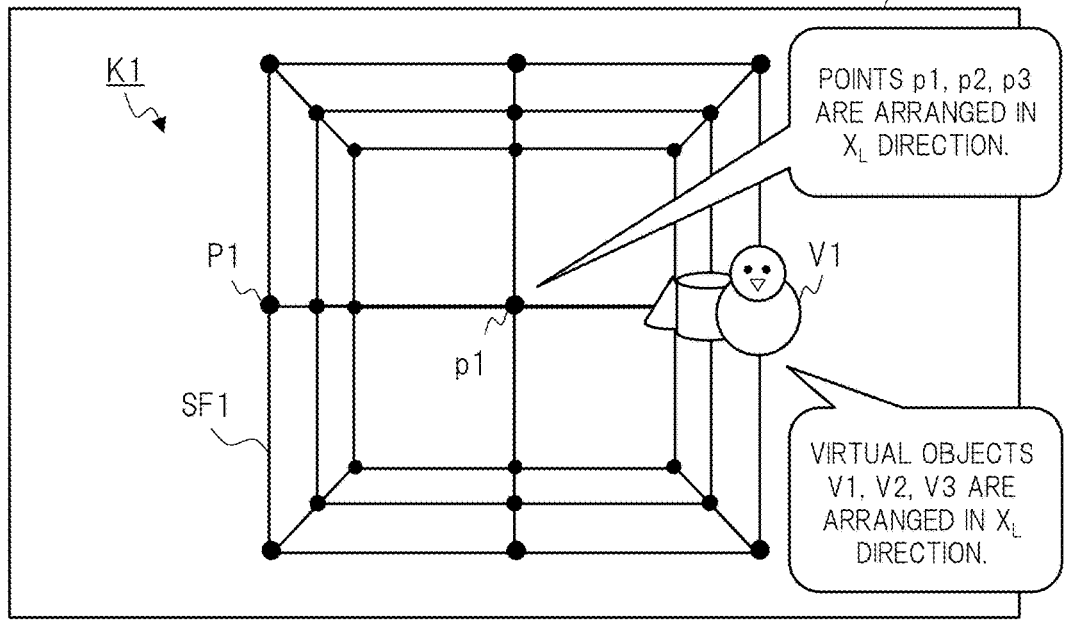
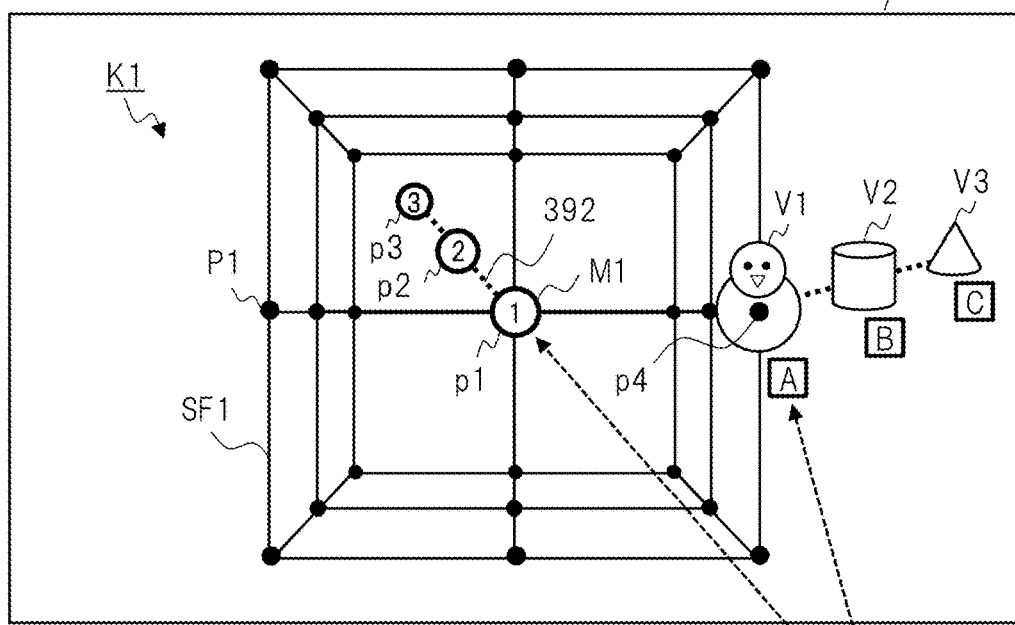
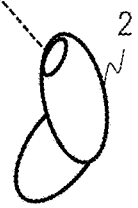

HEAD MOUNTED DISPLAY APPARATUS

TECHNICAL FIELD

The present invention relates to a technique of a display apparatus such as a head mounted display (HMD) apparatus. Further, the present invention also relates to a technique for arranging a virtual object in a real-space scene with respect to VR (Virtual Reality), AR (Augmented Reality), MR (Mixed Reality) and the like.

BACKGROUND ART

Display apparatuses such as HMDs including smart glasses etc., are improving in performance. The HMD can be arranged and displayed so as to superimpose a virtual object (sometimes referred to as a virtual image) on a real object (corresponding real image) in a real-space scene seen from a user's viewpoint. Images include still images and moving images.

As an example of a conventional technique related to the above-mentioned display apparatus, Japanese Patent Application Laid-Open No. 2018-49629 (Patent Document 1) can be raised. As a method etc. of supporting an input in a virtual space, Patent Document 1 discloses a method of facilitating arrangement of objects and the following method. This method displays the virtual space on a monitor of the HMD, arranges an object, which becomes an arrangement target, and a guide object (for example, grid) in the virtual space, moves the guide object back and forth in conjunction with movement of a hand object, and arranges the object at a designated location.

RELATED ART DOCUMENTS

Patent Documents

Patent Document 1: Japanese Patent Application Laid-open No. 2018-49629

SUMMARY OF THE INVENTION

Problems to be Solved by the Invention

In recent HMDs, a space in which the virtual objects can be arranged and displayed is expanded. Consequently, it is desirable that the HMD is equipped with a function of supporting a user's operation related to the arrangement of the virtual objects. In a conventional HMD in arranging the virtual objects in the space, a user has taken a lot of troubles with an operation and/or has been less likely to operate it, so that there is room for improvement in terms of usability and support. In particular, in the conventional HMD, when it is desired to arrange a large number of virtual objects in a display surface seen from the user's viewpoint, it takes a lot of time and effort and the number of arranged virtual objects is limited and even if a large number of virtual objects can be arranged, it is difficult to see and work etc. them.

Incidentally, the method of Patent Document 1 is used as a guide for displaying a grid line as a guide object in the virtual space and arranging the virtual object by the user. In this method, by using a hand object (a movement-operation virtual object that imitates a hand) to move the virtual object, the arrangement of the virtual object is realized with respect to the grid line. This method is used, for example, as a guide in stacking boxes in a game.

The present invention relates to a technique of a display apparatus such as an HMD and provides a technique capable of hardly taking a lot of user's troubles, having good usability, and being preferably arranged in arranging the virtual objects in the real space. Problems and effects other than the above will be described in an embodiment(s) for carrying out the invention.

Means for Solving the Problems

A typical embodiment of the present invention has a configuration as shown below. A head mounted display apparatus according to one embodiment is a head mounted display apparatus arranges and displays a virtual object in a space based on a user's operation, the head mounted display apparatus including: displaying a grid on a display surface, the grid including a plurality of points for supporting an operation of the virtual object; and according to an operation including designation of a target virtual object and designation of a first point at an arrangement destination, arranging and displaying the target virtual object at a position of the first point.

Effects of the Invention

According to a typical embodiment of the present invention, regarding the technique of the display apparatus such as an HMD, when the virtual object is arranged in the real space, the user has less trouble, has good usability, and can preferably arrange it.

BRIEF DESCRIPTION OF THE DRAWINGS

FIG. 2 is a view showing a configuration example of an appearance of the HMD apparatus according to the first embodiment;

FIG. 6 is a view showing a processor and a data configuration that constitute a basic function of the HMD apparatus in the first embodiment;

FIG. 7 is a view showing a configuration example of coordinate-system information in the first embodiment;

FIG. 8 is a view showing a configuration example of grid data in the first embodiment;

FIG. 9 is a view showing a configuration example of virtual image data in the first embodiment;

FIG. 12 is a view showing input operation examples in various operating methods in the first embodiment;

FIG. 17 is a view showing another display control example in the first embodiment;

FIG. 19 is a view showing another display control example in the first embodiment;

FIG. 22 is an explanatory diagram of a world coordinate system in the first embodiment;

FIG. 23 is an explanatory diagram of a local coordinate system in the first embodiment;

FIG. 25 is a view showing a configuration example and the like of a case where a grid is arranged in the inertia coordinate system in the first embodiment;

FIG. 29 is a view showing a configuration example of a three-dimensional grid as a grid in the first embodiment;

FIG. 31 is a view showing a display example of a grid or the like in a modification example in the first embodiment;

FIG. 35 is a view showing another display control example of the three-dimensional grid in the first embodiment;

FIG. 39 is a view showing another display control example of the three-dimensional grid in the first embodiment.

DETAILED DESCRIPTION OF PREFERRED EMBODIMENTS

Figure 1:
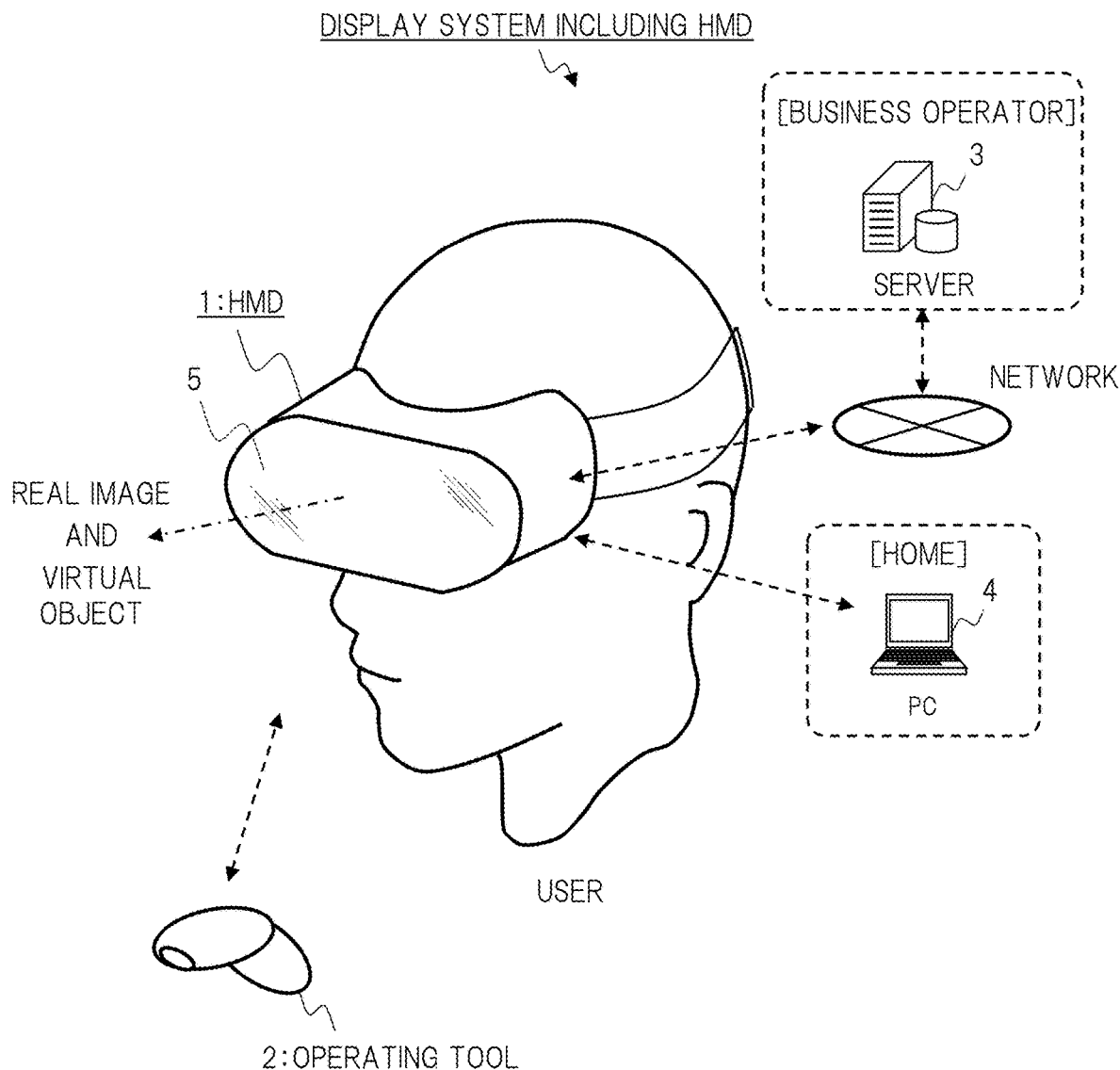
FIG. 1 is a view showing a configuration of a display system including an HMD apparatus according to a first embodiment of the present invention.

Hereinafter, an embodiment of the present invention will be described in detail with reference to the drawings.

Problems Etc.

A problem etc. of an HMD of a conventional technique example will be complemented. In an HMD of a comparative example with respect to an embodiment, a virtual object(s) is placed in a predetermined position based on a user's operation in a real-space scene seen on a display surface, and the virtual object is moved from one position to another position. An operating method at that time includes, as a known technique, a gesture method, a method using an operating tool, a voice recognition method, and the like. The gesture method is a method in which movement of a finger in a space is detected as a gesture based on a camera image or the like and the gesture is associated with a command. The method using the operating tool is a method in which an operation of a beam or a button by the operating tool (so-called remote controller) of the HMD is associated with a command. The voice recognition method is a method of detecting a user's voice and associating it with a command.

In arranging or moving the virtual object in a space by using either operating method, for example, the following series of operations are required as detailed operation contents of the user. That is, the user needs such operations as to select a target virtual object, move the target virtual object to a position of an arrangement destination or a movement destination by an operation such as dragging, and confirm the arrangement or movement at that position.

When wanting to handle a large number of virtual objects, the user needs to repeat such operations for each virtual object. Such operations are laborious, time-consuming, and may not be convenient to the user. Further, in such operations, since an arrangement position of the virtual object is determined at an end of the operations, it may be difficult for the user to accurately or quickly arrange the virtual object at a desired position in the space. Furthermore, in particular, in arranging or moving the virtual object in front (in other words, in a depth direction) of the HMD and a user's viewpoint in the space, such operations may also be difficult to handle or perform for the reason of a far distance etc. to a target position.

In addition, an HMD of a comparative example uses a known world coordinate system or local coordinate system as a coordinate system for managing the arrangement position of the virtual object in the space. The world coordinate system is a coordinate system fixed in the real space. Since a space of the world coordinate system can be made wide, the number of arranged virtual objects can be increased. The local coordinate system is a coordinate system fixed to a display surface when being viewed from the HMD and the user's viewpoint. A positional relationship between the virtual object arranged in the local coordinate system and the display surface is fixed. That is, the virtual object is fixed at a predetermined position on the display surface. Even when the virtual object is arranged in the local coordinate system of the display surface and when the user moves or changes a direction of his/her head, the position of the virtual object in the display surface is maintained.

However, in the HMD of the comparative example, it may be difficult for the user to arrange a large number of virtual objects only by using those two types of coordinate systems and to operate (work). The virtual object arranged in the world coordinate system is fixed at a position of a place in the space where the user is present. When the user moves away from the place, the virtual object becomes invisible or difficult to see from the user. Regarding the virtual object arranged in the local coordinate system, a size of a region of the display surface or in a visual-field range is limited, so that the number of arranged virtual objects is limited. Even if a large number of virtual objects can be arranged in the display surface, it is difficult for the user to see both the real object and the virtual object, in other words, the visibility is lowered and it is difficult for the user to operate (work). For example, when it is desired to appropriately switch and arrange the virtual object(s) that the user wants to frequently refer to for work on the display surface, such an operation is troublesome.

In consideration of the above problems and the like, the present invention proposes a new method for user's operation related to the arrangement and display of the virtual object of the HMD, thereby improving operability and usability and improving easiness and efficiency etc. of work for using the visual object.

First Embodiment

An HMD apparatus according to a first embodiment of the present invention will be described with reference to FIGS. 1 to 39. An HMD apparatus of a first embodiment provides a new method for supporting an operation of arranging and moving a virtual object(s) by a user, a man-machine interface including a graphical user interface (GUI), and the like. This HMD apparatus sets a grid including a plurality of points that can be used as an arrangement reference of the virtual object in a real space (corresponding virtual space) managed by using a coordinate system. This point can be rephrased as a reference point, a grid point, or the like. The user can place the virtual object at this point according to a predetermined operation. As a predetermined operation, the user designates a target virtual object to be arranged or moved, and designates a point (first point) corresponding to a position of an arrangement destination or a movement destination. According to this operation, the HMD apparatus arranges or moves the target virtual object at a position of the first point on a grid in the space and displays it on the display surface. By this basic operation, the arrangement or movement of one virtual object can be realized with less effort. In addition, by a mechanism described later, arrangement or movement of a plurality of virtual objects can also be realized with less effort.

[Display System]

FIG. 1 shows a configuration of a display system including an HMD apparatus of a first embodiment. This display system includes: an HMD 1 which is the HMD apparatus of the first embodiment; a server 3 and a PC 4 which are connected to the HMD 1 by communication; and the like. The HMD 1 includes an operating tool 2. The user wears the HMD 1 on his/her head and uses it. The operating tool 2 is a remote controller communicating with a main body, can be operated by the user with a finger(s), and is one of input means. In a field of view in front of the user, virtual objects (corresponding virtual images) are superimposedly displayed on a scene including a real thing(s) in a real space through a display surface 5. The HMD 1 can cooperate with an apparatus such as a server 3 of a business operator or a PC 4 of a user's home by communication. The server 3 and the PC 4 may, for example, provide various application programs and data of virtual objects to the HMD 1 and store (save) data of the HMD 1. Further, a function described later may be realized by a method of linking the HMD 1 and the server 3 (client-server method or the like).

The HMD 1 communicates with the operating tool 2 by, for example, short-range wireless communication to transmit and receive signals. Incidentally, a form of not using the operating tool 2 is also possible. The operating tool 2 includes buttons and sensors. For example, the user operates the operating tool 2, indicates the virtual object or the like with a beam(s) from the operating tool 2, and presses the button on the operating tool 2. The HMD 1 recognizes the user's operation in response to a signal from the operating tool 2, and interprets it as a predetermined command, for example, as selection or execution of the virtual object. A keyboard, a mouse, or the like may be used as another input means.

[HMD]

FIG. 2 shows a configuration example of an appearance of the HMD 1. (A) shows a view seen from a side surface of the user wearing the HMD 1, and (B) shows a view seen from a front face of the HMD 1. In (A), the HMD 1 has a housing 10 worn on the user's head and a display device 50 connected to the housing 10. A substrate or the like is built in the housing 10, and a microphone 81, a speaker 82, or the like is provided. The display device 50 is arranged in front of both eyes of the user. The display device 50 includes a display surface 5, a camera 6, a cover lens 7, and the like. The display surface 5 is, for example, a transmissive type display device, which includes two lenses arranged close to both eyes. The cover lens 7 is arranged in front of the display surface 5, and includes, for example, one transmissive type lens. The camera 6 includes a plurality of cameras. The display device 50 can apply a projection type display device or the like, and is not particularly limited.

A display method including the display surface 5 of the HMD 1 is a transmissive type, but it can be similarly applied also to a non-transmissive type (VR type). In a case of the transmissive type, superimposedly displaying the virtual object on a real image is possible. In a case of the VR type, compositely displaying the virtual object on an image(s) or the like taken by a camera is possible. Incidentally, in the case of the VR type, a VR space can be displayed in the field of view based on the known technique. For example, the user can feel a sense moving in the VR space by operating the operating tool 2 without moving his/her body. The user can arrange the virtual object in the VR space by the operation. The VR space is, for example, a video game space or the like created by a three-dimensional CAD. In a case of the transmissive type, the world coordinate system is set in the real space. In a case of the VR type, the world coordinate system is set in the VR space.

The HMD 1 has a controller built in the housing 10 or the display device 50. The controller includes a processor, a memory, an OS, an application program(s), a communication interface(s), and the like. The controller includes a voice recognition function and the like. The HMD 1 uses the voice recognition function to recognize user's voice, and associates the voice with a command or the like. The HMD 1 also has various built-in sensors. The housing 10 is also provided with an operation button, a connector(s), a battery, and the like. Examples of the communication interface include wireless LAN, mobile network communication standard, USB, Bluetooth (registered trademark), an infrared communication method (for example, IrDA), Zigbee (registered trademark), HomeRF (registered trademark), a RFID method, and the like.

In (B), the HMD 1 includes a plurality of microphones 81 and a plurality of speakers 82 at positions including left and right sides of the housing 10. The HMD 1 includes a plurality of cameras 6 at a plurality of positions with respect to the cover lens 7. The plurality of cameras 6 include an RGB camera for imaging a field of view, a camera for detecting gestures, a camera for forming a distance measuring sensor, a camera for forming a line-of-sight detection sensor, and the like. The HMD 1 uses images taken by the plurality of cameras 6 and detection information of the sensors to perform a variety of detection and control. In the HMD 1 of this example, the virtual object can be formed at a position within a distance range of, for example, 0.5 m to 5 m forward from the user's viewpoint through the display surface 5.

[HMD—Function Block]

Figure 3:
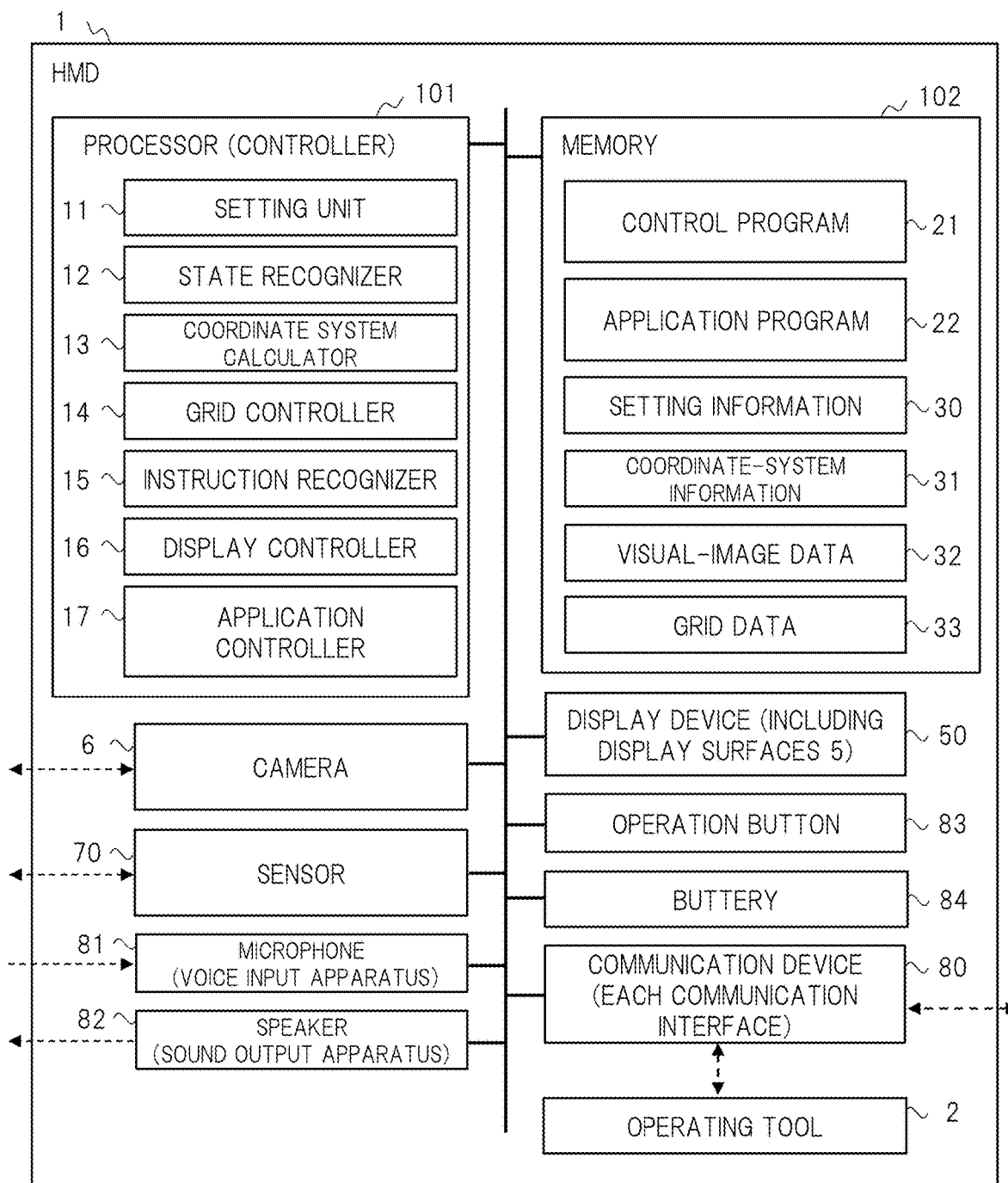
FIG. 3 is a view showing a functional block configuration of the HMD apparatus according to the first embodiment.

FIG. 3 shows an example of a functional block configuration of the HMD 1. The HMD 1 includes a processor 101, a memory 102, a display device 50, a camera 6, a sensor 70, a communication device 80, a microphone 81, a speaker 82, an operation button 83, a battery 84, and the like, and these are connected to each other via buses or the like. The processor 101 includes a CPU, GPU, ROM, and RAM, etc., constitutes a controller of the HMD 1, and executes processings of an OS and an application. The processor 101 realizes each function by executing the processings according to the program. The processor 101 has a setting unit 11, a state recognizer 12, a coordinate calculator 13, a grid controller 14, an instruction recognizer 15, a display controller 16, and an application controller 17, etc. as a processing unit configured based on hardware and software programs.

The memory 102 is composed of a non-volatile storage device or the like, and stores various pieces of data and information handled by the processor 101. For example, stored in the memory 102 are a control program 21, an application program 22, setting information 30, coordinate-system information 31, virtual-image data 32, grid data 33, and the like. The memory 102 also stores image data taken by the camera 6, detection information of a sensor 70, and the like. The control program 21 is a program that realizes later-described basic functions of the HMD 1 of the first embodiment. The application program 22 includes a known program related to generation of the virtual object, and includes, for example, a three-dimensional CAD program.

The display device 50 includes the display surface 5 of FIG. 2 and is driven so as to display, on the display surface 5, a virtual image corresponding to the virtual object according to the control from the processor 101. The camera 6 includes a plurality of cameras, and each camera images incident light through the lens with an imaging element and acquires it as an image. The sensor 70 includes various sensors, and includes a GPS receiver, a geomagnetic sensor, an inertia sensor (gyro sensor and acceleration sensor), and the like. The sensor 70 includes a posture detection sensor that detects each posture state of the user and the HMD 1. The GPS receiver obtains position information by positioning. The geomagnetic sensor can detect an azimuth and, when using a three-axis type, can detect movement of a user's head. The inertia sensor detects an angle, an angular velocity, and acceleration that correspond to a direction, motion, and an inertia state of the HMD 1. The acceleration senser can detect acceleration of three axes and capture a vertical direction from a change in positions of the HMD 1 and a direction of the gravitational acceleration. The gyro sensor detects an angular velocity of each rotational direction of the three axes of the HMD 1. The gyro sensor detects an angle representing a posture (for example, a direction of the local coordinate system with respect to a direction of the world coordinate system) of the HMD 1 from the angular velocity. This angle can be represented by known Euler angles (pitch angles, yaw angles, and roll angles) or normalized quaternions.

Incidentally, quaternion is a number system that extends complex numbers. Use of the quaternion makes it possible to handle rotation (conversion between corresponding coordinate systems) of a vector in a three-dimensional space with a small amount of calculation. The quaternion is represented by a four-dimensional vector. A predetermined calculation result using a rotational axis and a rotational angle is stored in each vector component. If it is assumed that the quaternion is q, the quaternion is represented by $q=w+xi+yj+zk$, where (w, x, y, z) is a real number. (i, j, k) satisfies $i^2=j^2=k^2=-1$, $ij=-ij=k$, $jk=-kj=ki=-ik=j$. A product of quaternions becomes a quaternion. Calculation of a product of a rotational matrix using Euler angles can be expressed by calculation using a product of quaternions.

The HMD 1 uses the camera 6 and the sensor 70 to detect a position of the user, a reference direction of the user, movement (motion) and a direction of the head, a line-of-sight direction, positions of the fingers, a gesture, and the like. The HMD 1 may detect feature points of a real thing from the image of the camera 6 and grasp a structure of the real thing. The HMD 1 includes a distance measuring sensor and a line-of-sight detection sensor configured by using the camera 6 and the sensor 70. The distance measuring sensor is a sensor that measures a distance (in other words, depth) to a position of a target object seen from the user's viewpoint (position of the corresponding HMD 1). The line-of-sight detection sensor is a sensor that measures the line-of-sight direction (position of the corresponding display surface) of the user. The methods of the distance measuring sensor and the line-of-sight detection sensor are not limited.

The microphone 81 is a voice input apparatus including a plurality of microphones. Using a plurality of input voices of the plurality of microphones makes it possible to detect directivity of sound in a three-dimensional space. The speaker 82 is a sound output apparatus including a plurality of speakers. Using a plurality of output sounds of the plurality of speakers makes it possible to generate stereophony in the three-dimensional space. The operation button 83 includes a power on/off button, a brightness adjustment button, a volume adjustment button, and the like. The battery 84 supplies electric power to each part based on charging. The communication device 80 includes parts such as an antenna and an IC corresponding to various communication interfaces, and performs short-range wireless communication with the operating tool 2 and communication with an external base station, a server 3, a PC 4, and the like.

The setting information 30 is system setting information and user setting information related to basic functions. The coordinate-system information 31 is information for managing the three types of coordinate systems described later. The virtual-image data 32 is data for displaying the virtual object on the display surface 5. The grid data 33 is data for managing the grid described later.

The processor 101 stores, in virtual image data 32, data of the virtual object generated by the OS or the application, or data of the virtual object acquired from the server 3, the PC 4, or the like. The HMD 1 receives, from the operating tool 2, input operation information based on an operation(s) of the operating tool 2 by the user, interprets the input operation information, and associates it with a command or the like. The HMD 1 uses the image of the camera 6 and the detection information of the sensor 70 to recognize a scene of the user's field of view, posture states of the user and the HMD 1, the line-of-sight direction of the user, the distance to the object, and the like.

[HMD—Display Surface]

Figure 4:
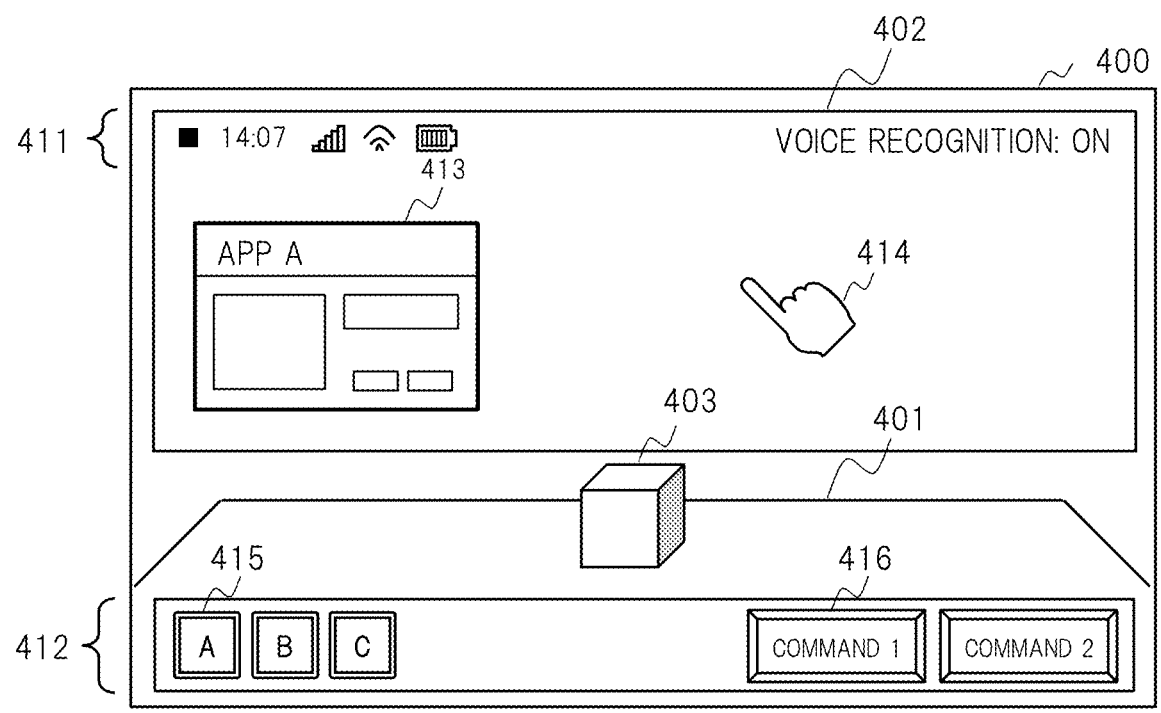
FIG. 4 is a view showing display examples of a real object and a virtual object on a display surface in the first embodiment.

FIG. 4 shows display examples of a real thing and a virtual object on the display surface of the HMD 1. In this example, in an image 400 on the display surface 5, a work table 401 and a whiteboard 402 in front of the user are shown as real things, and a cubic real thing 403 is placed on the work table 401. In this example, a plurality of virtual objects are superimposedly displayed on the display surface 5. The virtual object may be a GUI image besides an image of an object having a two-dimensional shape or a three-dimensional shape. An image example of an GUI of the virtual object includes system information 411, a menu field 412, an application window 413, and a cursor 414. The system information 411 is images showing a time, a battery state, a communication state, a volume state, a state of a voice recognition function, and the like. Images of application icons 415 and command buttons 416, etc. are displayed in the menu field 412 (in other words, launcher field). The application icon 415 is an image of an icon representing an application (application program 22), and has, for example, a two-dimensional rectangular shape. When the application icon 415 is selected and executed by the user, the corresponding application is started and, for example, the application window 413 is displayed. When the command button 416 is selected and executed by the user, a processing of the corresponding command is executed. The display of the menu field 412 and the like can be turned on/off according to the operation of the user and the state of the HMD 1. Other items such as a bookmark of a Web browser and a file icon may be arranged in the menu field 412. The items arranged in the menu field 412 can be set by the user.

The application window 413 is displayed in an application running state and has a two-dimensional rectangular shape. A position and a size of the application window 413 and on/off states of their display can be adjusted by the user. An image generated by the corresponding application program 22 is displayed in the application window 413. The cursor 414 can be moved in response to the operation of the user, for example, an operation of the operating tool 2, and can perform selection and operation etc. of the virtual object. The cursor 414 shows an example of a finger-shaped cursor, but is not limited to this and a point shape, an arrow shape, a cross shape, or the like can be used.

In this way, the virtual object or the like constituting the GUI of the HMD 1 can be arranged in the display surface 5. The HMD 1 can place such a GUI virtual object at a predetermined position in the display surface 5 by using the local coordinate system described later. A predetermined region in the display surface 5 may be set as a fixed region for arranging the GUI. Further, the HMD 1 controls a positional relationship between the real thing and the virtual object based on the recognition of the real thing from the image of the camera 6. For example, the HMD 1 can arrange and display the virtual object at a position aligning with a face of the work table 401 or a face of the whiteboard 402. Furthermore, for example, when the virtual object is arranged on a lower side of the work table 401 or a back side of the whiteboard 402, the HMD 1 does not display the virtual object on the display surface 5.

As an example of user's work and application, a model created by a three-dimension CAD application is displayed as an image of the virtual object so as to be ranged against the real thing 403 on the work table 401 in the space, and an example in which a three-dimensional shape etc. of the model are confirmed from respective directions by the user is given. As another example, an example in which the user arranges the two-dimensional virtual image on the face of the whiteboard 402 so as to be pasted is given. The HMD 1 may set the grid described later so as to match with a plane of the real thing.

[HMD—OS and Application]

Figure 5:
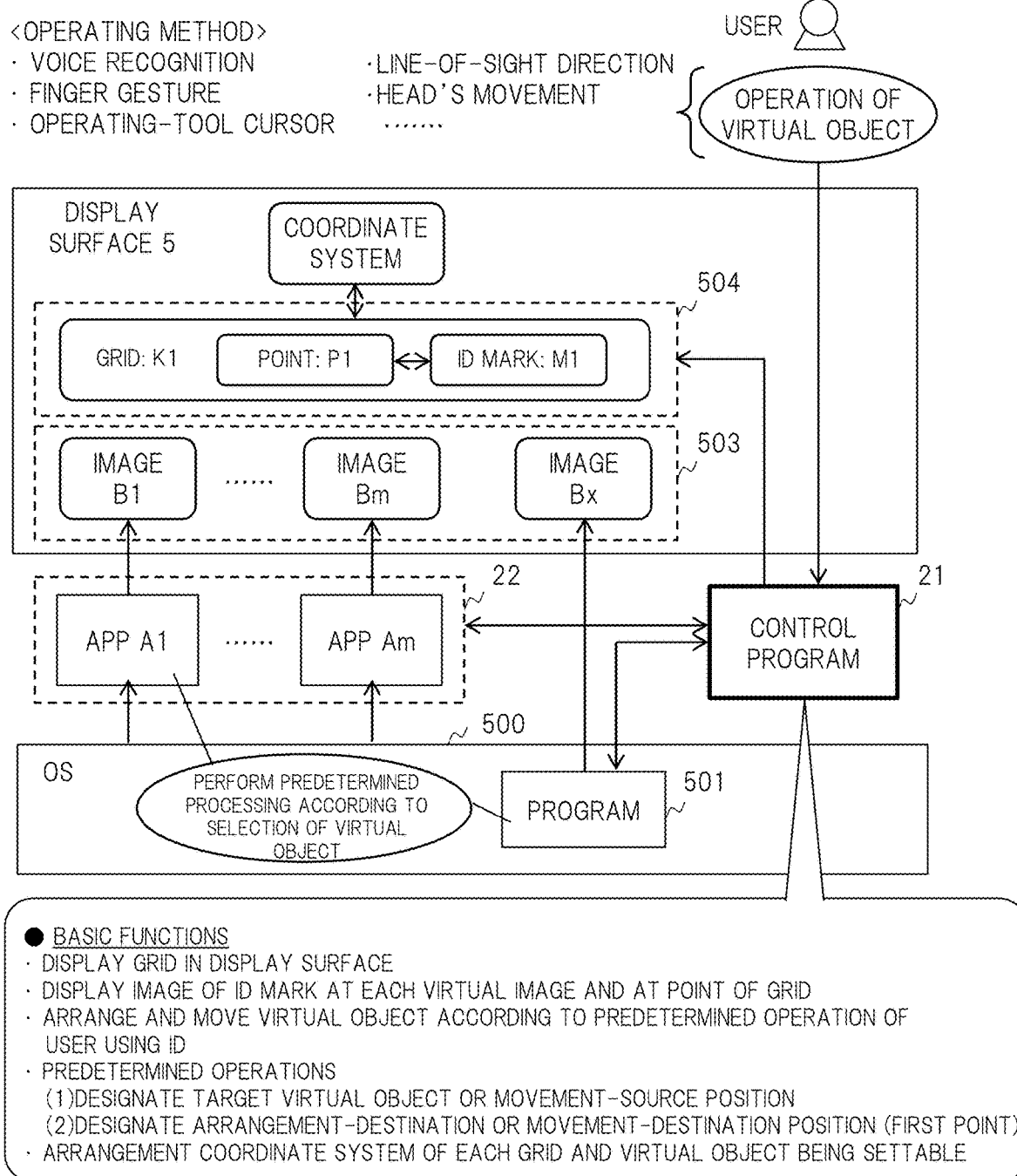
FIG. 5 is a view showing a configuration example of an OS, and an application, etc. in the first embodiment.

FIG. 5 shows a configuration example of an OS, an application, etc. in the HMD 1. The processor 101 of the HMD 1 executes a processing of the control program 21 in or on an OS 500. The OS 500 includes a program 501 creating a virtual object corresponding to AR or the like or image information (for example, system information 411) that is a source thereof. Further, it also has various application programs 22 (for example, applications A1 to Am) that are started and executed on the OS 500. Examples of the application programs 22 include an AR application, a photo application, a Web browser, an SNS application, a telephone application, and the like. Each application program 22 creates the virtual object corresponding to the AR or the like or the image information that is a source thereof, and displays an image 503 of the virtual object on the display surface 5. For example, the application A1 creates an image B1 of the virtual object and displays it on the display surface 5. When the corresponding virtual object is selected by the user, the program 501 and the application program 22 execute a corresponding predetermined processing(s).

The control program 21 performs predetermined display control when the program 501 or the application program 22 displays the image 503 of the virtual object on the display surface 5. The control program 21 displays a grid K1 on the display surface 5. The grid K1 includes: a plurality of points P1 which are a plurality of grid points; and a plurality of grid lines. The control program 21 displays an ID mark M1 at each point P1. The control program 21 may display the ID mark also on the image 503 of the virtual object. A coordinate system to be arranged and a region in the space are set in association with each grid K1. The control program 21 accepts, as a predetermined input operation by the user, an operation(s) with respect to the virtual object. This operation includes an operation of arranging or moving the virtual object beside the selection and the operation, etc. of the virtual object. As an input operating method, used can be: voice recognition; a gesture with fingers; an operation of the cursor etc. using the operating tool 2; an operation using the line-of-sight direction; an operation using the movement of the head (corresponding HMD 1); and the like.

When the control program 21 receives a predetermined operation, the control program 21 arranges or moves the target virtual object at the position of the point P1 at the designated arrangement destination or movement destination. The predetermined operation is an operation including (1) an operation of designating the target virtual object and (2) an operation of designating the point P1 at the position of the arrangement destination or the movement destination. When the target virtual object is arranged or moved, it is automatically set so as to be arranged in the coordinate system in which the grid K1 is arranged, the designated point P1 belonging to the grid K1.

The HMD 1 arranges and displays, on the display surface 5, the virtual images of the GUIs such as the application icon 415 and the application window 413 in FIG. 4. The HMD 1 activates the application program 22 specified through the application icon 415 or the like by the user. The processor 101 operates an execution module corresponding to the application program 22. The HMD 1 arranges and displays the image of the GUI at a default setting position in the local coordinate system if there is no designation by the user. The HMD 1 arranges and displays the image of the GUI at a position designated by the user if there are an instruction and an operation by the user. The application program 22 has a two-dimensional application and a three-dimensional application as types. In a case of the two-dimensional application, the virtual object is arranged at a position in a two-dimensional plane in an application mode in the application window 413 or the display surface 5. In a case of the three-dimensional application, the virtual object is arranged at a position in the three-dimensional space in the display surface 5.

The HMD 1 manages and controls a position and a direction of the arrangement of the virtual object and a display size of the virtual object with respect to the coordinate system and the grid K1 in the space. The HMD 1 determines whether to apply the coordinate system and the grid K1 at a time of starting the main body or the application, and determines the virtual object to be arranged, the position to be arranged, and the like. The HMD 1 updates states of the coordinate system, the grid K1, the virtual object, and the like in the space according to the movement and operation of the user. The HMD 1 saves their states as information at an end of starting the main body or at an end of the application. When the main body is restarted or the application is restarted, the HMD 1 restores the states of the coordinate system, the grid K1, the virtual object, and the like according to the stored information.

[Operating Method]

An example of an operating method in the first embodiment is as follows. The HMD 1 uses at least one operating method. In a case of the voice method, the HMD 1 uses the voice recognition function to recognize a predetermined voice from the user's input voice through the microphone 81 and associates it with a predetermined command. For example, the HMD 1 displays the virtual object on the display surface 5 when "image display on" is inputted as voice, and hides (does not display) the virtual object on the display surface 5 when "image display off" is inputted. For example, when "grid on" is inputted, the HMD 1 displays the grid K1 (including an ID mark M1) on the display surface 5, and when "grid off" is inputted, the grid K1 in the display surface 5 is not displayed. In a case of the gesture method, the HMD 1 detects the gesture of the fingers from the image of the camera 6 and associates the detected gesture with a predetermined command. For example, when the HMD 1 detects a touch or tap gesture with respect to the position of the virtual object in the display surface 5, it associates the detected gesture as the designation of the virtual object. For example, when the HMD 1 detects a gesture of opening and closing a hand(s), it associates the detected gesture with a command indicating returning to a previous state or indicating cancel.

In a case of a cursor operating method using the operating tool 2, the HMD 1 moves the cursor to be displayed on the display surface 5 based on a signal from the operating tool 2, and when the button of the operating tool 2 is pressed, for example, the HMD 1 associates it with the designation of the virtual object lying at the position of the cursor at that time. In a case of the operating method using the line-of-sight direction, the HMD 1 detects, for example, a position of intersection between the line-of-sight direction of the user, which is detected by using the line-of-sight detection sensor, and the display surface 5, displays the cursor at that position, and associates it with the designation of the virtual object lying at the position. In a case of the operating method using the movement of the head, the HMD 1 detects, for example, a front-face direction and movement of the head (corresponding HMD 1) by using a sensor, displays the cursor according to the front-face direction and the movement, and associates it with the designation of the virtual object lying in the front-face direction.

[HMD—Basic Function]

FIG. 6 shows a configuration of a processing unit, which constitutes the basic function of the HMD 1 based on the configuration of FIG. 3, and a configuration of data. The basic function is a function of displaying and controlling the virtual object by using the grid K1 or the like, and includes a function of controlling the arrangement and movement of the virtual object. The setting unit 11 sets and saves setting information 30 related to the basic function and the like in advance. As an example, the application to be applied, the grid K1 to be used, the coordinate system, a spatial region, a type of the ID mark M1 to be displayed, and the like is settable by the user. The state recognizer 12 uses the image of the camera 6 and the detection information of the sensor 70 to recognize a state including the posture states of the user and the HMD 1 at each time point.

The coordinate system calculator 13 uses the image of the camera 6 and the detection information of the sensor 70 to calculate the state of the coordinate system at each time point. The coordinate system includes three types of coordinate systems described later, and has an arrangement relationship between the coordinate systems. The coordinate system calculator 13 reads and writes information of the calculated and set coordinate system to and from the coordinate-system information 31. The coordinate-system information 31 includes information on a position of the origin of each coordinate system and a front-face direction, and information on an arrangement relationship between the coordinate systems. The coordinate system calculator 13 calculates the arrangement of the grid K1 and the arrangement of the virtual object with respect to the coordinate system. Further, the coordinate system calculator 13 uses Euler angles or normalized quaternions to calculate rotation between the coordinate systems or the like when a change of the coordinate system, movement between the coordinate systems, and/or the like occur.

The grid controller 14 controls the arrangement of the grid K1 with respect to the display surface 5 and the coordinate system. The grid controller 14 reads and writes data including a configuration (including the information of the point P1 and the ID mark M1) of the grid K1 from and to grid data 33. Based on the operating method to be applied, the instruction recognizer 15 uses the image of the camera 6, the detection information of the sensor 70, the signal from the operating tool 2, the input voice of the microphone 81, and the like to recognize an input operation (corresponding instructions) by the user. The instruction recognizer 15 associates a predetermined input operation with a predetermined command, and controls the display controller 16 and the like according to the command. The display controller 16 displays the grid K1 and the virtual object on the display surface 5 based on the control from the instruction recognizer 15 and the grid data 33 and virtual image data 32, and outputs sound (for example, a sound effect associated with the operation) from the speaker 82. The application controller 17 controls a start and an end of each application program 22 and stores, in the virtual object data 32, data of a virtual object(s) generated by each application program 22, and data of the application icon 415, the application window 413, and the like.

[Coordinate-System Information]

FIG. 7 shows a table 701 as a configuration example of the coordinate-system information 31. In the table 701, origin positions and front-face directions of three types of coordinate systems are managed as information. The table 701 has a coordinate system ID, an origin position, and a front-face direction as columns. As the three types of coordinate systems, there are a world coordinate system CS1, a local coordinate system CS2, and an inertia coordinate system CS3. Incidentally, a plurality of coordinate systems (corresponding plurality of regions) can be set and used for each type of the coordinate systems.

[Grid Data]

FIG. 8 shows a table 801 as a configuration example of grid data 33. The table 801 has a grid ID, a point ID, an arrangement coordinate system, an arrangement-position coordinate, a display flag, an ID mark, and the like as a column. The grid ID is an ID for each grid K1. The point ID is an ID for each point P1 of a plurality of points P1 belonging to the grid K1. The arrangement coordinate system indicates a coordinate system in which the grid K1 (corresponding point P1) is arranged. The arrangement-position coordinates indicate position coordinates of the point P1 in the arrangement coordinate system. The display flag is a flag for managing a state of displaying or hiding the point P1 (or corresponding ID mark M1) on the display surface 5. The ID mark indicates an ID value of the ID mark M1 associated with the point P1.

[Virtual-Image Data]

FIG. 9 shows a table 901 as a configuration example of virtual-image data 32. The table 901 has a virtual object ID, a shape (file), an arrangement coordinate system, an arrangement grid, an arrangement point, an arrangement direction, a label, and the like as a column. The virtual object ID is an ID for each virtual object (corresponding virtual image). The shape (file) is an image file or the like representing a shape of a virtual object. The arrangement coordinate system indicates a coordinate system in which the virtual object is arranged. The arrangement grid indicates a grid K1 on which the virtual object is placed. The arrangement point indicates a point P1 where the virtual object is placed. Incidentally, arrangement-position coordinates may be used as the arrangement position of the virtual object. The arrangement direction indicates a direction at a time when the virtual object is placed at the point P1. The label indicates an ID value of a label in giving and displaying the ID mark (may be described as a label for distinguishing from the ID mark M1 of the point P1) to and on the virtual object. Incidentally, although not shown in the figure(s), an arrangement size, a display flag, and the like can be provided for each virtual object.

[Processing Flow]

Figure 10:
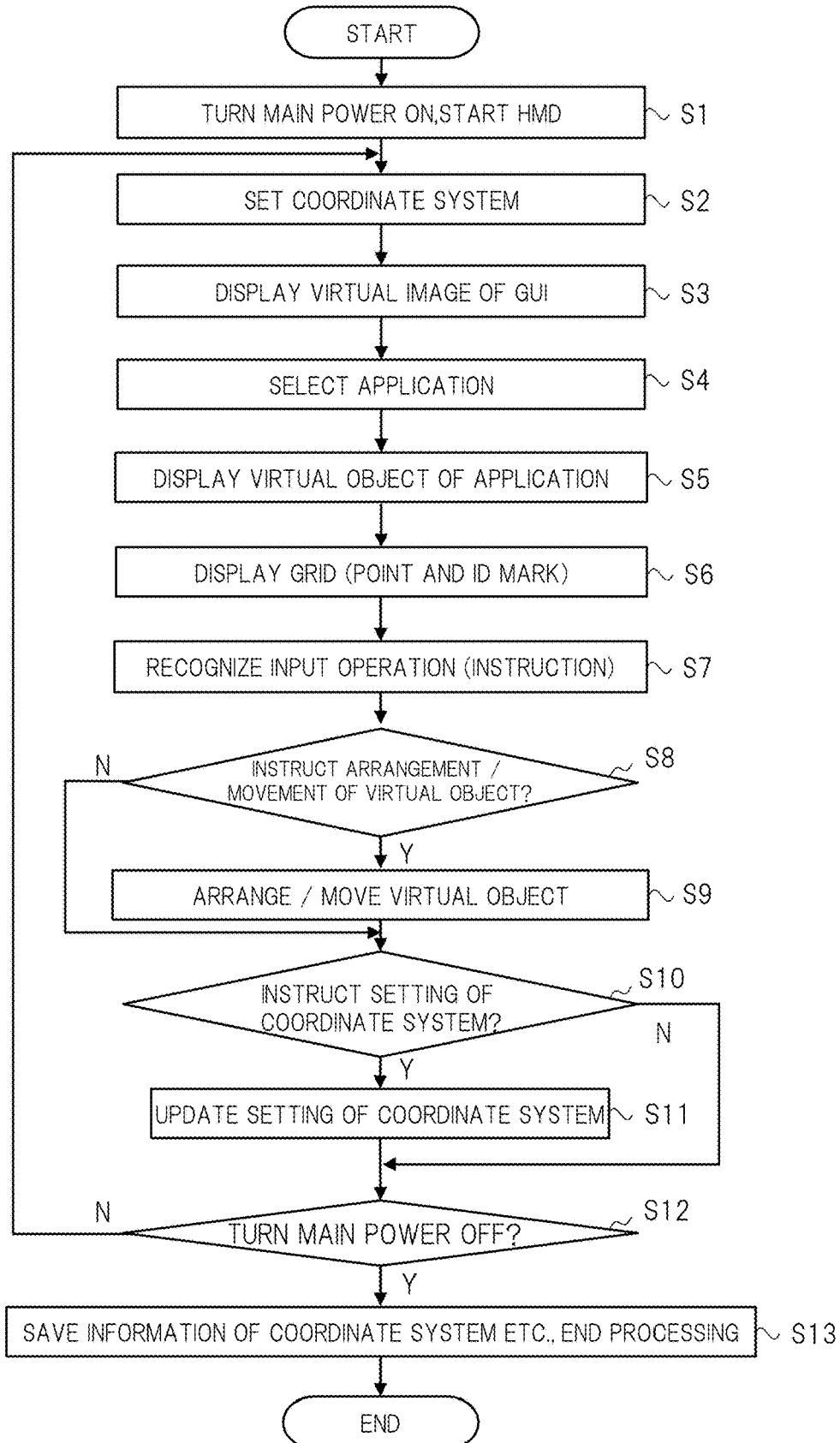
FIG. 10 is a view showing a processing flow of the HMD apparatus according to the first embodiment.

FIG. 10 shows a processing flow of the basic functions of the HMD 1. FIG. 10 has steps S1 to S13, which will be described in order below. In step S1, the HMD 1 is started with a main power turned on by the user. Along with this, the HMD 1 performs a predetermined initialization processing. Each sensor of the sensor 70 starts measurement. Each camera of the camera 6 starts shooting. In step S2, the HMD 1 sets (including resetting) three types of coordinate systems with the initialization processing. At that time, the user puts the HMD 1 in a stationary state. The coordinate system calculator 13 of the HMD 1 sets the origin and the front-face direction of each of the three types of coordinate systems according to a predetermined rule. When maintaining the coordinate system that has been already set, the coordinate system calculator 13 reads the setting information from the coordinate-system information 31 and resets the coordinate system in accordance with the setting information. Alternatively, the coordinate system calculator 13 may newly set a coordinate system. An example of setting the coordinate system will be described later.

In step S3, the HMD 1 displays a virtual image of the GUI like the example of FIG. 4 on the display surface 5. For example, the HMD 1 displays the system information 411 and the menu field 412 in accordance with the local coordinate system CS2, and displays the application icon 415 and the like in the menu field 412. In step S4, the HMD 1 selects an application (application program 22) according to an operation or setting by the user. The user can select and operate an application to be started from, for example, the application icon 415 in the menu field 412.

In step S5, the HMD 1 displays, on the display surface 5, the virtual object related to the application selected in step S4. At that time, the display controller 16 refers to the virtual image data 32 (for example, table 901 in FIG. 9) and confirms each virtual object, shape, arrangement coordinate system, arrangement grid, arrangement point, and the like to be displayed. The display controller 16 determines which region of the grid K1 each virtual object is arranged in and which coordinate system the region belongs to. Basically, regarding the virtual objects that have been already arranged, the coordinate system and the grid K1 at that time are maintained. When the arrangement coordinate system or the grid K1 is designated by the input operation of the user, the HMD 1 may arrange the virtual object in the designated coordinate system or grid K1. Incidentally, in some cases, the virtual object is not arranged on the grid K1. The display controller 16 calculates the position, direction, display size, and the like of each virtual object in the grid K1 of the arrangement coordinate system. The display controller 16: converts, into the information in the local coordinate system CS2, the arrangement position and the arrangement direction when the arrangement coordinate system of the virtual object is the world coordinate system CS1 or the inertia coordinate system CS3; and displays it at the corresponding position in the display surface 5.

In step S6, the display controller 16 of the HMD 1 displays a plurality of points P1 of the grid K1 and an ID mark M1 for each point P1 on the display surface 5. In step S7, the instruction recognizer 15 of the HMD 1 receives an input operation by the user based on the operating method and recognizes it as an instruction. This instruction includes, as types for example, the known virtual-object operation related to work and applications, an operation for arranging or moving the virtual objects, an operation related to setting of a coordinate system, and the like. The known virtual-object operation is an operation for selecting the virtual object and performing a predetermined processing by the application program 22 or the like. The operation for arranging or moving the virtual object is a peculiar operation shown in FIG. 11 or the like described later.

In step S8, the HMD 1 confirms whether an input operation (corresponding instruction) in step S7 is an operation (corresponding command) for arranging or moving the virtual object, and if applicable (Y), the HMD 1 proceeds to step S9. In step S9, the HMD 1 updates the display state so that the designated target virtual object is arranged or moved at a position of the point P1 at the designated arrangement destination or movement destination in the display surface 5. This update includes updating the display states of the ID mark M1 of the point P1, the label of the virtual object, and the like. In arranging or moving the virtual object, the HMD 1 appropriately changes the coordinate system, in which the virtual object is arranged, so as to match with the coordinate system to which the point P1 at the arrangement destination belongs. That is, in the first embodiment, the virtual object can be moved between the coordinate systems (between the corresponding grids K1). For example, when a coordinate system that is an arrangement source of the target virtual object is the local coordinate system CS2 or the world coordinate system CS1, the arrangement destination can be made the position of the point P1 of the corresponding grid K1 in the inertia coordinate system CS3.

In step S10, the HMD 1 confirms whether a coordinate-system setting instruction is given as an input operation in step S7, and if the instruction is given (Y), the HMD 1 proceeds to step S11. Given as the coordinate-system setting instruction are, for example among the three types of coordinate systems, an instruction to change the coordinate system for arranging the virtual object, and an instruction of a rotation-movement operation of the inertia coordinate system CS3 described later. In step S11, the HMD 1 updates the setting information of the coordinate system, the grid K1, and the virtual object in response to the coordinate-system setting instruction. In step S12, the HMD 1 proceeds to step S13 when the main power is turned off by the user (Y). In step S13, the HMD 1 saves the state of the coordinate system or the like at that time in the coordinate-system information 31 or the like, and executes an end processing of the HMD 1. Consequently, this processing flow ends. If the main power remains being turned on in step S12 (N), the HMD 1 returns to, for example, step S2 and repeats the same processing at every point of time. The processings of step S2, step S5, step S6, and the like are performed so as to be updated at every point of time according to a posture state including a direction of the user's head.

[Basic Method]

Figure 11:
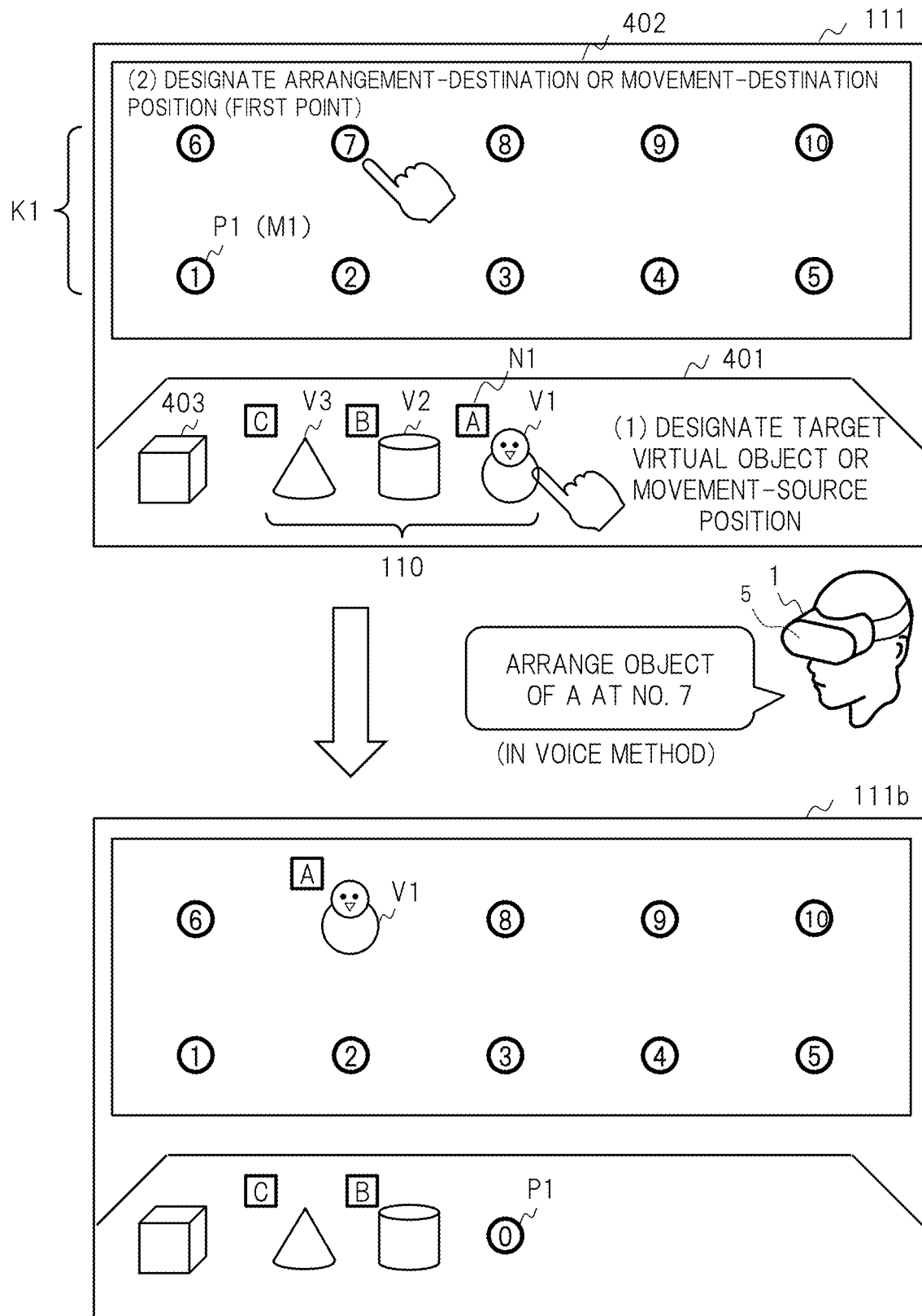
FIG. 11 is an explanatory diagram of a basic method related to an operation of arranging and moving a virtual object with respect to the real space on the display surface in the first embodiment.

FIG. 11 shows an explanatory diagram of a basic method related to an operation of arranging and moving a virtual object with respect to a real space on the display surface 5 in the basic function of the HMD 1. An image 111 of FIG. 11 shows a scene seen from the user's viewpoint corresponding to the display surface 5. As an example of a real image, the image 111 includes a work table 401, a whiteboard 402, and a cubic real thing 403. Further, displayed in the image 111 are virtual objects V1, V2, and V3 as virtual objects 110 based on the processing of the application program 22 selected by the user. For example, the virtual object V1 is an image representing a snowman-shaped three-dimensional object. The virtual object V2 is an image representing a cylindrical three-dimensional object. The virtual object V3 is an image representing a conical three-dimensional object.

The HMD 1 displays a plurality of points P1 and ID marks M1 of the grid K1 on the display surface 5 in order to support the operation of arranging and moving the virtual object by the user. In this example, the grid K1 has a total of 10 points P1 arranged in 2 rows and 5 columns on a two-dimensional plane (corresponding grid surface). In this example, each point P1 is displayed as a white circular virtual image. Further, the ID mark M1 is assigned and displayed at each point P1. The ID mark M1 is a virtual image representing identification information (point ID) of the point P1. The HMD 1 displays the ID mark M1 at a position near or overlapped with the point P1. In this example, the ID mark M1 is integrated with the point P1, and a number of the point ID is displayed in a circular mark. In this example, ID=1 to 10 are assigned to the ten points P1. An order direction of the IDs is not limited.

Further, the HMD 1 assigns and displays an ID mark N1 to and on each virtual object 110 (V1, V2, V3) in the image 111. The ID mark N1 is a virtual image that represents identification information (in other words, a label) of a virtual object. In this example, the ID mark N1 is a rectangular mark, and an alphabetic character of each ID is displayed in the rectangle. The HMD 1 displays the ID mark N1 at a position near or overlapped with the virtual object 110. In this example, ID=A is displayed on the virtual object V1, ID=B is displayed on the virtual object V2, and ID=C is displayed on the virtual object V3.

The user performs, as a predetermined operation, an operation of arranging or moving the virtual object. For example, it is assumed that the user wants to arrange or move the virtual object V1, which is displayed on the display surface 5, at the position of the point P1 indicated by ID=7 in the grid K1. At that time, the user performs, as predetermined operations, (1) designation of the target virtual object or designation of a movement-source position, and (2) designation of an arrangement-destination or movement-destination point P1. The HMD 1 arranges or moves the designated target virtual object at the position of the designated point P1 in response to this operation. By this basic operation, first, the arrangement or movement of one virtual object can be easily realized. The basic operation may include (3) an instruction of the arrangement or movement in addition to (1) and (2) mentioned above. In a case of a method using, for example, gesture or the operating tool 2, the user first selects and operates the virtual object V1 so as to indicate it with a finger(s) or a cursor. Then, secondly, the user performs a selection operation so as to indicate the point P1 having ID=7 at the arrangement destination. In a case of the voice method, the user inputs a voice such as "arrange (or move) object of A at No. 7". In the case of the voice method, the user can specify the number of the ID mark M1 and the alphabetic character of the ID mark N1 by voice. According to such an operation, the virtual object V1 is arranged and displayed at the position of the point P1 having ID=7, as shown in a lower-side image 111b. At this time, it is not necessary for the user to move the virtual object V1 to the position of ID=7 by an operation such as dragging unlike the conventional method.

Incidentally, the HMD 1 may always display the grid K1 (point P1 and ID mark M1, etc.) on the display surface 5, and may switch an on/off state of the display of the grid K1 according to the user's instruction or operation. The user can turn off the display when the display of the grid K1 in the display surface 5 is troublesome. For example, the HMD 1 does not normally display the grid K1, but may display the grid K1 when the user inputs a command to turn on the grid or when the user selects and operates a virtual object. Further, the HMD 1 may display the grid K1 when the user's fingers approach the existing position of the grid K1. Furthermore, the HMD 1 may display only a point P1 of a grid K1 in a part of a region corresponding to the line-of-sight direction of the user in the display surface 5. In addition, the HMD 1 may independently control the display of the point P1 and the display of the ID mark M1. For example, the HMD 1 may display only a point image representing the point P1. The HMD 1 may switch on/off the display of the ID mark M1 according to an input of the command by the user. Buttons for various commands for operating the grid K1 and the like may be provided in the display surface 5. As another example, the display of the grid K1 may be allowed only in one part of a region of the display surface 5, and the display of the grid K1 may be disallowed in the other part of the region. For example, the grid K1 may be displayed only in a region near a center in the display surface 5, or conversely, the grid K1 may be displayed in a peripheral region other than the region near the center.

In an image 111b, the virtual object V1 is arranged at the position of the point P1 having ID=7. In this example, the virtual object V1 is superimposedly displayed on the ID mark M1 of the point P1, and the ID mark M1 of the point P1 on a lower side of the virtual object V1 is not visible. Incidentally, the ID mark M1 having ID=7 may be remain displayed on a front side so as not to be hidden. Further, in this example, a point P1 having ID=0 is at a position of an arrangement source of the virtual object V1. Therefore, this point P1 becomes visible to the user. The point P1 having ID=0 may be set, as a home region described later, at a predetermined position (for example, a central position of a lower-side region) in the display surface 5. Setting and display of the home region can be omitted. If this setting is made, the point P1 having ID=0 can be designated as an arrangement destination or a movement destination. For example, the virtual object V1 once arranged at the point P1 having ID=7 can easily be return to the position of the point P1 having ID=0. For example, in a case of the voice method, the user may input "move an object of A to No. 0 (zero)", "return an object of A", or the like.

[Input Operation Example]

FIG. 12 shows examples of input operations in various operating methods. (A) shows an example of using, as a pointing means, a beam (for example, infrared rays) emitted from the operating tool 2. The user manually moves the operating tool 2 to hit a tip of the beam on a target virtual object (for example, virtual object V1) or the point P1 in the display surface 5. The HMD 1 may display the cursor at a position ahead of the beam in the display surface 5. (B) shows an example in which a cursor 122 (for example, a cross shape) at the tip of the beam of the operating tool 2 is displayed at the position of the virtual object V1 in the display surface 5. (C) shows an example of displaying a finger-shaped cursor 123 at the position of the virtual object V1. Incidentally, the HMD 1 may be superimposedly displayed so that the cursor is aligned with the virtual object or the point P1, or may be displayed in the vicinity thereof. By using the beam or the cursor, the user can designate the target virtual object, the point P1 of the arrangement destination, and the like. For example, the virtual object V1 is pointed to by the cursor 122 or the like for a certain period of time or longer, thereby being put into a selected state. Further, the same control can be performed also by using the line-of-sight direction instead of the operating tool 2. Furthermore, the same control can be performed also by using a method of displaying the cursor at the central position of the display surface 5 in the front-face direction of the user's head (corresponding HMD 1).

Further, an operation for designating the target virtual object and the point P1 may be configured, in detail, separately for provisional selection and selective determination. (D) shows an example of a change in display states of the virtual object V1 due to pre-selection (non-selection), provisional selection, and selective determination. For example, an operation of the provisional selection is that the beam or cursor of the operating tool 2 points to or is superimposed with the target virtual object. The HMD 1 changes the display state of the virtual object, to which the beam of the operating tool 2 points, so as to become a predetermined display state (for example, a specific color, shape, size, etc.) representing the provisional selection. In this example, colors are changed, but a frame or the like surrounding the provisionally selected virtual object may be displayed. An operation of the selective determination is, for example, to maintain a state, in which the beam points to the virtual object, from the provisionally selected state for a certain period of time or longer. Another operation example of the selective determination is to press the button of the operating tool 2 or to input a predetermined voice (for example, "this object" and "selection", etc.). The HMD 1 changes the display state of the virtual object, which has undergone the operation of the selective determination, so as to become a predetermined display state (for example, a specific color, shape, and size, etc.) indicating the selective determination. In this example, the colors are changed, but a frame or the like surrounding the virtual object of the selective determination may be displayed. Incidentally, a method of omitting the provisionally selected state is also possible.

In a case of a method in which an instruction (corresponding command) to arrange or move a virtual object is provided, the operation may be performed by pressing the button of the operating tool 2, an arrangement button of the display surface 5, or the like after designating the target virtual object and the point P1. Alternatively, the operation may be inputs etc. of: a gesture representing arrangement or movement (for example, a gesture of flipping the target virtual object with the finger); and a voice (for example, "arrangement" and "movement", etc.) indicating arrangement or movement.

[Display Control Example (1)]

Figure 13:
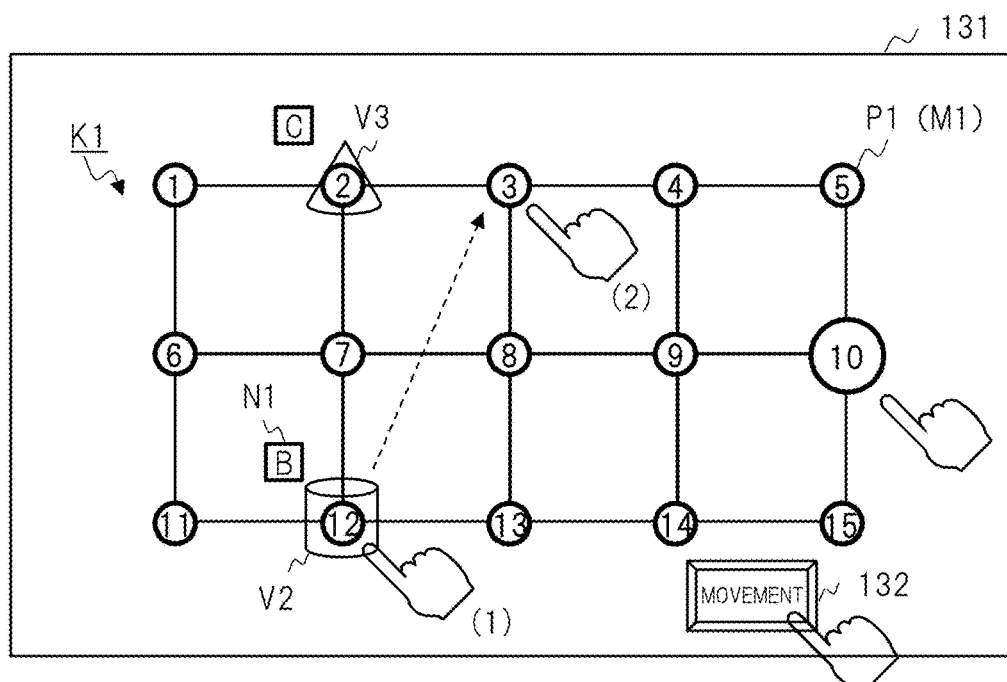
FIG. 13 is a view showing a display control example in the first embodiment.

FIG. 13 shows, as display control examples, a configuration example of the grid K1 in the image 131 of the display surface 5 (FIG. 1) and an operation example of moving a virtual object. The grid K1 of this example has 3×5=15 points P1 in a case of 3 rows and 5 columns, and has 1 to 15 as IDs of the ID mark M1 for each point P1. In this example, the virtual object V2 is initially arranged at a position of the point P1 having ID=12. It is assumed that the user wants to move the virtual object V2 to a position of the point P1 having ID=3, for example. In that case, in the case of the voice method, the user inputs, for example, "move an object of B to No. 3", "move an object of No. 12 to No. 3", or the like. When the virtual object is arranged at the point P1, the designation of the target virtual object at the time of the movement can be replaced with the designation of the point P1 at the corresponding movement source. In the case of the gesture method or cursor method, the user designates the point P1 having ID=12 which is the movement source, or designates the virtual object V2, and then designates the point P1 having ID=3 which is the movement destination. According to these operations, the HMD 1 moves the virtual object V2 to the position of the point P1 having ID=3. As described above, when two of a movement source and a movement destination are specified on the grid K1 in the display surface 5, a method of executing the movement of the virtual object is possible.

Further, in the example of the image 131, a movement button 132 is displayed as a virtual image. The movement button 132 may be used as a movement instruction (corresponding command). For example, the HMD 1 may display the movement button 132 in advance, or may display the movement button 132 after designating the target virtual object or after designating the point P1. For example, the user presses the movement button 132 after designating the target virtual object and the point P1 (for example, a selection operation such as a cursor) at the movement destination. The HMD 1 uses this operation as an instruction to move the virtual object. As described above, the operation may be a method using the movement instruction.

As another method, the user may first press the movement button 132 and then designate the movement source and the movement destination. As another method, the user may designate the point P1 at the arrangement destination or the movement destination, and then designate the target virtual object. Further, as another method, when the user wants to move a plurality of virtual objects at once, the following method etc. may be used: the user specifies the plurality of target virtual objects and then designates the point P1 of one movement destination.

Further, the designation of the point P1 to be the arrangement destination or the movement destination is not limited to designation of an absolute position, but may be designation of a relative position with respect to a position of another point P1 or virtual object. For example, in the image 131, it is assumed that the virtual object V3 has been already arranged at the position of the point P1 having ID=2. When moving the virtual object V2 to the position of the point P1 having ID=3, the user can use designation of a position relative to the position of the virtual object V3. In the case of the voice method, the user may input, for example, "move an object of B to the right of an object of C", "move an object of B to the right of No. 2", or the like.

For the ID mark M1 of the point P1 and an ID mark N1 of the virtual object, characters such as numbers and alphabetical letters can be applied, and differences etc. in color and shape may be further applied. It is assumed that the ID mark M1 and the ID mark N1 are images having different systems so as to be easily distinguished. Regarding the display of the ID of the point P1 and the ID of the virtual object on the display surface 5, all of them may be displayed from the beginning, but they may not be displayed at the beginning or only a part of them may be displayed. For example, when the user's cursor approaches the point P1 or the virtual object, the corresponding ID may be displayed. At that time, as in an example of the ID mark M1 of ID=10, only the point P1 or ID near the cursor may be enlarged and displayed, or may be emphasized by a change of the colors etc.

Incidentally, in the conventional method, when moving the virtual object in the display surface, the user needs to move the target virtual object, which has been selected by the user, to the position of the movement destination by an operation such as dragging, and so it takes a lot of trouble. In the method of the first embodiment, such an operation such as dragging is basically unnecessary, and an efficient operation is possible.

[Display Control Example (2)]

Figure 14:
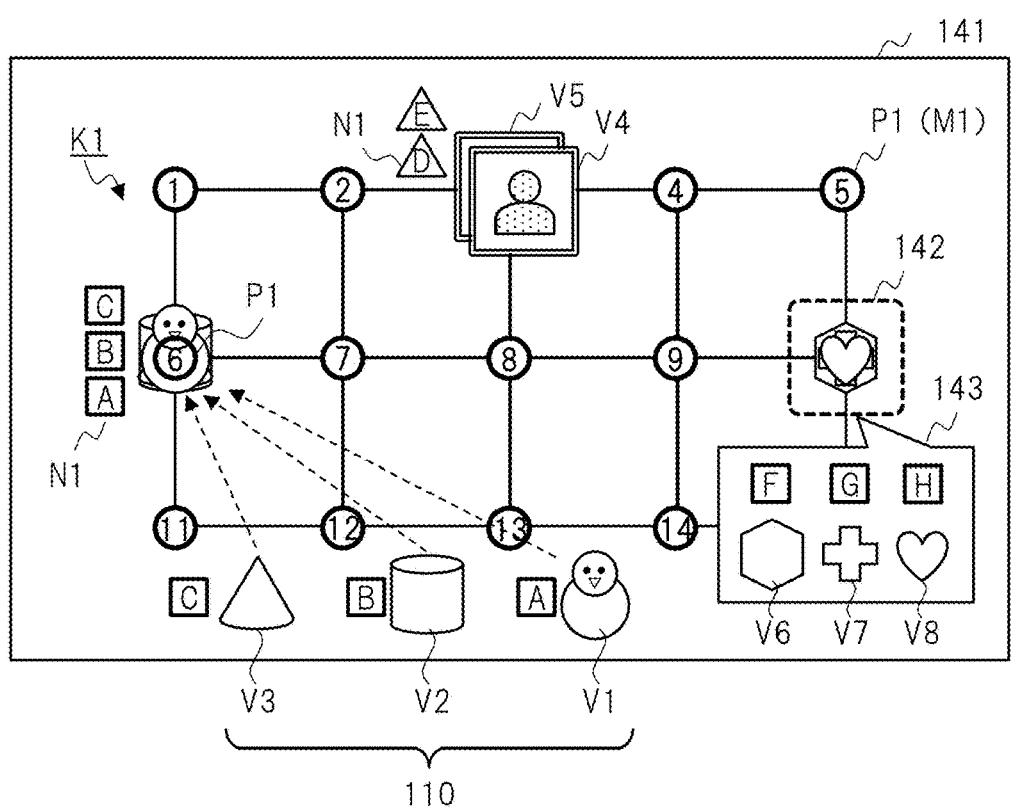
FIG. 14 is a view showing another display control example in the first embodiment.

FIG. 14 shows another display control example. A grid K1 similar to that shown in FIG. 13 is arranged on an image 141 of the display surface 5. This example shows a case where the user arranges the virtual objects V1, V2, and V3 as three virtual objects 110 at the point P1 lying at a position of the same ID=6. For example, the user first designates the virtual object V3 of ID=C and then designates the point P1 having ID=6, thereby moving the virtual object V3. For example, in the case of the voice method, the user performs an input of "move an object of C to No. 6" or the like. Next, the user designates the virtual object V2 of ID=B and designates the point P1 having ID=6, thereby moving the virtual object V2. Next, the user specifies the virtual object V1 of ID=A and designates the point P1 having ID=6, thereby moving the virtual object V1. Consequently, three virtual objects are superimposedly arranged at the position of the point P1 having the same ID=6. When a plurality of virtual objects are arranged at the same point P1, the HMD 1 superimposedly displays them according to order of the arrangement. For example, the last arranged virtual object V1 is visible in the forefront face. Alternatively, the HMD 1 may display only the last arranged one virtual object at the position of the same point P1.

Further, when the plurality of virtual objects are arranged at the same point P1, the HMD 1 may display a plurality of corresponding ID marks N1 in the vicinity of the point P1 so that the plurality of IDs of the plurality of virtual objects can be easily understood. For example, ID marks N1 (ID=A, B, and C) corresponding to the virtual objects V1, V2, and V3 are displayed in parallel in the vicinity of the point P1 having ID=6.

As another operation example, the user designates a plurality of virtual objects 110 (virtual objects V1, V2, and V3) in order, and then designates a point P1 having ID=6 of the movement destination, thereby making it possible to move the plurality of virtual objects together. In the case of the voice method, the user may input, for example, "move objects of A, B, and C to No. 6" etc. As another example, the virtual objects V4 and V5 are superimposedly arranged at the position of the point P1 having ID=3. The virtual objects V4 and V5 are application icons, and the ID marks N1 are triangles and are ID=D and E.

The user can also move, to another position, the plurality of virtual objects that are superimposedly arranged at the position of the same point P1. For example, the user first designates, by the ID mark N1, the virtual object V1 at the position of the point P1 having ID=6, and then designates a position of another point P1 (for example, ID=9) of the movement destination, thereby making it possible to move one virtual objects V1. When the user wants to move three virtual objects at the position of ID=6 together, for example, the user designates the point P1 having ID=6 and designates a position of another point P1 of the movement destination. According to such an operation, the HMD 1 moves the three virtual objects at the position of ID=6 together. In the case of the voice method, the user may input, for example, "move sixth object to No. 9" etc.

Further, when the plurality of virtual objects are arranged at the same point P1, the HMD 1 may display a predetermined image representing such a state. For example, a frame-line image 142 is displayed at a position of the point P1 having ID=10. The frame-line image 142 represents a state in which the plurality of virtual objects are arranged at the position of the point P1. Furthermore, in response to the operation of selecting the frame-line image 142 by the user, the HMD 1 collectively puts, into a selected state, the plurality of virtual objects arranged at the position of the point P1. Alternatively, the HMD 1 may temporarily display the plurality of virtual objects in parallel so that the plurality of virtual objects can be confirmed in response to the selecting operation of the fame-line image 142 or its internal region. A balloon image 143 is shown as an example thereof, and each virtual object (virtual objects V6, V7, and V8) and each ID (F, G, and H) are displayed in parallel therein.

[Display Control Example (3)]

Figure 15:
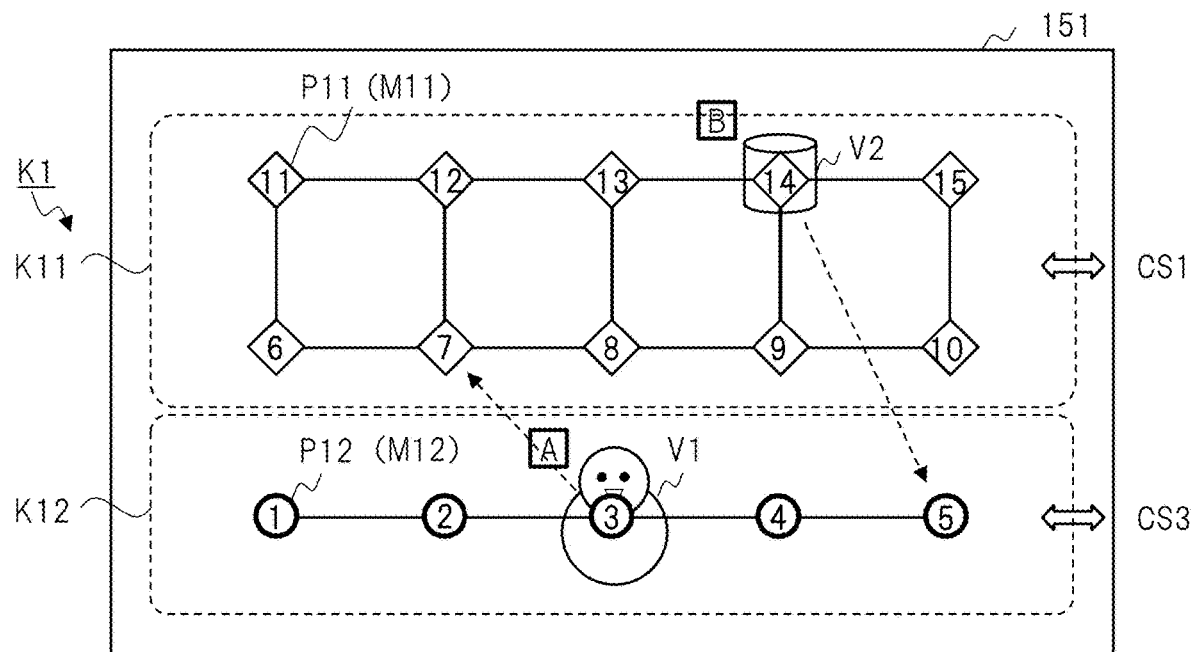
FIG. 15 is a view showing another display control example in the first embodiment.

FIG. 15 shows another display control example. An image 151 of the display surface 5 has, as the grid k1, two of a grid K11 and a grid K12, which are arranged in each region. In this example, a first type of grid K11 having ten points P11 (ID=6 to 15) in 2 rows and 5 columns is arranged in an upper region of the display surface 5, and a second type of grid K12 having five points P12 (ID=1 to 5) in 1 row and 5 columns is arranged in a lower region thereof. Further, in this example, the grid K11 is arranged in the world coordinate system CS1, and the grid K12 is arranged in the inertia coordinate system CS3.

The two types of grids K1 may have different display modes so that a difference between the arrangement coordinate systems can be easily understood by the user. In this example, the grid K11 is set so that a shape of an ID mark M11 at the point P11 is a shape (for example, a rhombus) representing the world coordinate system CS1, and the grid K12 is set so that a shape of an ID mark M12 at the point P12 is a shape (for example, a circle) representing the inertia coordinate system CS3. As another display example for distinguishing the arrangement coordinate system, a frame line or a boundary line surrounding a region of each grid K1 may be displayed, or a grid ID (or region ID) may be displayed in a region of each grid K1. Further, in this example, the ID of each ID mark M1 is assigned on the display surface 5 so that the same ID value does not overlap in the entire two grids K11 and K12. The present embodiment is not limited to this, and the ID of each ID mark M1 may be assigned so that the same ID value duplicates for each grid K1. However, in that case, since the position cannot be designated only by designating the ID value, the grid ID and the like need to be designated in addition to the above.

In this example, an example of arranging and moving the virtual object between the coordinate systems is also shown. First, it is assumed that the virtual object V1 is arranged at the position of the point P12 having ID=3 in the grid K12. It is assumed that the user moves the virtual object V1 to the point P11 having ID=7 in the grid K11. In the case of the voice method, the user inputs, for example, "move an object of A to No. 7", or the like. The HMD 1 moves the virtual object V1, which is at the position of ID=3 in the grid K12 of the inertia coordinate system CS3, to the position of ID=7 in the grid K11 of the world coordinate system CS1 according to the operation. Along with this, the coordinate system to which the virtual object V1 belongs is automatically changed from the inertia coordinate system CS3 to the world coordinate system CS1. As another example, first, the virtual object V2 is arranged at a position of a point P11 having ID=14 in the grid K11. The user moves the virtual object V2 to the position of the point P11 having ID=5 in the grid K12. In the case of the voice method, the user inputs, for example, "move an object of B to No. 5", or the like. The HMD 1 moves the virtual object V2, which is at a position of ID=14 in the grid K11 of the world coordinate system CS1, to a position of a point P12 having ID=5 in the grid K12 of the inertia coordinate system CS3 according to the operation. The coordinate system to which the virtual object V2 belongs is automatically changed from the world coordinate system CS1 to the inertia coordinate system CS3. The present embodiment is not limited to this, and can perform the same control between the world coordinate system CS1 and the local coordinate system CS2, and between the local coordinate system CS2 and the inertia coordinate system CS3.

The inertia coordinate system CS3 can change the front-face direction (direction DIR3) based on a rotation-movement operation described later, and a region of the grid K12 displayed in the display surface 5 can be changed, accordingly. For example, a region of the illustrated grid K12 may be continuously present on the right and left outside the display surface 5. Consequently, the user can display, in the display surface 5, another virtual object arranged in the grid K12 of the inertia coordinate system CS3, or display, outside the display surface 5, the virtual object displayed in the display surface 5.

In the HMD 1, a plurality of grids K1 in each coordinate system are set in advance as default settings and user settings. An arrangement coordinate system, the number of points P1, a display mode of an ID mark N1, a region in the display surface 5, and the like can be set for each of the grids K1. The user can work so as to use the plurality of grids K1 quite differently.

[Display Control Example (4)]

Figure 16:
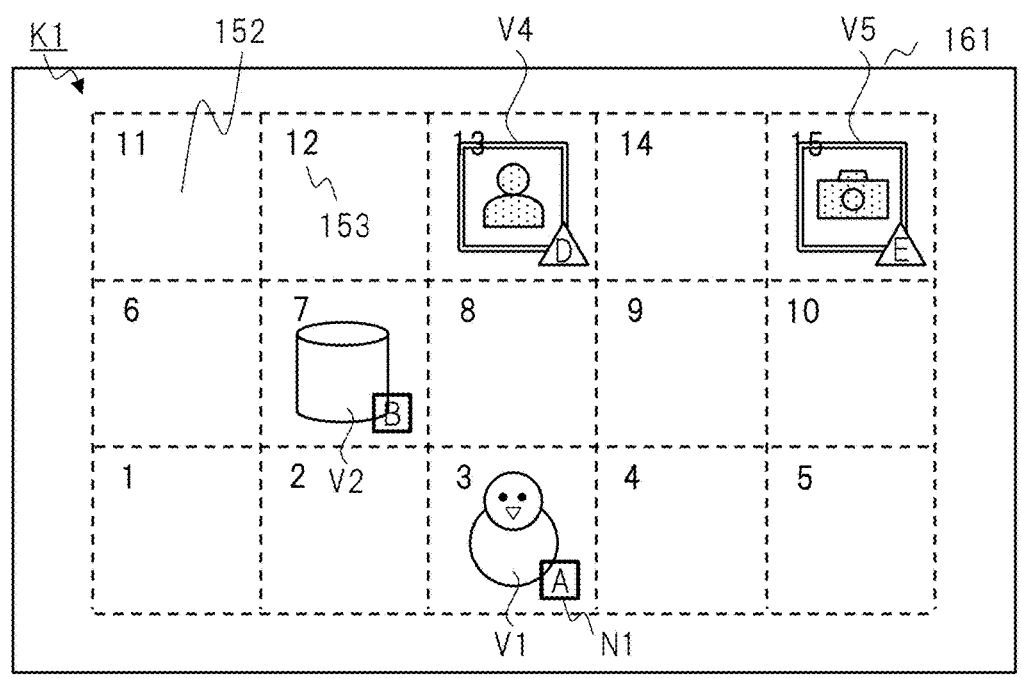
FIG. 16 is a view showing another display control example in the first embodiment.

FIG. 16 shows another display control example. A grid K1 is arranged in an image 161 on the display surface 5. The grid K1 is conceptually composed of a plurality of regions 152. The region 152 can be rephrased as a block, a reference region, or a grid region. In each region 152, a not-shown central point of the region 152 corresponds to the above-mentioned point P1. In this example, the region 152 is displayed as a virtual image having a quadrangular broken-line frame (corresponding to a grid line). An image of ID 153 corresponding to the ID mark M1 is assigned and displayed in, for example, an upper left of each region 151. Even if the grid K1 has such a configuration, the virtual objects can be similarly arranged for each region 152. In this example, virtual objects V1, V2, V4, and V5 are arranged in the regions 152 having ID=3, 7, 13, 15. The virtual objects V4 and V5 are examples of application icons. The ID mark N1 of the virtual object is displayed in a lower right of the region 152, for example.

[Display Control Example (5)]

FIG. 17 shows another display control example. A predetermined region, for example, a region near a lower side is set, as a home region H0, in an image 171 of the display surface 5. The home region H0 is used as a home position and a work region, etc. at and in which the user works. The home region H0 may be displayed, for example, as a broken-line, frame-line image, or the like. For example, ID=0 is assigned and displayed to and in the home region H0. The user can freely place a virtual object in the home region H0. The user can set the home region H0 in a desired region of the display surface 5 by the setting or operation. The operation for setting the home region H0 may be, for example, an operation for designating an upper-left point and a lower-right point of the home region H0. The user can also perform operations such as moving and scaling the home region H0. In another form, the grid K1 may be arranged in the home region H0.

An image 171 of (A) shows a state in which nothing is arranged in the home region H0. The grid K1 is arranged in a region closer to an upper side of the display surface 5. The grid K1 is arranged in, for example, the world coordinate system CS1. The virtual objects V1, V2, and V3 are arranged at the positions of the points P1 having, for example, ID=7, 8 and 9 in the grid K1. The virtual objects V6, V7, and V8 are superimposedly arranged at the position of the point P1 having, for example, ID=5 in the grid K1. An image 171b of (B) shows a state in which the virtual objects V1, V2, and V3 are arranged in the home region H0. For example, in the state of (A), the user can use the above-mentioned menu field or the like to designate and read out a desired virtual object and to arrange it in the home region H0. In addition, the user can designate the virtual object in the grid K1 and move it into the home region H0. For example, in the case of the voice method, the user may input "move an object of A to a home (or No. 0)" or the like. The HMD 1 arranges the virtual object V1 at the central position in the home region H0 according to the operation.

In the home region H0, the HMD 1 may arrange the virtual object at a position freely designated by the user, or may arrange the virtual object at an automatically determined, aligned position. For example, in a state where only the virtual object V1 is in the home region H0, moving the virtual objects V2 and V3 into the home region H0 becomes a state of the home region H0 of the image 171*b* of (B). In the home region H0, the three virtual objects V1, V2, and V3 are arranged at equal intervals together with the respective ID marks N1. As another example, the plurality of virtual objects may be superimposedly arranged in the home region H0.

In addition, the user can move, on the grid K1, all the virtual objects in the home region H0 together. For example, in the case of the voice method, when the user wants to move the virtual objects V1, V2, and V3 to the position of ID=1 together, the use inputs "move a home's (or 0-th) object to No. 1" or the like. Further, when the user wants to move, to the home region H0, all the virtual objects at the position of ID=5 on the grid K1 together, for example, the user inputs "move a fifth object to a home (or No. 0)" or the like. Further, the user can also move, to the home region H0, all the virtual objects on the grid K1 together. For example, in the case of the voice method, the user may input "move all objects to a home (or No. 0)" or the like. Furthermore, the user can collectively move, to the aligned positions on the grid K1, the plurality of virtual objects arranged at free positions in the home region H0. In this case, the grid ID (or region ID) set in a region of the grid K1 is used. For example, it is assumed that a grid ID=R1. For example, in the case of the voice method, the user inputs "place a home's (or 0-th) object at R1" or the like. The HMD 1 arranges the plurality of virtual objects in the home region H0 so as to align at positions of a plurality of vacant points P1 in the region of the grid K1 according to the operation.

[Display Control Example (6)]

Figure 18:
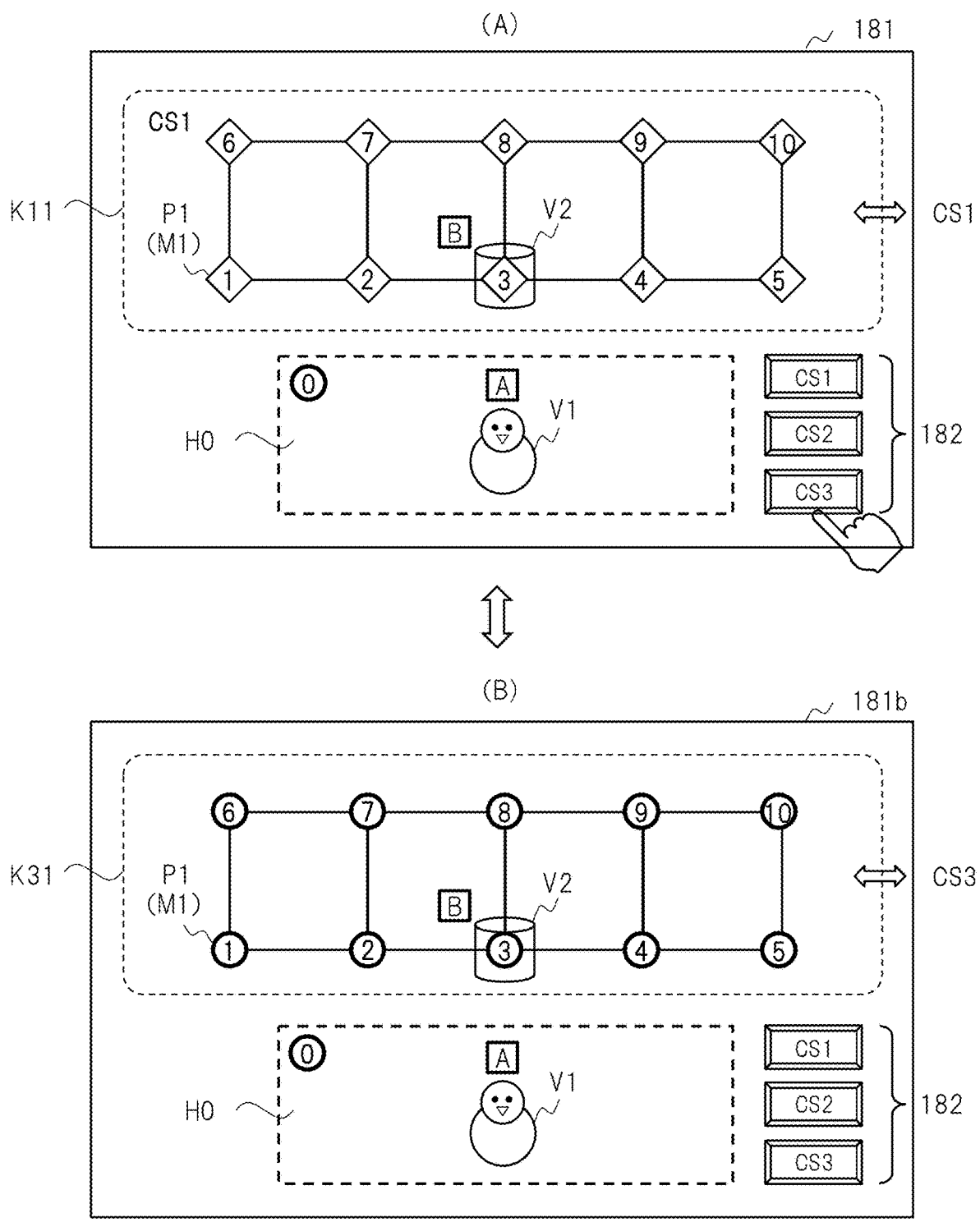
FIG. 18 is a view showing another display control example in the first embodiment.

FIG. 18 shows another display control example. This example shows an operation of changing the coordinate system. In an image 181 of the display surface 5, the home region H0 is arranged on a lower side thereof, and the grid K11 is arranged on an upper side thereof. The virtual object V1 is arranged in the home region H0. The grid K11 is arranged in the world coordinate system CS1. The virtual object V2 is arranged at a point P1 having ID=3 on the grid K11. An image ("CS1" in this example) of a grid ID or a region ID indicating that the arrangement coordinate system is the world coordinate system CS1 may be displayed in a region of the grid K11. Further, a button 182 for changing the coordinate system is displayed in the display surface 5. This button 182 can be used as a coordinate-system setting instruction. The user can change the arrangement coordinate system of the grid K11 by using the button 182. For example, when the user wants to change the arrangement coordinate system of the grid K11 to the local coordinate system CS2, the user designates the grid K11 and presses the button 182 for designating the local coordinate system CS2. The designation of the grid K11 may be made by the designation of the grid ID or the like, or by an operation of selecting a grid line(s) of the grid K11. The HMD 1 changes the arrangement coordinate system of the grid K11 from the world coordinate system CS1 to the local coordinate system CS12 according to the operation. Along with this change, the virtual object V2 arranged on the grid K11 is changed to a state of being arranged in the local coordinate system CS2. In this example, since the virtual object V2 is fixed at the position of ID=3 in the display surface 5, it is maintained at the same position even if the user moves or moves his/her head.

Similarly, the HMD 1 can easily change the grid K1 on the world coordinate system CS1 to the grid K1 on the inertia coordinate system CS3 in response to a coordinate-system setting instruction that includes pressing the button 182 for designating the inertia coordinate system CS3. An image 181*b* of (B) shows a display example when the grid K11 on the world coordinate system CS1 of (A) is changed to a grid K31 on the inertia coordinate system CS3. The HMD 1 updates contents of a coordinate-system information 31, grid data 33, and virtual image data 32 with the change. The ID mark M1 has been changed from a rhombus representing the world coordinate system CS1 to a circle representing the inertia coordinate system CS3. After the change, the number, positions, and ID values of the points P1 are maintained. In this case, a rotation-movement operation described later becomes possible to a region of the grid K31. According to the operation, the virtual object V2 can be arranged outside the display surface 5.

[Display Control Example (7)]

FIG. 19 shows, as another display control example, a function that allows the user to adjust arrangement positions and arrangement directions, display sizes, and the like of virtual objects on the grid K1. As described above, the virtual object can be arranged with respect to the position of the point P1 on the grid K1, but there is a case where the user wants to adjust the arrangement position or the like of the virtual object in more detail according to the work or the like. In that case, the user can use this function. An image 191 of (A) has a grid K1. This example shows a case where the virtual object V1 arranged at the position of the point P1 having ID=0 is moved near the point P1 having ID=7 of the grid K1. The operation of this movement is the same as that described above. Next, the user adjusts the arrangement position of the virtual object V1. The user performs a predetermined instruction operation for that purpose. The instruction operation may be, for example, an input such as "adjustment" in the voice method, or may be a press of an adjustment button 195 displayed on the display surface 5. The HMD 1 shifts to an adjustment mode according to the instruction operation.

(B) shows a display example of the adjustment mode. In this image 191*b*, a region 193 for arrangement adjustment is displayed. The region 193 is based on an enlarged copy of the region 192. The region 192 is a region that has a predetermined size centered on the point P1 having ID=7 and in which the virtual object V1 has been once arranged. In this example, it is such a region as to include ID=1, 2, 3, 6, 8 and 0 around ID=7. In a region 193, a grid K1*b* for adjustment, which is associated with the original grid K1, is displayed. The grid K1*b* in the region 193 has more points P1 than those in the original grid K1. In this example, the grid K1*b* has double density by adding another point P1*b* between the points P1 of the original grid K1. The grid K1*b* is not limited to this, and may add a large number of points P1. Further, in this example, an ID mark M1*b* (for example, having ID with a quadrangle and alphabetic lowercase) is newly added to and displayed at the added point P1*b*. The grid K1*b* is not limited to this, and its ID may be renumbered as a whole.

The user can adjust the arrangement position by moving the virtual object V1 in the grid K1*b* of the region 193 through a predetermined operation. For example, in the case of the voice method, the user may input "move to a position of f" or the like. Consequently, the HMD 1 moves the virtual object V1 at the position of the point P1 having ID=7 to a position of a point P1*b* having ID=f. Further, the user can also move a target virtual object in up-down and right-left directions by operating a movement button 196 indicated by up-down and right-left arrows displayed on the display surface 5. Furthermore, in the region 193, not only the display of the grid K1*b* but also the position adjustment at a pixel level may be made possible according to a predetermined operation to the target virtual object. Moreover, in the region 193, a display size of the target virtual object can be changed (enlarged and reduced, etc.) and a direction (rotation state in the three-dimensional space) of the target virtual object can be changed according to a predetermined operation. The user can end the adjustment mode and return to the normal state by a predetermined operation, for example, by pressing an adjustment ending button 197.

The following method can be applied to control a direction of a virtual object when a target virtual object is moved to a point P1. One method is a method of maintaining the direction of the virtual object before and after the movement. Another method is a method of automatically changing the direction of the virtual object before and after the movement. For example, the HMD 1 selects an arrangement direction of the virtual object in accordance with the coordinate system of the grid K1 of the movement destination. For example, the HMD 1 changes a front-face direction of the virtual object so as to be aligned with a vertical direction on a side verging to the user (HMD 1) in a grid surface (lattice plane) to which the point P1 of the arrangement destination belongs.

[Display Control Example (8)]

Figure 20:
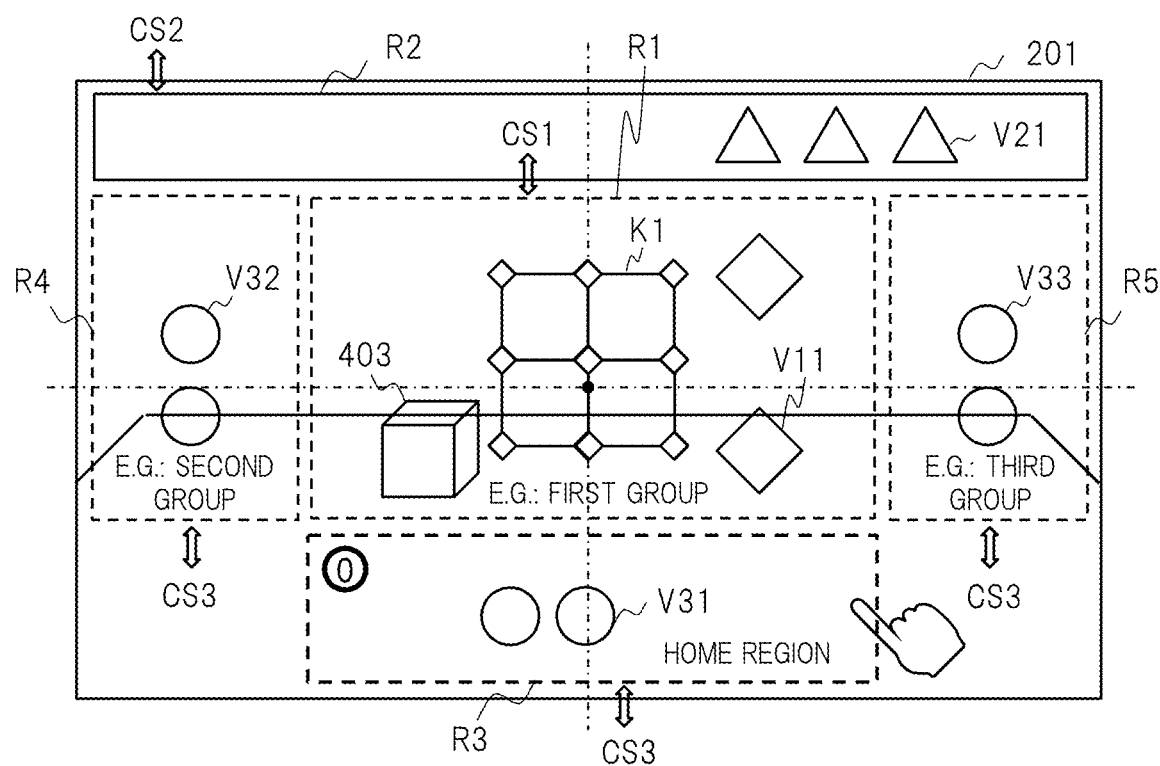
FIG. 20 is a view showing another display control example in the first embodiment.

As another display control example, FIG. 20 shows an example in which: a plurality of regions are provided in a space; a plurality of virtual objects in each region are treated as a group; and an operation can be collectively performed for each group. In an image 201 of the display surface 5 in FIG. 20, a plurality of regions are set. In this example, the display surface 5 has a region R1 near a center, a region R2 near an upper side, a region R3 near a lower side, a region R4 near a left side, and a region R5 near a right side. The world coordinate system CS1 is set in the region R1 near the center. A real thing 403, a virtual object V11, and the like are arranged in the region R1. The region R1 may be set as the inertia coordinate system CS3. In the region R2 near the upper side, a menu field is set in the local coordinate system CS2. A virtual object V21 (for example, an application icon) or the like is arranged in the region R2. In the region R3 near the lower side, a home region is set in the inertia coordinate system CS3. A virtual object V31 or the like is arranged in the region R3. The region R4 near the left side and the region R5 near the right side are each set as the inertia coordinate system CS3. A virtual object V32 or the like is arranged in the region R4. A virtual object V33 or the like is arranged in the region R5. Although being omitted, grids of the corresponding coordinate systems are arranged in each region. For distinction, each region may display a frame-line or boundary-line image, or display a region ID or the like.

The user can operate, as a group, the plurality of virtual objects in the region. By this, the user can work efficiently while using the plurality of regions quite differently. For example, it is assumed that: a plurality of virtual objects in the region R1 are referred to as a first group; a plurality of virtual objects in the region R4 are referred to as a second group; and a plurality of virtual objects in the region R5 are referred to as a third group. The user can collectively move the plurality of virtual objects of the first group in the region R1 into another region, for example, the region R4. At that time, for example, in the case of the voice method, the user inputs "move an object in a center (first group, R1, or the like) to the left (second group, R4, or the like)" or the like. Further, for example, the user can collectively move the plurality of virtual objects of the third group in the region R5 into another region, for example, the region R1. At that time, for example, in the case of the voice method, the user inputs "move an object on the right (third group, R5, or the like) to the center (first group, R1, or the like)" or the like. When each virtual object is moved in terms of group, the arrangement coordinate system and the like of each virtual object is automatically changed in a manner described above.

Further, the display size of the arranged virtual object may be made different for each region. For example, in the central region R1, the display size of the arranged virtual object may be increased and emphasized. Even for the same virtual object, the display size is automatically changed according to the arranged region.

Since the regions R3, R4, and R5 are each set as the inertia coordinate system CS3, their displayed contents can be switched by a rotation-movement operation described later. Further, the HMD 1 may set a plurality of inertia coordinate systems CS3 with respect to the world coordinate system CS1. For example, each of the three regions R3, R4, and R5 may be set as a region of a grid of the independent inertia coordinate system CS3. The HMD 1 manages, as a unit such as a group or a page, the region of the grid of each inertia coordinate system CS3. The user can arrange the virtual objects by using the groups and pages of each inertia coordinate system CS3 quite differently according to the work and the like, which enables efficient work. For example, the user may operate the region R4 with his/her left hand and the region R5 with his/her right hand. The user can also switch on/off the display of the region of each inertia coordinate system CS3. As described above, a method of combining various types of coordinate systems is possible, and a method using only one type of coordinate system is also possible.

[Arrangement Control Example]

Figure 21:
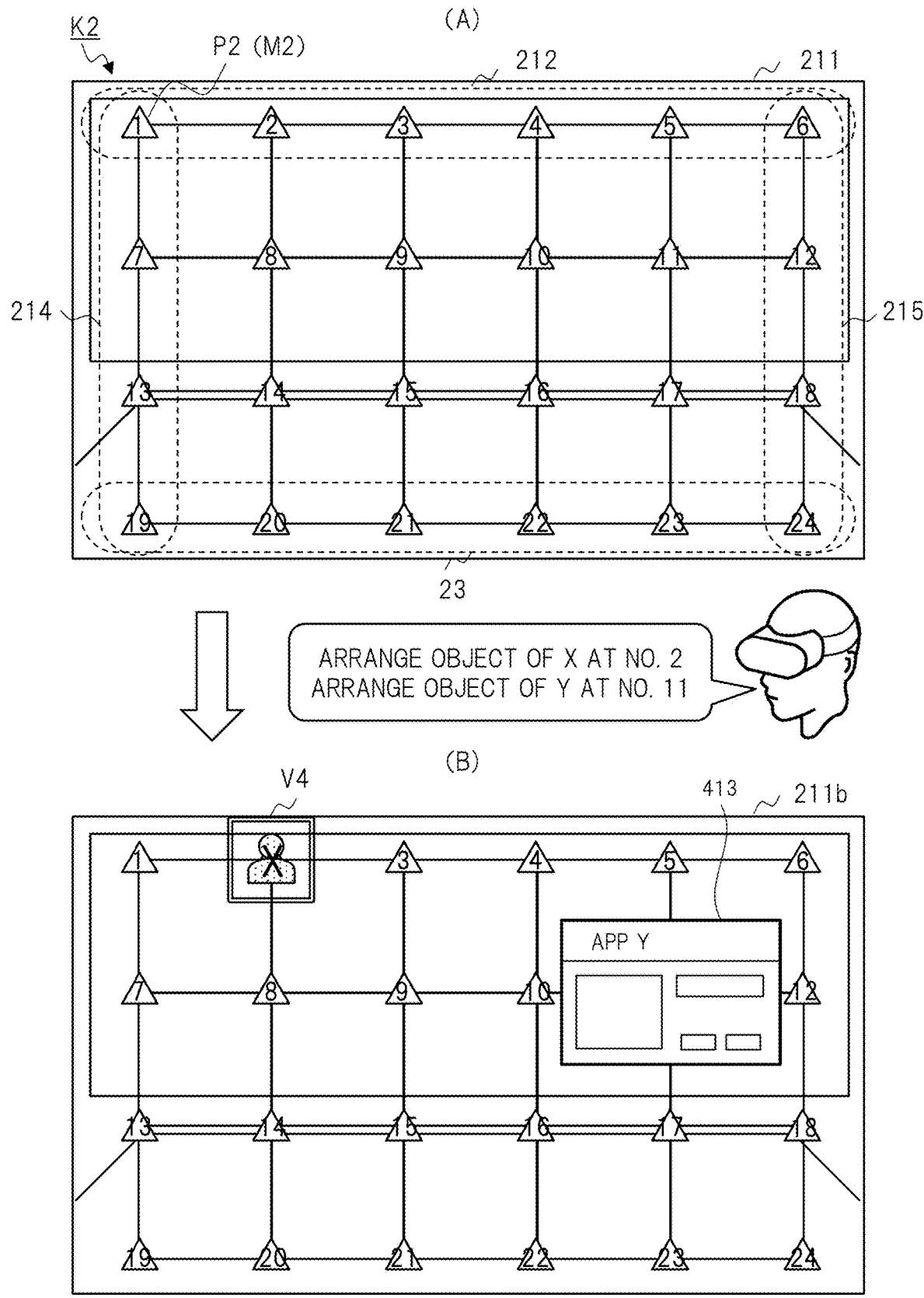
FIG. 21 is a view showing, as another display control example, a case of controlling arrangement of a virtual object that is not displayed on the display surface in the first embodiment.

FIG. 21 shows, as another display control example, a case of controlling new arrangement and display of a not-displayed virtual object at a desired position on the grid K1 in the display surface 5. As an example of this arrangement control, described will be a case where a virtual image such as an application icon is arranged. A grid K2 is arranged on an image 211 of the display surface 5 of (A). The grid K2 has, for example, twenty-four points P2 in 4 rows and 6 columns. The grid K2 is arranged in, for example, the local coordinate system CS2. An ID mark M2 is displayed at the point P2 of the grid K2. The ID mark M2 is, for example, a triangle, and an its ID number (1 to 24) is displayed. Further, in the display surface 5, at least one region among a region 212 near an upper side, a region 213 near a lower side, a region 214 near a left side, and a region 215 near a right side is secured as a predetermined region that uses the local coordinate system CS2. For example, the above-mentioned menu field, system information, and the like are arranged in this predetermined region.

As a predetermined operation, the user performs an operation including the designation of the target virtual object and the designation of the point P2 of the arrangement destination. The HMD 1 arranges and displays the target virtual object at the position of the point P2 designated on the grid K2 according to the operation. For example, it is assumed that the user wants to arrange the virtual object V4, which corresponds to the application icon of an application X, as a target virtual object at the position of the point P2 having ID=2. For example, in the voice method, the user inputs "arrange an object (or icon) of X (or application X) at No. 2" or the like. In the case of a gesture method or a cursor method, the user designates a target application icon in a not-shown menu field, pop-up field, or the like, and then designates the point P2 of the arrangement destination. Alternatively, as another operation example, the user may operate to designate the target virtual object after designating the point P2 of the arrangement destination.

According to such an operation, the HMD 1 arranges and displays the virtual object V4 corresponding to the icon of the designated application X at the position of the designated point P1 having ID=2 as shown in an image 211*b* of (B). Further, the HMD 1 may proceed with a start processing of the application X in a background together with the arrangement of the icon of the application X.

As another example, the user can start and arrange an application window 413 at the position of the desired point P2. For example, it is assumed that the user wants to start and arrange, from a state of (A), an application window 413 of an application Y at a position of a point P2 having ID=11. For example, in the voice method, the user inputs "arrange (or start) a window of Y (or application Y) at No. 11" or the like. In the case of the gesture method or the cursor method, the user designates a target application in a not-shown menu field or the like, and then designates a point P2 of the arrangement destination. The HMD 1 executes, according to the operation, the start processing of the designated application Y and, concurrently, arranges and displays the application window 413 of the designated application Y at the position of the designated point P2 having ID=11.

The user can also move the application icon or application window arranged on the grid K1 to another position on the grid K1 by the same operation as described above. In addition, the predetermined operation for the arrangement control may further include an instruction (corresponding command) for arrangement or start. The instruction may be made possible by a button or the like displayed on the display surface 5 as described above.

Further, for example, the HMD 1 may start an application (application program 22) while the user is using the HMD 1 due to an opportunity such as communication from outside. For example, when the HMD 1 is provided with a telephone application, it may receive an incoming telephone call from outside. In that case, the HMD 1 displays information about an icon or window of the telephone application, which is the target virtual object, on the display surface 5. At that time, the HMD 1 displays on the display surface 5, for example, a GUI image (for example, a pop-up field) inquiring the user about an arrangement destination of the icon or window of the telephone application which is the target virtual object. In response to the inquiry, the user performs an operation of designating a desired point P2 of the arrangement destination. The HMD 1 arranges the icon or window of the telephone application at the position of the designated point P2 according to the operation.

According to the arrangement control function as described above, a virtual object such as an icon that has not been initially displayed can be easily arranged at a user's desired position, for example, at a suitable position where work is easily done. For example, a real thing or a virtual object is arranged for work in a region near the center of the display surface 5. The user can arrange the application icon or the like at a suitable, peripheral position so as not to obstruct visibility of the real thing or virtual object near the center, thereby being able to make the work easier. Further, when the virtual object already arranged for work is present in the display surface 5, the user can arrange another virtual object for work so as to be called at a position near and next to the already arranged virtual object. For example, the user can arrange, during an operation of some real apparatus, a virtual object such as a manual regarding an operation of the apparatus at a position next to the apparatus. The user can arrange the virtual object by selecting a suitable vacant position that does not interfere with the operation of the apparatus and is not too far away. Furthermore, for example, the user arranges a command button or the like at a position close to a three-dimensional-model virtual object which is being created, thereby making it possible to efficiently perform the creation work.

The above arrangement control example is a case of the arrangement in the local coordinate system CS2. Therefore, even if the user rotates his/her head (corresponding HMD 1), the application icon or the like is maintained at the same position on the display surface 5. Not only images of GUIs such as application icons but also virtual objects in the application can be arranged at desired positions in the same manner. Further, the same control can be applied not only to the local coordinate system CS2 but also to the world coordinate system CS1 and the inertia coordinate system CS3. Furthermore, the arrangement control of the application icons and the like can be performed as a user's setting in advance. Incidentally, as in the above example, when the application icon or the like can be identified by its image, name, or the like, the addition and display of the ID mark N1 (label) is not essential.

[Coordinate System]

Next, three types of coordinate systems will be described. The HMD 1 uses the world coordinate system CS1, the local coordinate system CS2, and the inertia coordinate system CS3 as three types of coordinate systems in order to manage the arrangement of virtual objects in the three-dimensional space. The coordinate system calculator 13 (FIG. 6 and the like) of the HMD 1 appropriately sets and calculates a correspondence between the respective coordinate systems. The coordinate system calculator 13 calculates a relative relationship between each of the HMD 1 and user and the coordinate system for arranging the virtual object by using a camera 6 and a sensor 70. The HMD 1 and the user can arrange the grid K1 and the virtual object with respect to any selected coordinate system among the three types of coordinate systems. The HMD 1 arranges the grid K1 and the virtual object with respect to the coordinate system selected by a predetermined rule. The HMD 1 arranges the grid K1 and the virtual object with respect to the coordinate system selected and designated by the user, for example.

The world coordinate system CS1 and the local coordinate system CS2 are coordinate systems based on known techniques. The world coordinate system CS1 is a first coordinate system fixed in the real space. The local coordinate system CS2 is a second coordinate system fixed to the display surface 5 seen from the viewpoint of the HMD 1 and the user. The inertia coordinate system CS3 is a third coordinate system for compensating for a lacking portion(s) in the world coordinate system CS1 and the local coordinate system CS2. It is assumed that a coordinate origin of the world coordinate system CS1 is an origin G1 and its direction is a direction DIR1. It is assumed that a coordinate origin of the local coordinate system CS is a origin G2 and its direction is a direction DIR2. It is assumed that a coordinate origin of the inertia coordinate system CS3 is an origin G3 and its direction is a direction DIR3.

The origin G3 of the inertia coordinate system CS3 is set to, for example, be the same as the origin G2 of the local coordinate system CS2, and follows the positions of the HMD 1 and the user's head and viewpoint. The direction DIR3 of the inertia coordinate system CS3 is set to be fixed to the direction DIR1 of the world coordinate system CS1. A front-face direction (direction DIR1) of the inertia coordinate system CS3 means a reference direction of the inertia coordinate system CS3. This direction DIR1 remains in a user's reference direction even when the user temporarily changes the direction of the head, in other words, even when the direction of the HMD 1 (corresponding rotation state) changes. The reference direction of the user is, for example, a body-trunk direction, and is an average direction to which a body or the like is directed. The direction DIR3 can be appropriately changed according to a predetermined operation (rotation-movement operation described later) of the user or to predetermined control of the HMD 1. A feature of the inertia coordinate system CS3 is that the origin G3 moves according to the movement of the user and the HMD 1 and the direction DIR3 is fixed with respect to rotation of the user's head and the HMD 1. Further, a feature of the inertia coordinate system CS3 is that a virtual object can be arranged in a space wider than a range of the display surface 5 of the local coordinate system CS2. Furthermore, a feature of the inertia coordinate system CS3 is that the user can appropriately refer to a virtual object lying at a part of a desired region by changing the direction of the head or changing the direction DIR3.

The HMD 1 calculates and sets the direction DIR2 of the local coordinate system CS2 and the direction DIR3 of the inertia coordinate system CS3 as directions with respect to the world coordinate system CS1 on the basis of the direction DIR1 of the world coordinate system CS1. The HMD 1 represents the direction DIR2 and the direction DIR3 by a rotation operation when the world coordinate system CS1 is rotated. Calculation of such a rotation operation of a vector in a three-dimensional space can be realized by using the above-mentioned Euler angles or normalized quaternions.

[World Coordinate System]

FIG. 22 shows an explanatory diagram of the world coordinate system CS1. The world coordinate system CS1 is a coordinate system in which one point fixed in the real space is set as the origin G1 and that has three coordinate-axis directions constituting a three-axis orthogonal coordinate system fixed in the real space. The three coordinate-axis directions of the world coordinate system CS1 are represented by $(X_W, Y_W, Z_W)$. The position of the world coordinate system CS1 is represented by a positional coordinate $(x_{W0}, y_{W0}, z_{W0})$ of the origin G1. The direction DIR1 of the world coordinate system CS1 is represented by one coordinate-axis direction, for example, an axis $X_W$. The position of the virtual objects arranged in the world coordinate system CS1 is represented by coordinates $(x_W, y_W, z_W)$. An axis $Z_W$ is aligned with a vertical direction. Axes $X_W$ and $Y_W$ are aligned with two orthogonal directions that are composed of a horizontal plane.

A lower side of FIG. 22 shows an example of arranging a virtual object in the world coordinate system CS1 and an example of moving the user and the HMD 1. For example, it is assumed that the virtual object V1 is arranged at a position $(x_{W1}, y_{W1}, z_{W1})$ of a point Pw1. A virtual surface 221 indicates a virtual plane (corresponding to a visual-field range) in which the point Pw1 is arranged. A direction 222 indicates an arrangement direction of the virtual object V1. First, it is assumed that the user and HMD 1 are at a position $(x_{W2}, y_{W2}, z_{W2})$ of a point Pw2. It is assumed that the point Pw2 is a center of the HMD 1 and head and corresponds to a viewpoint. A direction 223 indicates a front-face direction of the HMD 1 and a direction of the user's head. Apart from this direction, there is also a user's line-of-sight direction. It is assumed that the user and the HMD 1 have moved from the point Pw2 to a position of a point Pw3, for example. It is assumed that the directions of the HMD 1 and head change to a direction 224 according to this movement. The position (point Pw1) and the direction 222 of the virtual object V1 arranged in the world coordinate system CS1 do not change with respect to this movement and rotation (corresponding position change and direction change). When the virtual object is viewed from the user, the appearance of the virtual object V1 changes. The user cannot see the virtual object V1 well depending on its moved state.

[Local Coordinate System]

FIG. 23 shows an explanatory diagram of the local coordinate system CS2. The local coordinate system CS2 is a three-axis orthogonal coordinate system. Three coordinate-axis directions of the local coordinate system CS2 are indicated by $(X_L, Y_L, Z_L)$. The HMD 1 calculates a position and a direction DIR2 of the origin G2 of the local coordinate system CS2 with respect to the world coordinate system CS1 set at a time of initialization. A position of the local coordinate system CS2 is represented by a position $(x_{L0}, y_{L0}, z_{L0})$ of the origin G2. The direction DIR2 of the local coordinate system CS2 is represented by one axial direction, for example, an axis $X_L$. A position of a virtual object arranged in the local coordinate system CS2 is represented by coordinates $(x_L, y_L, z_L)$. The origin G2 of the local coordinate system CS2 is set with respect to the position of the HMD 1, the position of the head, and the position of the viewpoint.

A lower side of FIG. 23 shows an example of moving the user and the HMD 1 in the world coordinate system CS1 and an example of arranging a virtual object in the local coordinate system CS2. For example, first, the user and HMD 1 are at a position $(x_{W4}, y_{W4}, z_{W4})$ of point P$_{w4}$. The axis $X_L$ of the local coordinate system CS2 is set so as to be aligned with the front-face direction of the HMD 1 and the direction of the head. A right-left direction of the head becomes an axis $Y_L$, and a vertical direction thereof becomes an axis $Z_L$. At this time, it is assumed that the virtual object V1 is arranged on a virtual surface 231 (corresponding to visual-field range) corresponding to the local coordinate system CS2, for example, at a position $(x_{L1}, y_{L1}, z_{L1})$ of point PL1. According to the movement, it is assumed that the user and the HMD 1 have moved from a position of point Pw4 to a position of point Pw5. Moreover, according to the movement, it is assumed that the directions of the HMD 1 and the head change from a direction 233 to a direction 234. For example, the direction of the head is rotating to the right. With respect to this movement and rotation, a state of the local coordinate system CS2 is maintained, and the appearance of the virtual object V1 on the virtual surface 231, which is seen by the user, is maintained.

[Inertia Coordinate System (1)]

Figure 24:
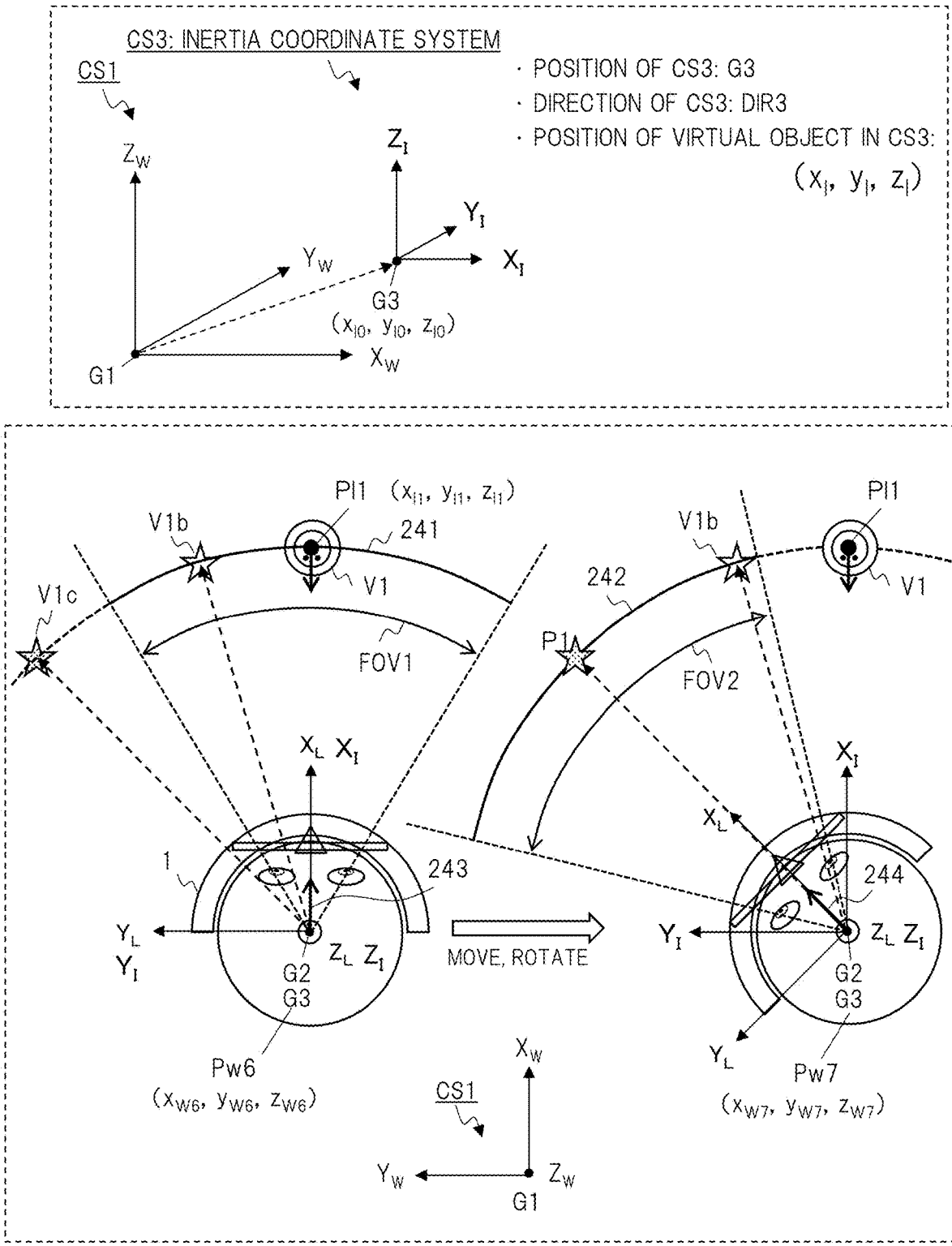
FIG. 24 is an explanatory diagram of an inertia coordinate system in the first embodiment.

FIG. 24 shows an explanatory diagram of the inertia coordinate system CS3. In the inertia coordinate system CS3, three coordinate-axis directions are indicated by $(X_I, Y_I, Z_I)$. A position of the inertia coordinate system CS3 is represented by a position $(x_{I0}, y_{I0}, z_{I0})$ of the origin G3. A direction DIR3 of the inertia coordinate system CS3 is represented by one axial direction, for example, an axis $X_I$. A position of a virtual object arranged in the inertia coordinate system CS3 is represented by coordinates $(x_I, y_I, z_I)$.

A lower side of FIG. 24 shows an example of moving the user and the HMD 1 in the world coordinate system CS1 and an example of arranging a virtual object in the inertia coordinate system CS3. For example, first, the user and the HMD 1 are at a position $(x_{W6}, y_{W6}, z_{W6})$ of point Pw6 ($x_{W6}$, $y_{W6}$, $z_{W6}$). At this position, the origin G2 of the local coordinate system CS2 and the origin G3 of the inertia coordinate system CS3 are set. A front-face direction (axis $X_I$) of the inertia coordinate system CS3 is set so as to match with the direction DIR1 (axis $X_W$) of the world coordinate system CS1. Three axes of the inertia coordinate system CS3 are superimposed with the three axes of the local coordinate system CS2. At this time, on the display surface 5, it is assumed that the virtual object V1 is arranged on a virtual surface 241 (corresponding to visual-field range FOV1) corresponding to the inertia coordinate system CS3, for example, at a position $(x_{j1}, y_{j1}, z_{j1})$ of point $P_{j1}$. Further, another virtual object V1b is arranged at a left-side position on the visual surface 241. Moreover, yet another visual object V1c is arranged at a position outside the visual-field range FOV1 on an extension of the virtual surface 241.

It is assumed that the user and the HMD 1 have moved from a point of point Pw6 to a position of point Pw7, for example. Further, it is assumed that the directions of the HMD 1 and the head change from a direction 243 to a direction 244 according to this movement. For example, the direction of the head is rotated to the left by about 45 degrees. In response to this movement and rotation, the origin G3 of the inertia coordinate system CS3 moves following the origin G2. Meanwhile, the direction DIR3 (axis $X_j$) of the inertia coordinate system CS3 is fixed to the direction DIR1 of the world coordinate system CS1 similarly to a pre-movement case. The visual-field range seen from the user's viewpoint changes to a visual-field range FOV2 according to the rotation of the head. On the display surface 5, the visible virtual object is changing on the virtual surface 242 corresponding to the visual-field range FOV2. On the virtual surface 242, the virtual objects V1b and V1c are displayed, and the virtual object V1 is invisible. In this way, a display region of the virtual object on the inertia coordinate system CS3 can be changed according to the directions of the HMD 1 and the user's head.

Each of the virtual surfaces 241 and 242 of FIG. 24 shows a case where they are curved surfaces. The grid K1 arranged in the inertia coordinate system CS3 may have a planar configuration or a curved surface configuration. When the virtual object is arranged in the inertia coordinate system CS3, the HMD 1 calculates an arrangement position etc. of the virtual object in the grid K1 of the inertia coordinate system CS3. When a range of the display surface includes a virtual object arranged on the grid K1 of the inertia coordinate system CS3, the HMD 1 displays the virtual object.

[Inertia Coordinate System (2)]

FIG. 25 shows a configuration example and the like when the grid K1 is arranged in the inertia coordinate system CS3. In an example of FIG. 25, the positions of the user and the HMD 1 are set as the origin G3 of the inertia coordinate system CS3, and a plurality of virtual surfaces (virtual surfaces VS1, VS2, and VS3, etc.) are arranged around the origin G3 along a substantially cylindrical surface. The plurality of virtual surfaces constitute, as a whole, a region of one substantially cylindrical surface. In this example, each virtual surface is a two-dimensional plane. An image 251 of the display surface 5 is present with respect to the direction DIR1 (axis $X_j$) of a front face of the inertia coordinate system CS3. A virtual surface VS1 is present in the image 251. A grid K31 is arranged on the virtual surface VS1. A virtual surface VS2 is present next to and on a left side of the virtual surface VS1, and a virtual surface VS3 is present next to and on a right side of the virtual surface VS1. A grid K32 is arranged on the virtual surface VS2, and a grid K33 is arranged on the virtual surface VS3. The grids K31, K32, K33 and the like constitute one grid K3 of the inertia coordinate system CS3, and the grid K3 is arranged in a region of the substantially cylindrical surface. The virtual objects can be arranged on the grid of each virtual surface. For example, virtual objects v1, v2, and v3 are arranged on the grid K31 of the virtual surface VS1. A virtual object v4 is arranged on the grid K32 of the virtual surface VS2. A virtual object v5 is arranged on the grid K33 of the virtual surface VS3. Similar to FIG. 24, the user can display the virtual object v4 on the virtual surface VS2 and the virtual object v5 on the virtual surface VS3 in the display surface 5 by changing the direction of the head.

In addition, as another operation, the user can also perform a rotation-movement operation of the inertia coordinate system CS3. This operation is one of the coordinate-system setting instructions in step S10 of FIG. 10 described above. The user can perform, for example, a left-rotation operation 252 and a right-rotation operation 253. This operation can be defined as a predetermined operation by using a voice method, a gesture method, or the like. As an example, the operation may be a gesture of moving the hand to the left or right like a swipe operation. In the case of the voice method, for example, the operation may be an input such as "left rotation". When the HMD 1 recognizes this rotation-movement operation, it rotates the direction DIR3 (axis $X_j$) of the inertia coordinate system CS3. For example, it is assumed that the left-rotation operation 252 is performed from a state of (A). (B) shows a state after the rotation. The axis $X_j$ and the axis $Y_j$ are rotated around the axis $Z_j$ (vertical direction), for example, about 45 degrees. In an image 251b of the display surface 5, the virtual surface VS1 is moved to the left, and the virtual surface VS3 that has been on a right side is displayed near a center. Consequently, the virtual object v5 is visible in the display surface 5.

When using this rotation-movement operation, the user can change a view of the virtual object on the grid K3 of the inertia coordinate system CS3 without needing to rotate the head. Further, a real thing, a virtual object on the world coordinate system CS1, and a virtual object on the local coordinate system CS2 are also displayed together on the display surface 5. Therefore, the user can switch the virtual objects to be displayed on the inertia coordinate system CS3 in the display surface 5 while visually recognizing, at the same position, the real thing, the virtual object on the world coordinate system CS1, and the virtual object on the local coordinate system CS2. The user can handle a large number of virtual objects by using a wide space of the inertia coordinate system CS3 as an extended region of the display surface 5, and efficient work is possible. The user can also set and instruct an on/off state etc. of use of the inertia coordinate system CS3.

The user can also handle each virtual surface as a group as an example of using the inertia coordinate system CS3. For example, the user can work by using, quite differently, a plurality of virtual objects arranged on the virtual surface VS1 as a first group, a plurality of virtual objects arranged on the virtual surface VS2 as a second group, and the like. By the operation of designating the virtual surface or group, the user can also move the designated virtual surface or group to the center of the display surface 5. The operation of designating the virtual surface or group may be, for example, an operation of a frame line of a region, or designation of a group ID or the like. In addition, the HMD 1 can collectively move a plurality of virtual objects between groups of the virtual surfaces. The user designates a movement-source group and a movement-destination group as predetermined operations. For example, in the case of the voice method, the user inputs "move the first group to the second group" or the like. The HMD 1 collectively moves all the virtual objects in the virtual surface VS1 together into the virtual surface VS2 according to the operation. Furthermore, at this time, while maintaining an arrangement-positional relationship between the plurality of virtual objects on the grid K31 of the movement-source virtual surface VS1 as much as possible, the HMD 1 automatically arranges them on the grid K32 of the movement-destination virtual surface VS2. Alternatively, the HMD 1 may select a plurality of vacant points from the movement-destination grid K32 and arrange the plurality of movement-source virtual objects in a state of being automatically aligned. The movement of such groups is similarly possible also between different coordinate systems. By the movement in units of group, time and effort involved in moving the plurality of virtual objects can be greatly reduced.

Further, as a modification example, an exchange operation may be possible in units of virtual surface or group. The user designates two virtual surfaces or groups that he/she wants to exchange. For example, the user designates the virtual surface VS1 and the virtual surface VS2. The HMD 1 moves them so as to exchange a group of all virtual objects on the virtual surface VS1 and a group of all virtual objects on the virtual surface VS2 according to the operation, and updates setting information.

[Inertia Coordinate System (3)]

Figure 26:
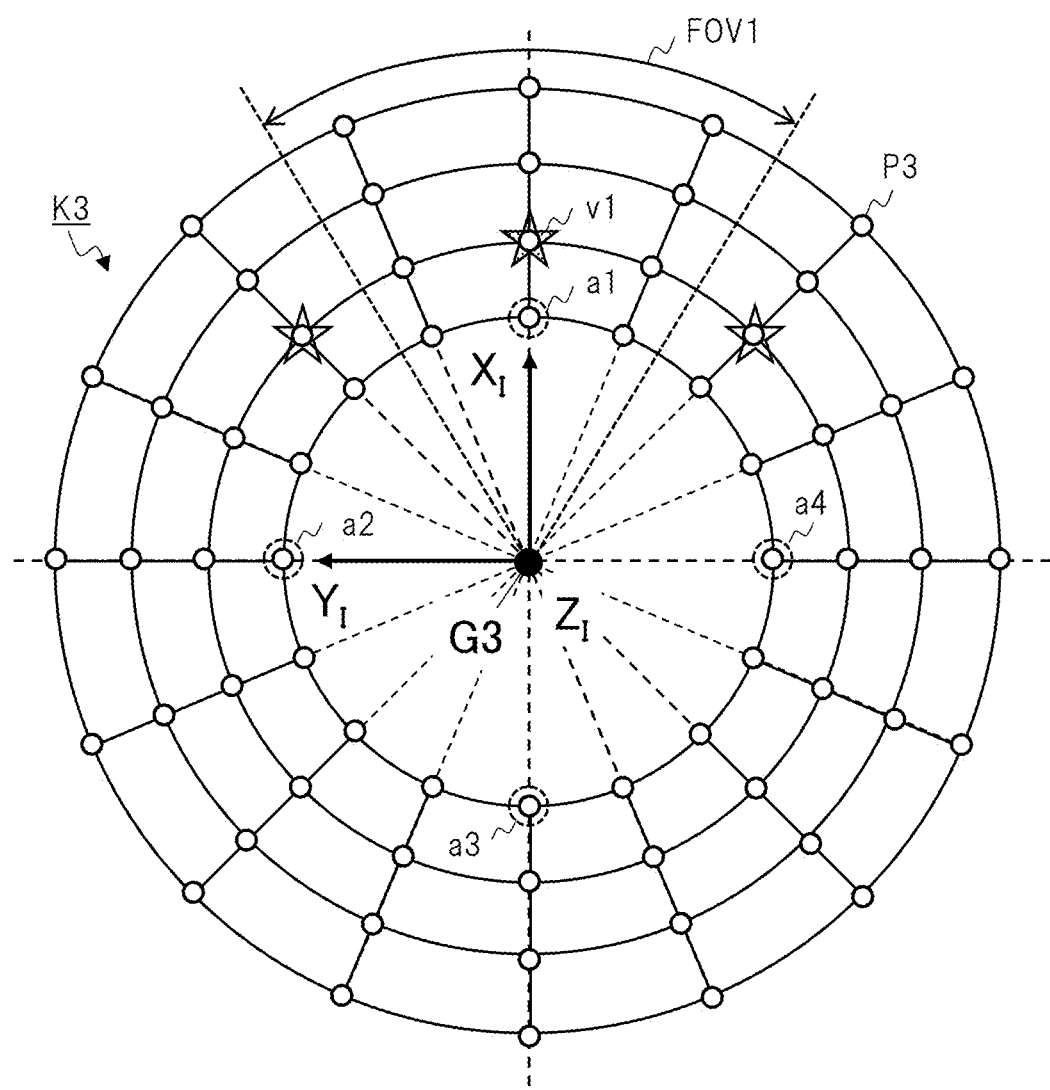
FIG. 26 is a view showing another configuration example of the grid in the inertia coordinate system in the first embodiment.

FIG. 26 shows another configuration example of the grid K3 in the inertia coordinate system CS3. The grid K3 is formed on a cylindrical surface. Grid lines are set so as to extend radially from the origin G3 of the inertia coordinate system CS3 corresponding to a position of the user's viewpoint toward directions of the axis $X_I$ and the axis $Y_I$. A cylindrical surface is present at a predetermined-distance position (for example, four positions) in directions of the axis $X_I$ and the axis $Y_I$ (radial direction of the cylinder). The grid lines are present also in a circumferential direction of the cylindrical surface. Point P3, which is a grid point, is provided on each cylindrical surface. Points P3 are present in all directions from the origin G3. The HMD 1 displays, in the display surface 5, a portion of a region, which corresponds the visual-field range FOV1 in the front-face directions of the user and the HMD 1, out of the grind K3. For example, in the visual-field range FOV1 when the direction of the HMD 1 coincides with the axis $X_I$, the virtual object v1 is displayed.

Figure 27:
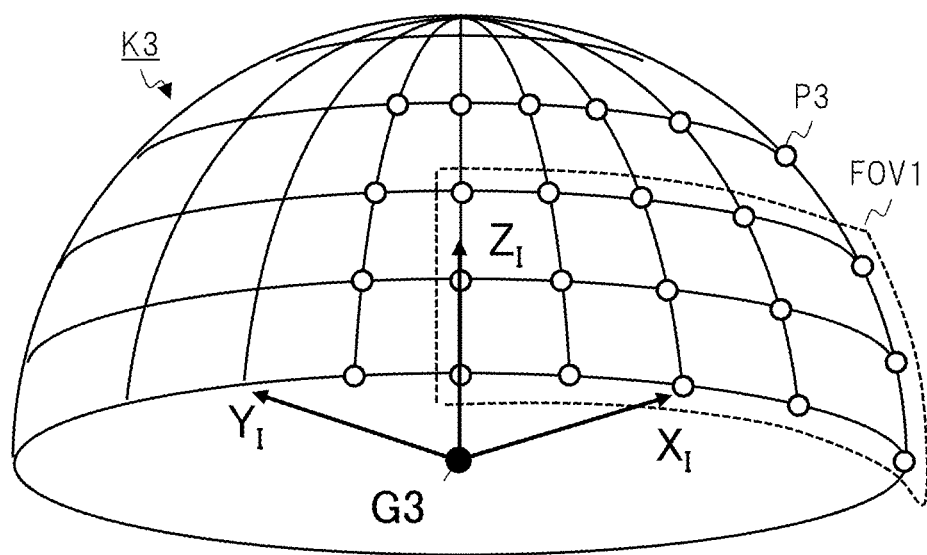
FIG. 27 is a view showing another configuration example of the grid in the inertia coordinate system in the first embodiment.

FIG. 27 shows another configuration example of the grid K3 in the inertia coordinate system CS3. The grid K3 is formed on a hemispherical face. Grid lines are provided onto the hemispherical face at a position of a predetermined distance in the directions (radial direction) of the axis $X_I$ and the axis $Y_I$ from the origin G3 of the inertia coordinate system CS3 corresponding to the user's viewpoint position. Although one hemispherical face is shown, similarly, grid lines may be provided on the hemispherical face at a plurality of positions in the radial direction. Point P3 is provided on each hemispherical face. The HMD 1 displays, on the display surface 5, a portion of a region, which corresponds to the visual-field range FOV1 in the front-face directions of the user and the HMD 1, out of the grid K3. In a case of this configuration, for example, even when the user rotates the direction of the head up and down, a region of the inertia coordinate system CS3 corresponding to the direction can be used. In the above example, an orthogonal-shape grid is applied to the world coordinate system CS1 and the local coordinate system CS2, and a curved-shape grid is applied to the inertia coordinate system CS3. However, the present embodiment is not limited to this, and an arbitrary-shape grid can be applied to an arbitrary coordinate system.

[Inertia Coordinate System (4)]

Figure 28:
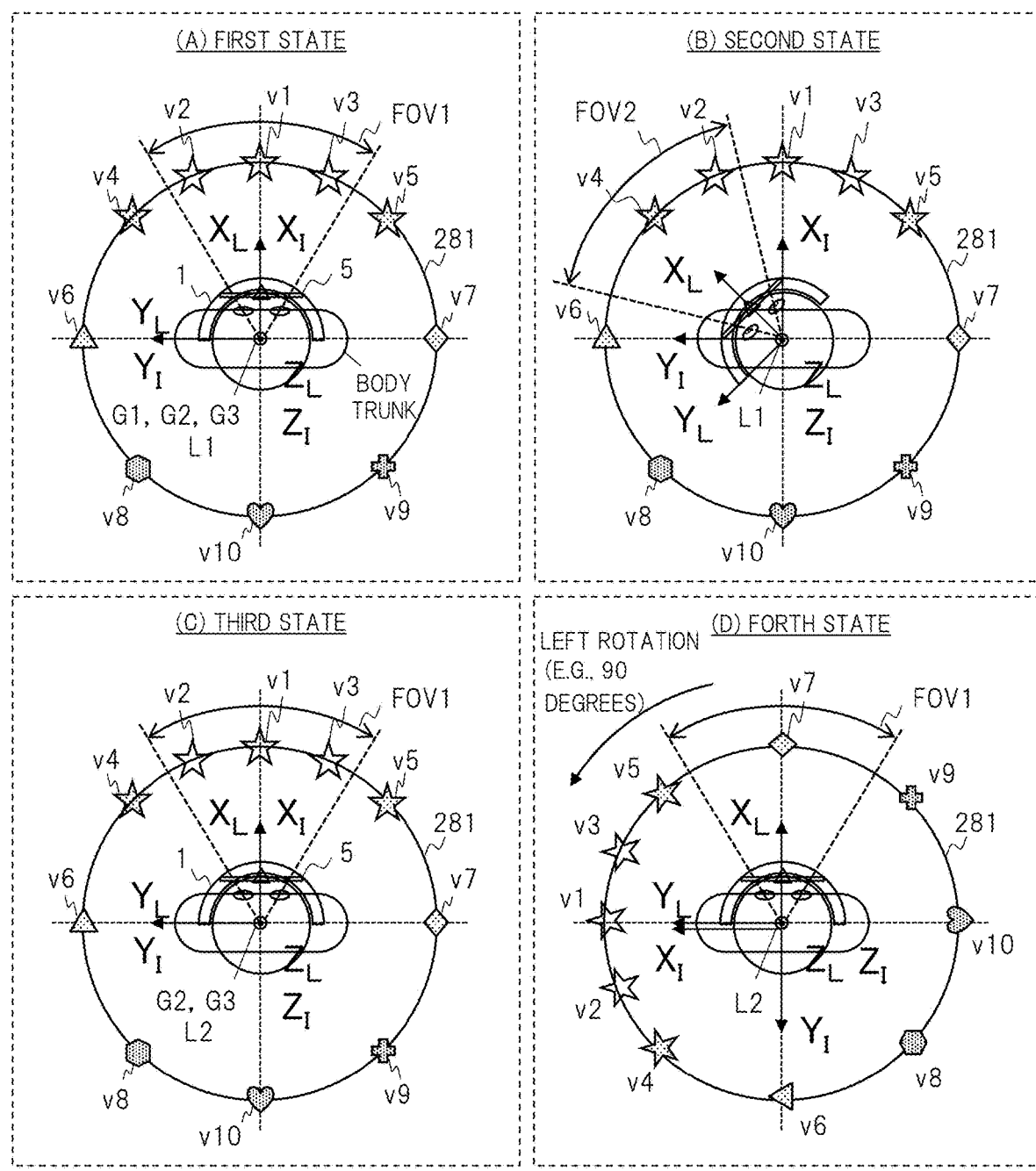
FIG. 28 is a view showing an example of handling a plurality of virtual objects by using the grid in the inertia coordinate system in the first embodiment.

FIG. 28 shows an example of handling a plurality of virtual objects by using a grid of the inertia coordinate system CS3. It will be described with reference to FIG. 28 that a large number of virtual objects can be arranged by using the grid of the inertia coordinate system CS3. First, in a first state of (A), it is assumed that the user and the HMD 1 are at a position L1. The origins G1, G2, and G3 correspond to the position L1. A virtual surface 281 corresponds to a grid on one cylindrical surface. A plurality of virtual objects, for example, virtual objects v1, v2, v3, v4, v5, v6, v7, v8, v9, and v10 are arranged at respective positions in a circumferential direction on the virtual surface 281. The directions of the user's head and line of sight are the same as that of the axis $X_I$. At this time, the virtual objects v1, v2, and v3 are displayed in the visual-field range FOV1 on the display surface 5. Next, in a second state of (B), the user is rotating a head direction to the left by about 45 degrees at the same position L1. At this time, the virtual objects v2 and v4 are displayed in a visual-field range FOV2 on the display surface 5. In this way, the user can refer to the virtual object v4 or the like outside the visual-field range FOV1.

Next, in a third state of (C), the user and the HMD 1 are moving from the position L1 to a position L2. The origins G2 and G3 are associated with the position L2. Along with this movement, the origin G3 moves in parallel, and the plurality of virtual objects (virtual objects v1 to v10) of (A) follow and move it with a positional relationship therebetween maintained. At this time, the virtual objects v1, v2, and v3 are also displayed in the visual-field range FOV1 on the display surface 5. In this way, the user can easily move a large number of virtual objects.

Next, in a fourth state of (D), the user is performing a rotation-movement operation of the inertia coordinate system CS3 at a position L2, for example, rotating left at a rotation angle of 90 degrees. Consequently, the direction DIR3 (axis $X_I$) of the inertia coordinate system CS3 is changed to a left-hand direction (axis $Y_L$ of the local coordinate system CS2). Along with the rotational movement, the plurality of virtual objects on the virtual surface 281 are each rotating at a rotation angle of 90 degrees. At this time, the virtual object v7 is displayed in the visual-field range FOV1 on the display surface 5. In this way, the user can arrange, at a front face, the virtual object in the desired region on the inertia coordinate system CS3 and refer to it.

As described above, the user can handle a large number of virtual objects with less effort by using the grid of the inertia coordinate system CS3. The direction DIR3 of the inertia coordinate system CS3 can be maintained so as to align with a user's reference direction (for example, body-trunk direction). The user arranges, for example, a virtual object, which he/she wants to confirm or operate frequently, in the region of the inertia coordinate system CS3. The user normally performs main work in, for example, a region near the center of the display surface 5 and, if necessary, rotates in the head's direction or performs the rotation-movement operation, thereby being able to refer to other virtual objects on the inertia coordinate system CS3.

Further, as an applied example, the HMD 1 may set a plurality of directions in the region of the inertia coordinate system CS3. For example, in the grid arranged on a cylindrical surface as shown in FIG. 26, a plurality of directions, in other words, a plurality of positions (for example, positions a1, a2, a3, a4) on the region of the cylindrical surface may be set. The HMD 1 selects the direction (corresponding position) according to the user's operation and displays, at the center of the display surface 5, a region in the selected direction. For example, the user may divide a plurality of virtual objects into a plurality of groups and set the above-mentioned direction for each group according to the purpose of the work or the like. For example, in FIG. 26, the virtual object of the first group is arranged at a position a1 in the front-face direction (positive direction of axis $X_I$). Similarly, the second group is arranged at a position a2 in the left-hand direction (positive direction of axis $Y_I$); the third group is arranged at a position a4 in the right-hand direction (negative direction of axis $Y_I$); and the fourth group is arranged at the position a4 in a back direction (negative direction of axis $X_I$). The user can display, on the display surface 5, the group in the direction selected according to the work.

The rotation of the direction DIR3 of the inertia coordinate system CS3 as shown in (D) of FIG. 28, in other words, the change of the displayed region of the inertia coordinate system CS3 may be temporary. That is, the HMD 1 maintains, for example, the fourth state of (D) for a predetermined time from a time of receiving the rotation-movement operation from the user, and may automatically return to the original third state of (C) after lapse of that time. Alternatively, the HMD 1 may maintain its fourth state while the user makes a predetermined gesture. Further, the HMD 1 may have an inertia (corresponding speed change) in changing the display state so as to change the direction DIR3 of the inertia coordinate system CS3.

As another example of the rotation-movement operation, the user designates a target virtual object on the inertia coordinate system CS3 by a predetermined operation, and the HMD 1 may change the direction DIR3 of the inertia coordinate system CS3 so that the target virtual object is displayed at a central position of the display surface 5. As another example of the rotation-movement operation, an operation in which the user rotates his/her head to the left or right may be used. For example, the HMD 1 changes the direction DIR3 of the inertia coordinate system CS3 as shown in an example of (D) in response to an action of the user rotating the head to the left so as to change from (A) to (B).

As another example, the HMD 1 may automatically change the direction DIR3 of the inertia coordinate system CS3 so as to align with the reference direction of the user. The HMD 1 use a camera 6 and a sensor 70 to detect the reference direction (for example, body-trunk direction) of the user. In this case, when the user changes, for example, a body's direction, the direction DIR3 is changed following the direction. The reference direction of the user may be limited to a horizontal direction. When the user is moving, a movement direction may be used as the reference direction. The HMD 1 may set the direction DIR3 of the inertia coordinate system CS3 so as to match with the reference direction of the user at a time of an initialization processing. Further, the user can switch between a state in which the direction DIR3 of the inertia coordinate system CS3 can be changed (stationary state) and a state in which it cannot be changed (fixed state) according to a setting or an instruction.

[Setting of Coordinate System]

An example of a method of resetting three types of coordinate systems during an initialization processing (step S2 in FIG. 2 described above) at a time of starting the HMD 1 is as follows. At the time of the initialization processing, the HMD 1 sets the world coordinate system CS1 (origin G1 and direction DIR1) on the basis of a position and a posture of the HMD 1 at that time. The coordinate system calculator 13 detects a gravity's direction based on a three-axis acceleration sensor, and resets the world coordinate system CS1 from the gravity' direction and the axis $X_L$ of the local coordinate system CS2. At a time of initialization, the HMD 1 aligns the origin G1 of the world coordinate system CS1 with the origin G2 of the local coordinate system CS2. Further, the HMD 1 sets the origin G3 of the inertia coordinate system CS3 so as to be aligned with the origin G2 of the local coordinate system CS2 at the time of initialization, and sets the direction DIR3 of the inertia coordinate system CS3 so as to be aligned with the direction DIR1 of the world coordinate system CS1. The coordinate system calculator 13 adds, to coordinate-system information 31, information on positions (origins G2, G3), directions (directions DIR2, DIR3), and a gravitational acceleration vector at the time of initialization of the local coordinate system CS1 and the inertia coordinate system CS3 on the basis or the world coordinate system CS1, and stores them.

After the initialization, the HMD 1 uses the sensor 70 to track changes in position and posture of the HMD 1, and updates the settings of each coordinate system at any time according to the changes. The HMD 1 updates a measured value(s) of each sensor 70 including an acceleration vector detected by the acceleration sensor and an angular velocity vector detected by the gyro sensor. The coordinate system calculator 13 updates a position (origin G2) and a direction DIR2 of the local coordinate system CS2 on the basis of the world coordinate system CS1 based on the updated acceleration vector and angular velocity vector. The coordinate system calculator 13 stores the updated information in the coordinate-system information 31. The coordinate system calculator 13 updates a position (origin G3) and a direction DIR3 of the inertia coordinate system CS3 on the basis of the world coordinate system CS1 based on the updated position (origin G2) and direction DIR2 of the local coordinate system CS2, the rotation-movement operation of the inertia coordinate system CS3, and the like. The coordinate system calculator 13 stores the updated information in the coordinate-system information 31. The HMD 1 may use positional information obtained by the GPS receiver and azimuthal information obtained by the geomagnetic sensor as an aid of the calculation of each coordinate system.

In the above example, the origin G3 of the inertia coordinate system CS3 is the same as the origin G2 of the local coordinate system CS2. However, the present embodiment is not limited to this, and the origin G3 may be set at a position away from the origin G2. Further, in the above example, a case of rotation around the vertical axis ($Z_W$, $Z_L$, $Z_I$) has been described. However, the present embodiment is not limited to this, and rotation control can be similarly performed even in a case of other axes. The setting of the axis $Z_I$ of the inertia coordinate system CS3 may be restricted so as to be aligned with the axis $Z_W$ of the world coordinate system CS1, that is, the vertical direction.

[Three-Dimensional Grid (1)]

The above-mentioned grid K1 is not limited to the example as shown in FIG. 11, and may have a large number of points P1. Further, the grid K1 is not limited to a two-dimensional grid, and may be a three-dimensional grid. In that case, since the number of points P1 which become candidate increases in the display surface 5, their positions can be specified more finely in the display surface 5. However, in that case, the number of IDs of the points P1 in the entire grid K1 also increases, and a range of ID values becomes large in order to be able to uniquely identify all the IDs. Devisal for this will be shown below.

FIG. 29 shows a configuration example of a three-dimensional grid as the grid K1. The grid K1 of (A) shows a case where points P1 and grid lines are lined in each direction of the three axes and have 3×3×3=27 points P1. An X direction is, for example, a depth direction corresponding to the axis $X_L$ of the local coordinate system CS2. When a unique ID by an ID mark M1 is assigned to all the points P1 of the entire grid K1 and is displayed, for example, ID=1 to 27 becomes necessary. By specifying this ID, the user can designate a point P1 which is an arrangement destination of the virtual object. An image 291 of (B) shows a display example of the grid K1 of (A) on the display surface 5. This example shows a case where the grid K1 is arranged in the local coordinate system CS2 and a central point P1 (ID=5) on a front surface of the grid K1 is arranged at a central position of the display surface 5 along the axis $X_L$. The user can arrange the virtual object V1 at a position on the grid K1 by, for example, designating the target virtual object V1 and designating the point P1 of the arrangement destination by the ID.

Figure 30:
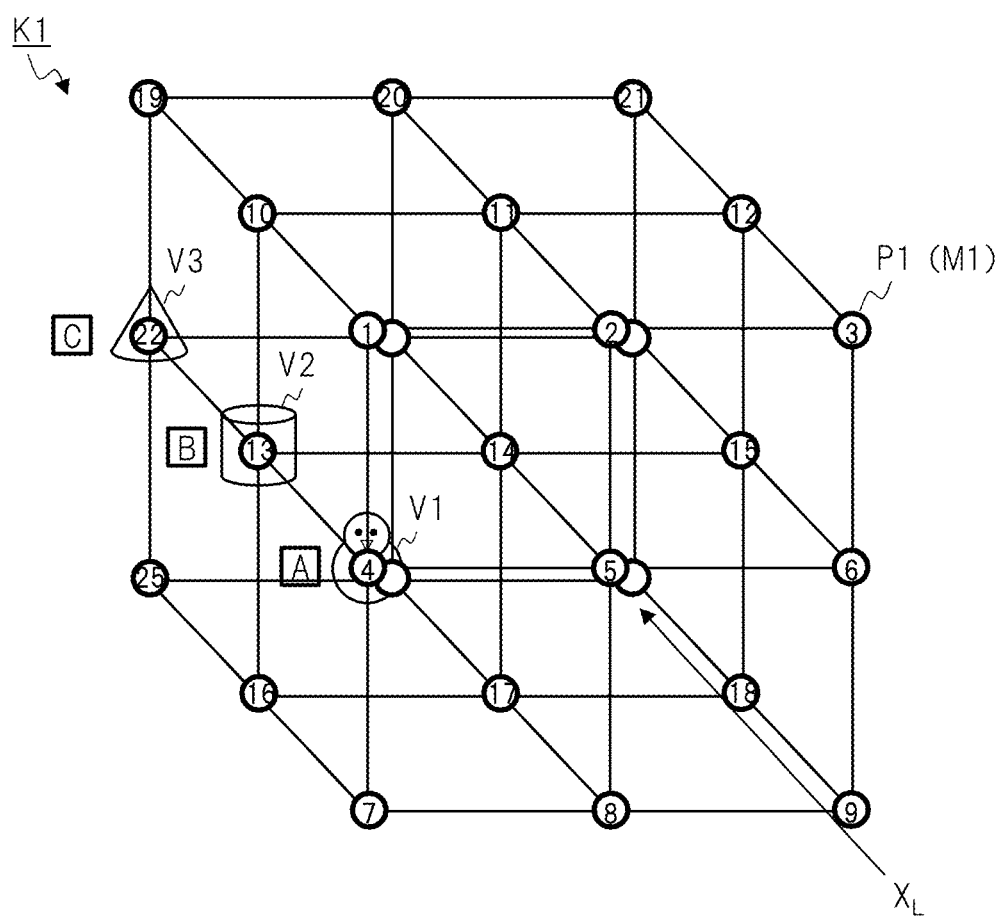
FIG. 30 is a view showing an arrangement example of the plurality of virtual objects with respect to the three-dimensional grid in the first embodiment.

FIG. 30 shows an example in which a plurality of virtual objects are arranged on the same grid K1 by using a plurality of points P1 in the depth direction (axis $X_L$). Virtual objects V1, V2, and V3 are arranged in order from a front with respect to, for example, three points P1 having ID=4, 13, and 22 out of the grid K1. In this way, the user can arrange the plurality of virtual objects also in the depth direction by using the three-dimensional grid. The user can arrange many virtual objects in a limited region of the display surface 5. Incidentally, the virtual objects arranged in the depth direction seen from the user's viewpoint may be made different in display size with respect to the point P1 on the three-dimensional grid depending on a distance from the user to the virtual object. That is, the display size may be reduced as the distance between the virtual objects increases. In this way, the plurality of points P1 and the plurality of virtual objects may be lined up in the depth direction seen from the user's viewpoint. Therefore, the devisal of the display described later is effective so that the user can easily see them.

Further, when the user wants to arrange the visual objects in the same manner as the example of FIG. 30, such arrangement is possible also by operating the arrangement for each individual virtual object, but the following is also possible as another operation example. As an operation example, the user first designates the target virtual objects V1, V2, and V3, their groups, or the like. Next, the user designates a point P1 (for example, ID=4) at a desired position on the frontmost surface of the grid K1 (for example, a grid surface having ID=1 to 9). According to this operation, the HMD 1 selects three points P1 (ID=4, 13, and 22) corresponding to the number of target virtual objects in the depth direction from the designated point P1 having ID=4, and arranges the target virtual objects V1, V2, and V3 one to one with respect to those points P1.

The number of points P1 is not limited to the above example, and various settings such as 8×8×8=512 can be utilized. As a default setting, the HMD 1 can select and adjust the grid K1 by the user's setting since the grid K1 (including the number and density, etc. of points P1) having various configurations is prepared.

As a modification example, a configuration in which the ID by the ID mark M1 is not displayed for each point P1 of the grid K1 is also possible. In this case, an image representing the point P1 of the grid K1 and an image representing the grid line are displayed on the display surface 5, and an ID image such as a number is not displayed thereon. The user cannot designate the ID by the voice method, but the user can designate the position etc. of the arrangement destination of the virtual object by an operation (for example, a gesture such as touch, and pointing with a cursor) of designating the point P1, the grid line, or the grid region through another method. Further, in operating the arrangement of the virtual objects, a plurality of operating means may be used in combination. For example, the user designates the target virtual object by a first operating method such as a voice method or a gesture method. Next, the user designates the arrangement-destination point P1 by any other second operating method different from the first operating method.

FIG. 31 shows a display example of a grid K1 and the like on a display surface 5 in a modification example. In this modification example, as shown in the image 311 of (A), the grid K1 (for example, a two-dimensional grid) is normally represented by a grid line, and the point P1 is an intersection of the grid lines. At this point P1, the above-mentioned circular ID mark or the like is not displayed. The ID mark (label) is not displayed also on the virtual object either. For example, when the user wants to move the virtual object V1 to a point p1 on the grid K1, the user designates the movement-destination point p1 without using the ID. This operation can be performed by using the gesture method or the like described above. An image 311b of (B) shows a case where the user designates the point p1 with his/her finger or the cursor of the operating tool 2. When the cursor or the like approaches an arbitrary point P1 on the grid K1 to some extent, the HMD 1 changes a display state of the approaching point P1. In this example, the cursor 312 shows a state of approaching in the vicinity of the point p1. The HMD 1 displays a circular image 313 representing the point P1 at: the point p1 lying at a position near the cursor 312; and four points P1 around the point p1. Furthermore, the HMD 1 may perform enlargement of the image 313, change of its color, or the like so as to emphasize one point p1 closest to the cursor 312. The HMD 1 makes the point p1, which is superimposed with the cursor 312, a provisionally selected state or a selective determination state, thereby putting it in the corresponding display state. Consequently, the user can easily select the point P1 even if the ID is not displayed on the grid K1.

[Three-Dimensional Grid (2)]

In the above example, a case where the IDs are displayed on all the points P1 of the grid K1 by the ID mark M1 is shown, but the ID may be displayed by the ID mark M1 only on a part of the points P1 of the grid K1. The HMD 1 determines a point P1 for displaying the ID and a point P1 for not displaying the ID according to the operation or the like of the user. The HMD 1 assigns and displays an ID value to and on the part of the points P1 for displaying the ID. Further, at that time, the HMD 1 may continue to use the same ID value consistently with respect to a certain point P1, or reassign an ID value appropriately. Consequently, the number of IDs displayed on the display surface 5 can be reduced and a range of the ID values can be narrowed as compared with a case where the IDs are displayed on all points P1 of the grid K1. Since an amount of information in the display surface 5 is suppressed for the user, it becomes easy to perform an operation etc. of designating the ID.

[Grid Control (1)]

Figure 32:
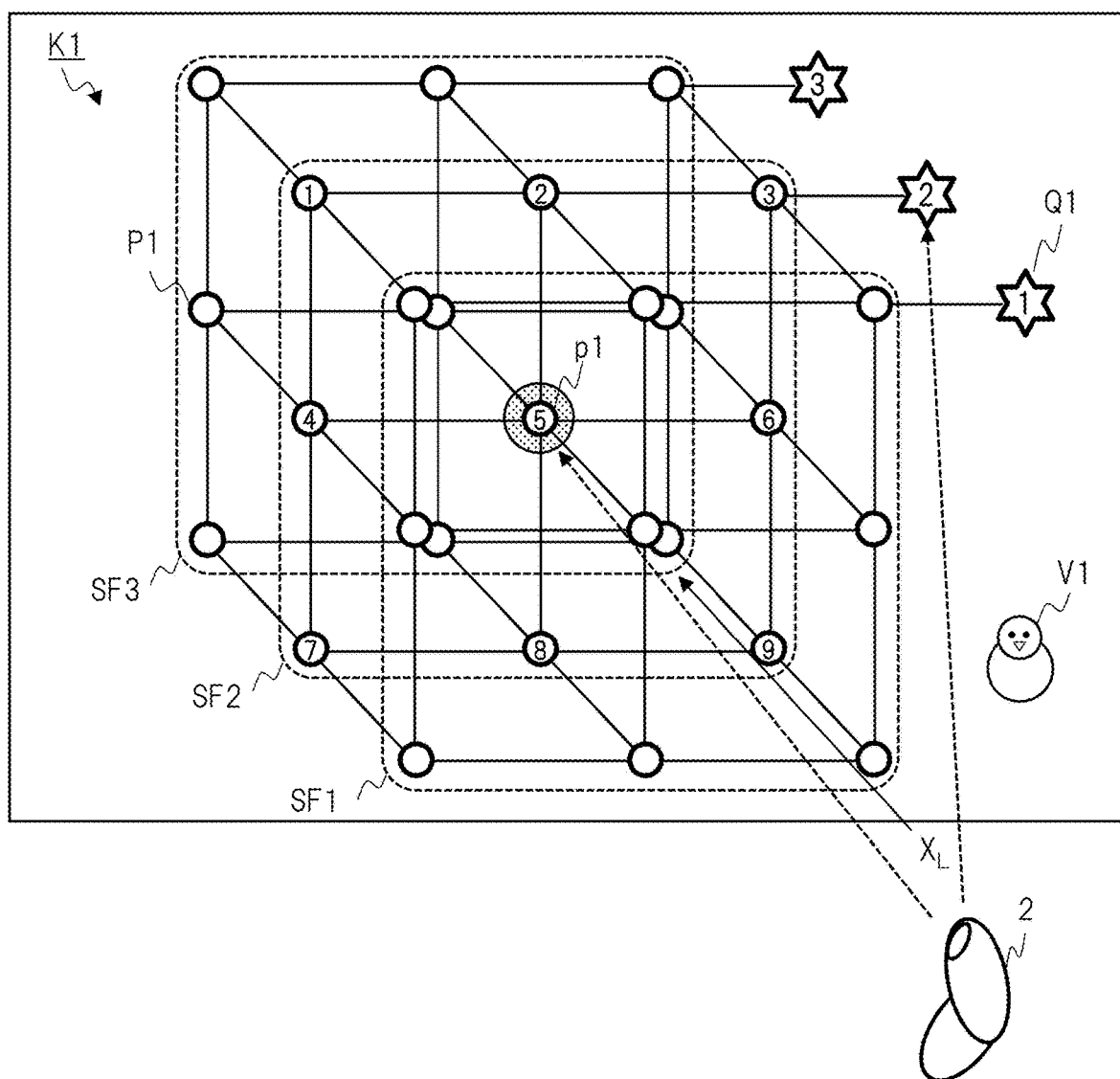
FIG. 32 is a view showing a display example about IDs of points in the three-dimensional grid in the first embodiment.

An example of display control regarding the ID of the point P1 on the grid K1 will be shown below. FIG. 32 shows an example in which an ID is displayed by an ID mark M1 only for a part of points P1, for example, only for a point P1 on a certain grid surface in a configuration example of a three-dimensional grid K1. The user can perform a selection operation or the like to the part of the points P1. The grid K1 of FIG. 32 is arranged in the world coordinate system CS1 for easy understanding in the explanation, and shows a case where the grid K1 is viewed from diagonally above as a user's viewpoint. Even when such a grid K1 is arranged in the local coordinate system CS2 or the inertia coordinate system CS3, the following control can be applied in the same manner. The grid K1 has three grid surfaces in the depth direction (axis $X_L$), and grid surfaces SF1, SF2, and SF3 are set from a front side. When displaying the grid K1 on the display surface 5, the HMD 1 displays an image of an ID mark Q1 representing each grid surface. In this example, as the ID mark Q1, ID=1 is assigned to the grid surface SF1, ID=2 is assigned to the grid surface SF2, and ID=3 is assigned to the grid surface SF3. The ID mark Q1 has, for example, a star shape so as to be distinguishable from other types of ID marks. The ID mark Q1 is displayed, for example, at a position connected by a line from one point P1 on the corresponding grid surface, but the ID mark Q1 is not limited to this and may adopt another mark. The grid line and the ID mark Q1 may be connected and displayed.

First, the ID mark M1 is not displayed at the point P1 of the grid K1. It is assumed that the user wants to arrange, for example, the virtual object V1 at the central point P1 of the grid K1. As a predetermined operation, the user designates a grid surface (for example, a grid surface SF2) including the arrangement-destination point P1 after designating the target virtual object. For example, in the voice method, this operation is an input of "the second surface" or the like and, in the cursor method or the like, is an operation of indicating the ID mark Q1 of ID=2. According to this operation, the HMD 1 puts only the designated grid surface SF2 in a provisionally selected state, and puts the other grid surfaces in not-selected states. The HMD 1 displays IDs (for example, 1 to 9) by the ID marks M1 for a plurality of points P1 belonging to the designated grid surface SF2. The HMD 1 accepts an operation of designating the point P1 with respect to the grid surface SF2 in the provisionally selected state, and does not accept the operation with respect to the grid surfaces SF1 and SF3 in the not-selected states.

Next, the user designates an arrangement-destination point P1, for example, a point p1 having ID=5 from the grid surface SF2 in the provisionally selected state. For example, in the voice method, the user inputs "No. 5" and, in the cursor method or the like, indicates the point p1 having ID=5. According to this operation, the HMD 1 puts the designated point p1 having ID=5 in a selective determination state. Then, the HMD 1 arranges the virtual object V1 at a position of the point p1 having ID=5. As described above, even when there are a large number of points P1 in the three-dimensional grid K1, the user can easily designate one point p1 from a range of a small ID value.

In addition, the user has provisionally selected a certain grid surface once and, thereafter, can easily reselect another grid surface. For example, when the user selects the grid surface SF3 from the provisionally selected state of the grid surface SF2, the user inputs "the third surface" or the like in the voice method. The HMD 1 puts the grid surface SF3 in the provisionally selected state, and displays the ID marks M1 for the plurality of points P1 belonging to the surface. At this time, the HMD 1 may reuse and display the same IDs as the IDs (1 to 9) used on the grid surface SF2 regarding the nine points P1 on the grid surface SF3, or may display different IDs (for example, IDs uniquely assigned to original grid K1). When the same ID is used on each grid surface, the range of ID values displayed on the display surface 5 can be limited to, for example, 1 to 9.

As another control example, a button for designating a grid surface may be provided in the display surface 5, and the button may be used instead of the ID mark Q1. As another control example, the HMD 1 does not display the ID mark Q1 or the like representing the grid surface in the display surface 5. When the user provisionally selects or selects and determines a certain point P1 or approaches the cursor or the like to it, the HMD 1 puts a depth-direction grid surface, to which the point P1 belongs, in the provisionally selected state and displays the ID mark M1.

Figure 33:
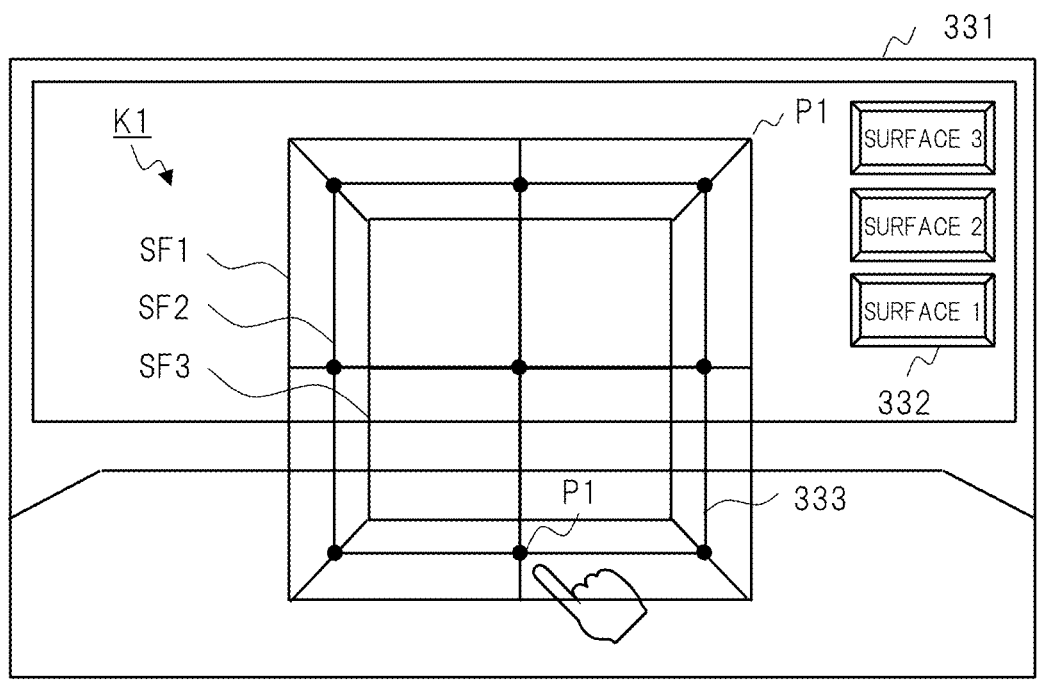
FIG. 33 is a view showing another display example of the three-dimensional grid in the first embodiment.

FIG. 33 shows another display example of a three-dimensional grid. The grid K1 is displayed in an image 331 of the display surface 5. First, the grid K1 does not display a point image or an ID mark M1 at the point P1. The user selects a grid surface, for example, a grid surface SF2. The user may select a grid surface by using a button 332 for designating the grid surface. The HMD 1 displays a point image (for example, a black circle) at the point P1 belonging to the designated grid surface SF2 according to the operation. In addition to the point image, an ID mark M1 may be displayed.

Other control examples may be as follows. The HMD 1 moves a virtual object within the three-dimensional grid K1 based on the user's operation. First, when the grid surface to which the movement-source point P1 arranging the target virtual object belongs and the movement-destination grid surface are the same, the HMD 1 displays an ID mark of each point P1 on the grid surface, to which both of them belong, and accepts the operation. When the grid surface to which the movement-source point P1 belongs and the movement-destination grid surface are different, the HMD 1 displays the ID mark M1 of each point P1 on the movement-destination grid surface, and accepts the operation.

As another control example, the corresponding grid surface may be selected by the selection and operation of the grid lines of the grid K1. For example, in FIG. 33, when the grid line 333 is selected and operated, the grid line 333 belongs to the grid surface SF2, and so can be associated with the selection of the grid surface SF2.

[Grid Control (2)]

Figure 34:
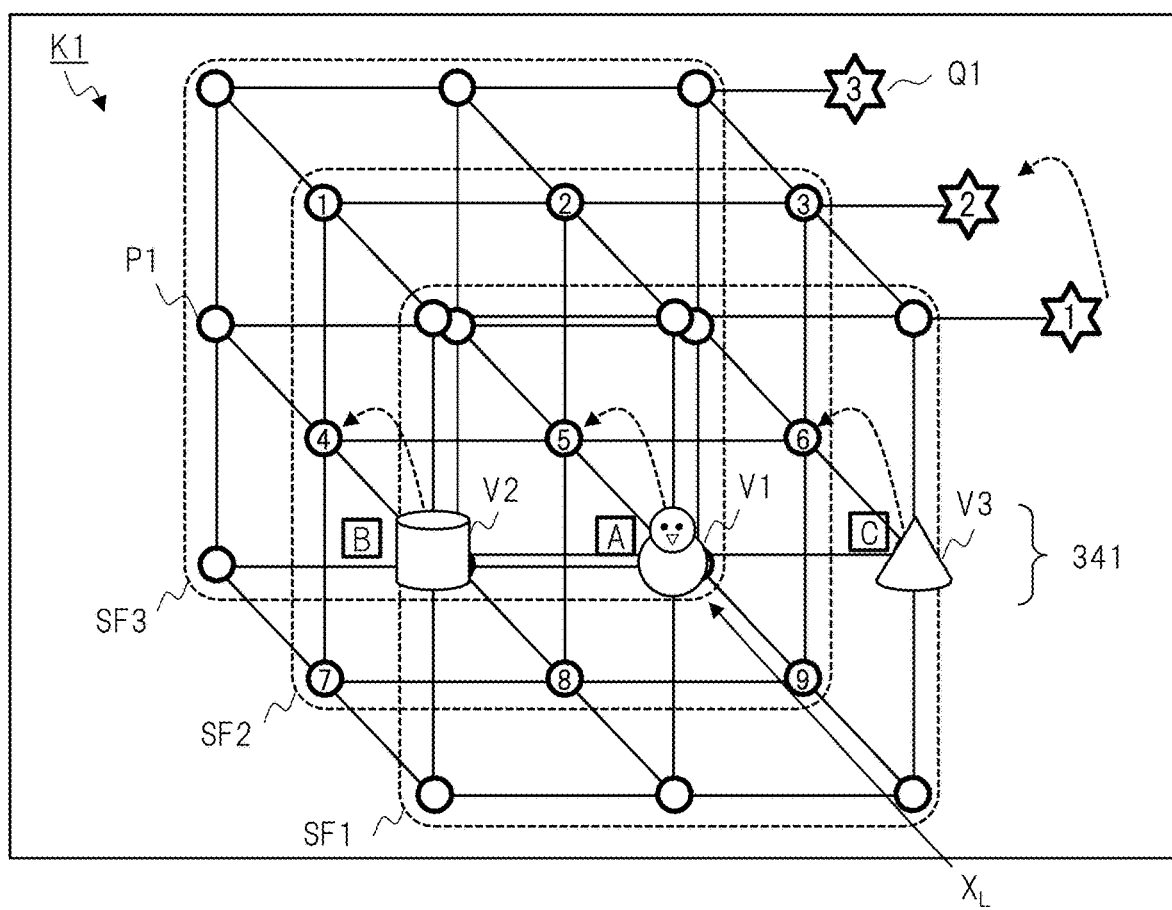
FIG. 34 is a view showing another display control example of the three-dimensional grid in the first embodiment.

FIG. 34 shows another display control example regarding the ID of the point P1 of the three-dimensional grid K1. Similar to FIG. 32, the three-dimensional grid K1 of FIG. 34 has a configuration in which each grid surface can be designated by the ID mark Q1. In this configuration, the user can move or exchange virtual objects between the grid surfaces by operating the ID mark Q1 on the grid surface, or can move or exchange the grid surface itself. For example, in a first state, a plurality of virtual objects 341 (for example, virtual objects V1, V2, and V3) are arranged on a front-face grid surface SF1 (for example, central row) represented by the ID mark Q1 of ID=1 based on the work of the user. Next, it is assumed that the user wants to move the plurality of virtual objects 341 on the grid surface SF1 to a grid surface SF2. At this time, for example, in the voice method, the user inputs "move an object on a first surface to a second surface" or the like. In the cursor method or the like, the user first designates the grid surface SF1 as a target grid surface by the ID mark Q1 of ID=1, and then designates the grid surface SF2 as a movement-destination grid surface by an ID mark Q1 of ID=2.

The HMD 1 collectively moves the plurality of virtual objects 341, which are arranged on the grid surface SF1, to the grid surface SF2 according to the operation. At this time, the HMD 1 maintains a positional relationship between the points P1, on which the virtual objects 341 are arranged, as much as possible between the pre-movement grid surface and the post-movement grid surface. For example, when all the points P1 of the grid surface SF2 are vacant, the plurality of virtual objects 341 are arranged with respect to the points P1 having ID=4, 5 and 6 that are in a central row of the grid surface SF2. When the virtual objects are already arranged at the point P1 of the corresponding position of the grid surface SF2, the HMD 1 may select another vacant point P1 in the grid surface SF2 and arrange the plurality of virtual objects 341. When a vacant point(s) P1 on the grid surface SF2 is insufficient and the plurality of virtual objects 341 cannot be arranged, the HMD 1 informs the user of that effect.

Incidentally, moving one virtual object between the grid surfaces is also possible similarly. For example, it is assumed that the user wants to move only the virtual object V1 on the grid surface SF1 to the grid surface SF2. In that case, for example, in the voice method, the user may input "move an object of A to a second surface", "move an object of A to a back surface (or back)", or the like. Even if an ID of the surface is not designated and if the relative positional relationship (for example, "back surface" or the like) is designated, the visual object can be moved.

As another control example, the arranged virtual objects may be exchanged between the grid surfaces. This exchange may be regarded as movement or exchange of the grid surface. For example, a case of exchanging a virtual object on the grid surface SF1 with a virtual object on the grid surface SF2 is as follows. The user uses the ID mark Q1 to designate ID=1 of the movement-source grid surface SF1 and ID=2 of the movement-destination grid surface SF2. According to this operation, the HMD 1 moves the grid surface SF1 together with the virtual objects V1, V2, and V3 to the positions of the grid surface SF2, and moves the grid surface SF2 to the position of the grid surface SF1. Further, the movement of the grid surface may be cyclical movement in the entire grid K1. For example, when the grid surface SF1 is moved to the position of the grid surface SF2, the HMD 1 moves, according to the above movement, the grid surface SF2 to the position of the grid surface SF3 and moves the grid surface SF3 to the position of the grid surface SF1.

Although the above control example shows an example in a depth direction (axis $X_L$), the same control can be performed in a right-left direction (axis $Y_L$) and an up-down direction (axis Z L). According to the above control example, the arrangement and the movement of the virtual object are easy even at a position far away from the position of the user's viewpoint in the depth direction. Further, even when the plurality of virtual objects are arranged in the depth direction and viewed superimposedly, the above-mentioned operation makes it possible to bring the desired virtual object to a front face and make it easy to see.

[Grid Control (3)]

FIG. 35 shows another display control example related to a three-dimensional grid. In an image 351 of (A), a three-dimensional grid K1 is displayed in the display surface 5. Similarly, this grid K1 has three grid surfaces (grid surfaces SF1, SF2, and SF3) in a depth direction. For example, the virtual objects are arranged on a front-side grid surface SF1 and an intermediate grid surface SF2, respectively. Virtual objects v11, v12, and V13 are arranged in a central row of the grid surface SF1. Virtual objects V1, V2, and V3 are arranged in a central row of the grid surface SF2. The ID mark M1 of the point P1 is not displayed on the grid K1. In this example, the plurality of virtual objects are superimposed forward and backward in the depth direction from the user's viewpoint. For example, the virtual object v11 and the virtual object V1 are superimposed with each other, and the point P1 at the corresponding position is difficult to recognize. In this case, selection etc. of the point P1 may be difficult to perform. Therefore, the HMD 1 switches an on/off state of the display of the virtual object arranged on the grid K1 according to a predetermined instruction operation of the user. Alternatively, the HMD 1 switches the display of the virtual object on the grid K1 to a transparent state in response to a predetermined instruction operation.

In a state of the image 351 of (A), the virtual object on the grid K1 is normally displayed. When the user wants to easily recognize all points P1, he/she inputs "object transparency (or object display off)" or the like as an instruction operation, for example, in the voice method. Alternatively, an object transparent button 352 or the like displayed on the display surface 5 may be used instead thereof. According to the operation, the HMD 1 puts all the virtual objects arranged on the grid K1 into transparent states (for example, a state in which only an outline is displayed by a broken line) similarly to a state of an image 351b in (B). Consequently, the user can easily recognize each point P1 of the grid K1, and can easily designate etc. the movement-destination point P1.

As another control example, when the user selects and operates a certain grid surface, the HMD 1 may display only the virtual object on the grid surface in a normal state and may not be display the virtual object on another grid surface in a transparent state. Further, the HMD 1 may put all of the points P1 and the grid lines, etc. on the other grid surfaces into non-displayed states. Alternatively, the HMD 1 may display the virtual objects on all grid surfaces in front of the selected grid surface in transparent states, or may put all the points P1 and the like in the non-displayed states.

[Grid Control (4)]

Figure 36:
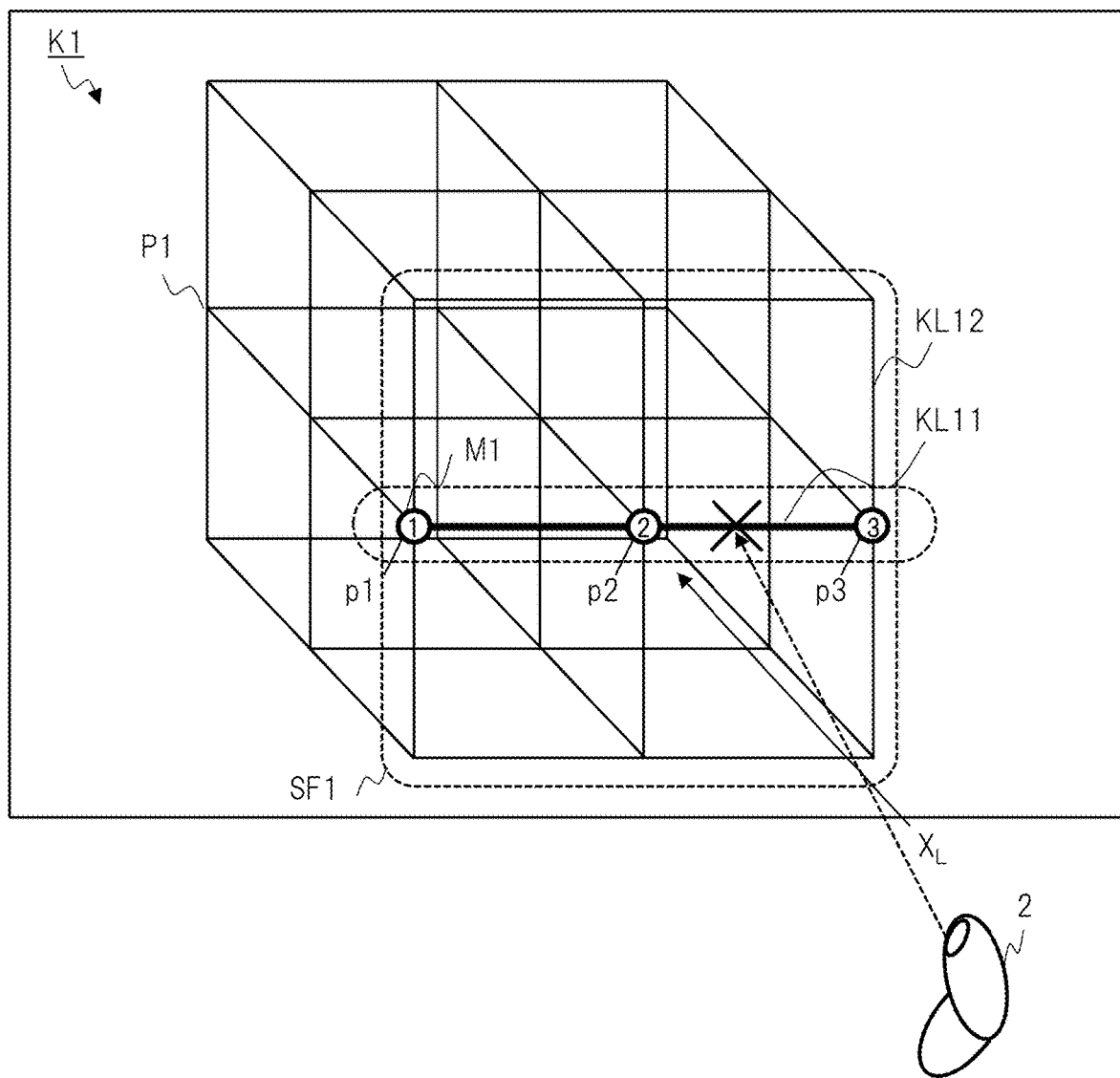
FIG. 36 is a view showing another display control example of the three-dimensional grid in the first embodiment.

FIG. 36 shows another display control example relating to a three-dimensional grid. In this control example, a group of points P1 can be operated by an operation of a grid line(s) in a grid K1. The HMD 1 displays a grid line (for example, a solid straight line) of the grid K1 in the display surface 5. There is a grid line between the respective points P1. For example, a front-side grid surface SF1 has grid lines KL11, KL12, and the like. In the grid K1 of this example, an ID mark M1 of the point P1 is not displayed at first. In moving the virtual object, the user performs a predetermined operation of designating the grid line. The predetermined operation is, for example, in a case of a method using a cursor of an operating tool 2, an operation of indicating the grid line by the cursor. This example shows a case of designating a grid line KL11. The grid line KL11 is a line from one end (point p1) to the other end (point p3) of the grid surface SF1.

For example, when the grid line KL11 is designated, the HMD 1 highlights and displays the grid line KL11 (for example, makes it thicker, changes its color, or the like). The HMD 1 changes the display states of all the points P1 (for example, points p1, p2, and p3) on the grid line KL11. For example, the HMD 1 displays, by circular ID marks M1, all the points P1 on the grid line KL11 (for example, ID=1, 2, and 3). The HMD 1 puts those points P1 (points p1, p2, and p3) in provisionally selected states. Consequently, the user can first provisionally select the plurality of points P1 in one row corresponding to the designated grid line KL11. The user can further designate one desired point P1 from the points P1 on the provisionally selected grid line KL11. For example, the user moves the cursor to the point p2, thereby being able to designate the point p2 and put it in a selective determination state. At the time of this operation, a point P1 on another grid line of the grid K1 cannot be designated. As another control example, an ID mark having grid-line identification information may be displayed and be operable for each grid line.

[Grid Control (5)]

Figure 37:
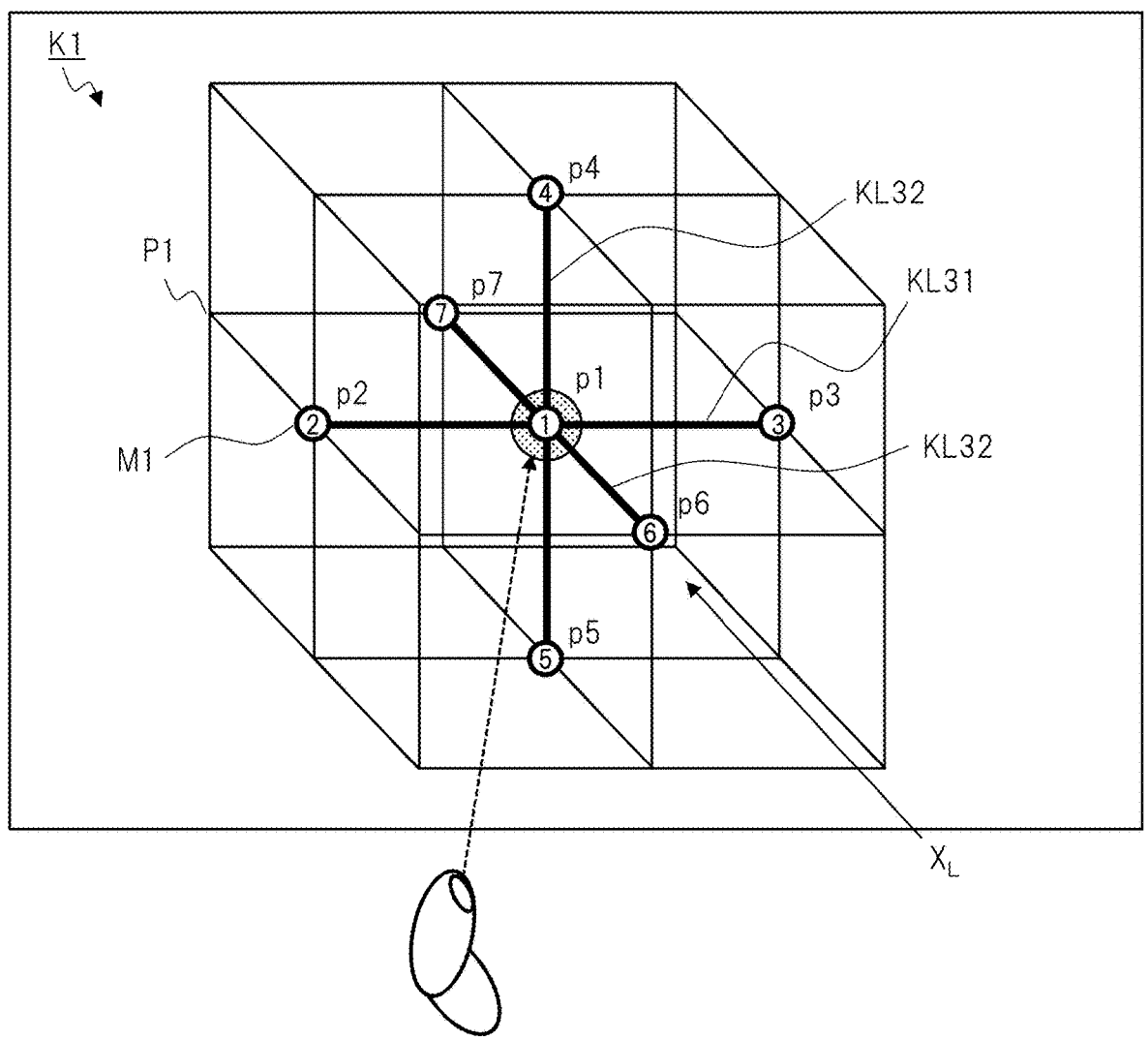
FIG. 37 is a view showing another display control example of the three-dimensional grid in the first embodiment.

FIG. 37 shows another display control example related to a three-dimensional grid. This control example is a modification example of the control example of FIG. 36. In the grid K1 of FIG. 37, the ID mark M1 is not displayed at the point P1 at first. It is assumed that the user indicates a certain point P1, for example, a central point p1 in the grid K1 by, for example, the operating tool 2. In that case, the HMD 1 highlights and displays the point p1, and highlights and displays grid lines (for example, grid lines KL31, KL32, and KL33) in three directions (X, Y, Z) with respect to the point p1. This grid line may be a line from one end to the other end of the grid K1, or may be a line of a portion between adjacent points P1. In addition, the HMD 1 highlights and displays all points P1 belonging to those three grid lines, for example, points p2, p3, p4, p5, p6, and p7 adjacent to the point p1. The HMD 1 displays circular ID marks M1 at, for example, a total of seven points p1 to p7. For example, ID=1 to 7 are displayed at the points p1 to p7. Further, this ID is not limited to a number, and may be "left", "right", "top", "bottom", "front", or "rear". The HMD 1 puts the above-mentioned three grid lines and seven points P1 in provisionally selected states. The user can designate one desired point P1 from a portion in the provisionally selected state.

[Grid Control (6)]

Figure 38:
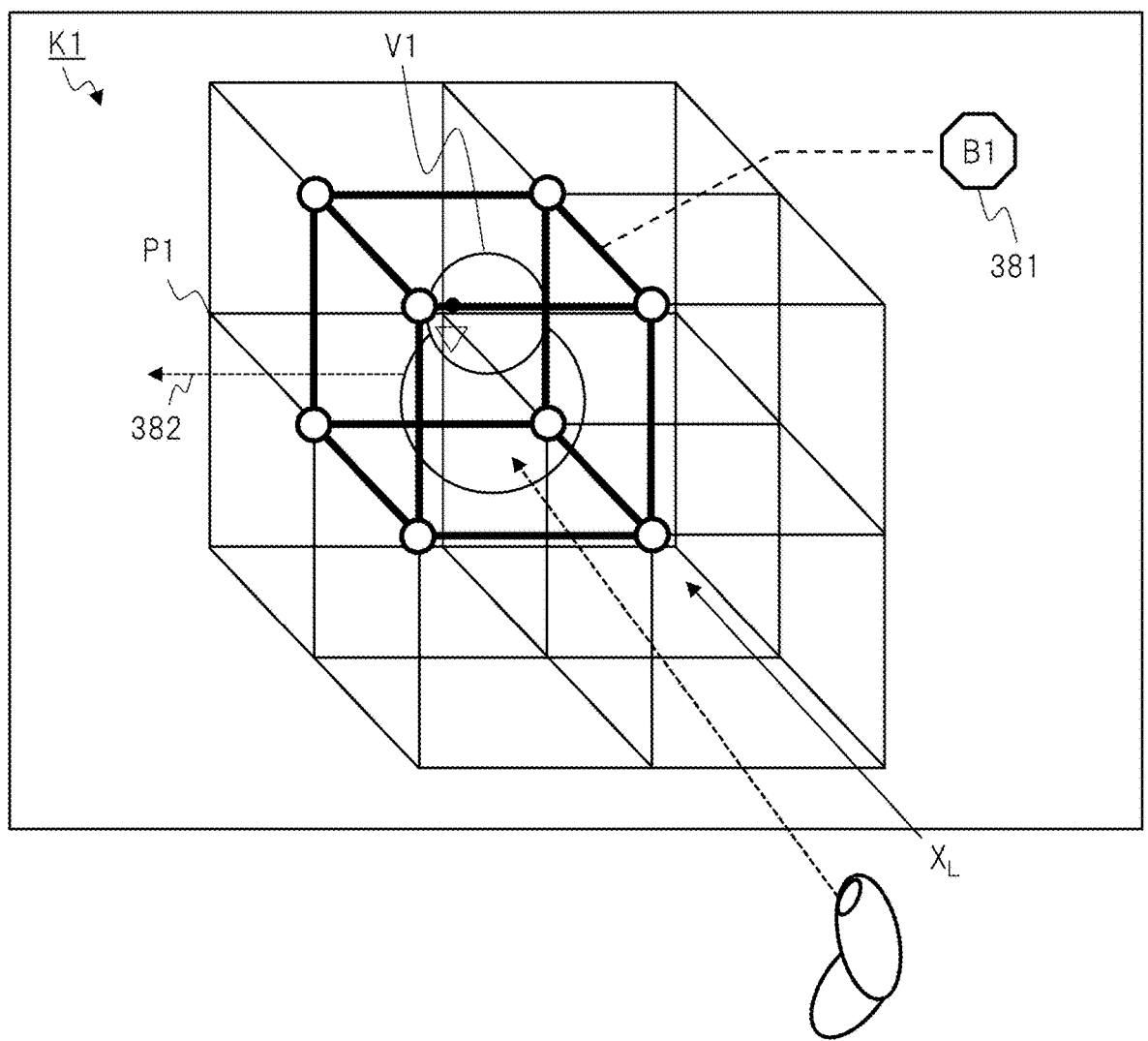
FIG. 38 is a view showing another configuration example of the three-dimensional grid in the first embodiment.

FIG. 38 shows another configuration example relating to a three-dimensional grid. The concept of blocks can be applied to the three-dimensional grid K1 similarly to FIG. 16 described above. The user can perform a selection operation for each block. In this example, a cubic portion, which is composed of eight vertices, out of the grid K1 is one block. The HMD 1 displays an ID mark 381 representing a block ID for each block. The user can designate a target virtual object, designate an arrangement-destination block, and arrange the target virtual object in a region of the block by a predetermined operation. In this example, when the cursor approaches near a certain block, the block (corresponding point P1 and grid line) is highlighted and displayed, and the block is connected with a line to display the ID mark 381 (for example, ID=B1). A direction 382 or the like can also be set to the virtual object arranged in the block.

In the various control examples described above, a selected state in which the target virtual object, the point P1, the group, or the like is designated can be canceled by a predetermined operation of the user. This operation may be, for example, an operation such as a voice input of "cancellation" or an operation of a cancellation button, or as an operation of indicating an empty portion outside the grid K1.

[Grid Control (7)]

FIG. 39 shows another display control example related to a three-dimensional grid. When a plurality of points P1 or a plurality of virtual objects on a grid K1 are superimposed in a depth direction, it may be difficult to see or operate the superposition from the user. Therefore, the HMD 1 performs the following control in order to make it easy to see and operate the superposition. In an example of an image 391 of FIG. 39, three points P1 (points p1, p2, and p3) are arranged in a depth direction (axis $X_L$) corresponding to a line-of-sight direction near a center of the grid K1. These three points P1 are densely packed in the display surface 5, and are difficult for the user to see. Therefore, the HMD 1 changes the display states of the three points P1 (p1, p2, and p3) so that they can be easily seen, for example, automatically or in a manner of being indicated by the cursor or the like.

An image 391b of (B) shows a display state which has been changed. The HMD 1 displays the three points P1 (points p1, p2, and p3) in a direction different from the direction of the axis $X_L$ of (A). In this example, the HMD 1: displays a straight line 392 (for example, a dotted line) so as to connect from the point p1 which is the central point P1 of the front-side grid surface SF1; arranges the three points p1, p2, and p3 on the straight line 392; and displays ID marks M1 corresponding to them. A direction of the straight line 392 is a direction other than the direction of the axis $X_L$, and is arranged in a region where there are as few other grid lines and points P1 of the grid K1 as possible. In particular, the direction of the straight line 392 may be, for example, such a direction as to match with a direction of the user's fingers, a direction of a beam of the operating tool 2, a line-of-sight direction, or the like as much as possible. Further, the ID marks M1 for the plurality of points P1 arranged on the straight line 392 may have different display sizes so as to match with a sense of perspective.

The above-mentioned control example can be similarly applied also to superposition of virtual objects. In the image 391 of (A), three virtual objects, for example, virtual objects V1, V2, and V3 are arranged and superimposedly viewed at a position of the right-side point P1 (for example, point p4) of the point p1 in the depth direction. Therefore, the HMD 1 displays the virtual objects V1, V2, and V3 and the corresponding labels side by side on a straight line 393 connecting from the point p4 similarly to the image 391b of (B). A direction of the straight line 393 indicates, for example, a case of having about 90 degrees with respect to the direction of the beam of the operating tool 2. The straight line 392 and the straight line 393 may be curved lines or the like.

Effects Etc.

As described above, according to the HMD 1 of the first embodiment, in arranging the virtual object in the real space, the user has less trouble, the usability is good, and the virtual object can be appropriately arranged. According to the first embodiment, using the control of the grid and the coordinate system makes it possible to suitably arrange and move the plurality of virtual objects with little effort and a short time. The user can realize efficient work by using the plurality of virtual objects. According to the first embodiment, support can be provided for various applications, and the usability of the applications can be improved. The user can align and arrange the plurality of virtual objects in a more visible manner by using the grid. According to the first embodiment, even when the virtual object is arranged in the depth direction seen from the user's viewpoint, the virtual object can be easily positioned etc. and can be also arranged far away. Although the present invention has been specifically described above based on the embodiment, the present invention is not limited to the above-described embodiments and can be variously modified without departing from the scope thereof. The present invention is applicable not only to the HMDs but also to other display apparatuses.

EXPLANATION OF REFERENCE SYMBOLS

1 . . . HMD; 2 . . . Operating tool; 3 . . . Server; 4 . . . PC; 5 . . . Display surface; K1 . . . Grid; P1 . . . Reference point; N1 . . . ID mark; 111 and 111b . . . Image; 110, V1, V2, and V3 . . . Visual object; and 403 . . . Real thing.

The invention claimed is:

1. A head mounted display apparatus arranging and displaying a virtual object in a space based on a user's operation, wherein the head mounted display is configured to:
  display a grid on a display surface of the head mounted display, the grid including a plurality of points for supporting an operation of the virtual object; and
  according to an operation including designation of a target virtual object and designation of a first point at an arrangement destination, arrange and display the target virtual object at a position of the first point,
wherein an image having identification information is displayed for each point of the plurality of points on the grid,
wherein an image having virtual-object identification information is displayed for each virtual object,
wherein the operation includes designation of the virtual-object identification information or designation of the identification information, and
wherein according to an operation including designation of the target virtual object at a movement source displayed on the display surface or designation of a second point displaying the target virtual object, and the designation of the first point, the target virtual object at the movement source is moved at the position of the first point.

2. The head mounted display apparatus according to claim 1,
  wherein the virtual object has an image created by an application program, and an image of a graphical user interface object including an icon of the application program, a window of the application program, system information, and a command button.

3. A head mounted display apparatus arranging and displaying a virtual object in a space based on a user's operation,
  wherein the head mounted display is configured to:
  display a grid on a display surface of the head mounted display, the grid including a plurality of points for supporting an operation of the virtual object; and
    according to an operation including designation of a target virtual object and designation of a first point at an arrangement destination, arrange and display the target virtual object at a position of the first point, wherein an image having identification information is displayed for each point of the plurality of points on the grid,
  wherein an image having virtual-object identification information is displayed for each virtual object,
  wherein the operation includes designation of the virtual-object identification information or designation of the identification information, and
  wherein according to an operation including designation of the target virtual object not displayed on the display surface and the designation of the first position, the target virtual object is arranged at the position of the first point.

4. The head mounted display apparatus according to claim 3,
  wherein the virtual object has an image created by an application program, and an image of a graphical user interface object including an icon of the application program, a window of the application program, system information, and a command button.

\* \* \* \* \*